(12) United States Patent
Yanase et al.

(10) Patent No.: US 8,766,948 B2
(45) Date of Patent: Jul. 1, 2014

(54) TOUCH SENSOR DEVICE AND ELECTRONIC APPARATUS

(75) Inventors: Jiro Yanase, Kanagawa (JP); Hiroshi Haga, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 232 days.

(21) Appl. No.: 13/272,486

(22) Filed: Oct. 13, 2011

(65) Prior Publication Data

US 2012/0092296 A1    Apr. 19, 2012

(30) Foreign Application Priority Data

Oct. 14, 2010 (JP) ................................ 2010-231291
Sep. 13, 2011 (JP) ................................ 2011-199090

(51) Int. Cl.
*G06F 3/044* (2006.01)

(52) U.S. Cl.
USPC ........................................ 345/174; 178/18.06

(58) Field of Classification Search
USPC .................... 345/173–183; 178/18.01, 18.06
See application file for complete search history.

(56) References Cited

U.S. PATENT DOCUMENTS

| 8,194,043 | B2 * | 6/2012 | Cheon et al. .................. 345/173 |
| 2005/0110769 | A1 * | 5/2005 | DaCosta et al. .............. 345/173 |
| 2009/0040192 | A1 * | 2/2009 | Haga .............................. 345/174 |
| 2010/0258361 | A1 | 10/2010 | Yamauchi et al. |
| 2010/0309122 | A1 * | 12/2010 | Abe et al. ...................... 345/157 |

FOREIGN PATENT DOCUMENTS

| JP | 56-500230 | 2/1981 |
| JP | 2005-018669 | 1/2005 |
| JP | 2007-026065 | 2/2007 |
| JP | 2007-052639 | 3/2007 |
| JP | 2007-208682 | 8/2007 |
| JP | 2009-169697 | 7/2009 |

OTHER PUBLICATIONS

Analog Devices, Inc., Programmable Controller AD7147 Data Sheet.

* cited by examiner

*Primary Examiner* — Abbas Abdulselam
(74) *Attorney, Agent, or Firm* — Young & Thompson

(57) ABSTRACT

A touch sensor device includes: a touch panel on which a capacitance is formed with a pointer; a signal calculation unit calculating a signal output value based on a magnitude of the capacitance; a contact determination unit comparing the signal output value with a threshold and determining whether the pointer has been brought into contact with or separated from the touch panel; and a threshold calculation unit updating a first threshold used for determining whether the pointer has been brought into contact with the touch panel, if an increase of the signal output value is detected during a first unit time within a time period from a determination that the pointer has been brought into contact with the touch panel until a determination that the pointer has been separated from the touch panel.

20 Claims, 43 Drawing Sheets

TOUCH SENSOR DEVICE AND ELECTRONIC APPARATUS

REFERENCE TO RELATED APPLICATION

This application is based upon and claims the benefit of the priorities of Japanese patent application No. 2010-231291, filed on Oct. 14, 2010 and Japanese patent application No. 2011-199090, filed on Sep. 13, 2011, the disclosures of which are incorporated herein in their entirety by reference thereto.

The present disclosure relates to a capacitive touch sensor device and an electronic apparatus including the touch sensor device.

TECHNICAL FIELD

Background

A touch sensor device detects coordinates of a position pointed by a pointer such as a finger tip or a pen or detects presence or absence of a pointing operation. Normally, such touch sensor device is used in combination with a surface display device such as a liquid crystal display (hereinafter referred to as "LCD") or a plasma display panel (hereinafter referred to as "PDP").

By inputting information from the touch sensor device to a computer and causing the computer to control display contents on a display device or to control an apparatus, a user-friendly man-machine interface can be realized. Currently, the touch sensor device is widely used in everyday life in a game machine, a mobile information terminal, a ticket-vending machine, an automated teller machine (ATM), a car navigation system, and the like. Along with the advancement of computers and the spread of network connection environments, various types of services have become available through electronic apparatuses. Accordingly, the need for display devices including a touch sensor device is increasing.

There are various types of touch sensor devices. For example, capacitive, resistive, infrared, ultrasonic, and electromagnetic touch sensor devices are known. Among these types, capacitive touch sensor devices can detect a contact with a pointer through a thin glass, a plastic component, or the like. Since users do not need to give a strong push for a contact, these capacitive touch sensor devices exhibit excellent resistance to repetitive input (contact) operations. Thus, capacitive touch sensor devices are widely used in many application areas such as in industrial products and in white household articles.

The capacitive touch sensor devices are classified into those of a projected capacitive type and those of a surface capacitive type.

In the projected capacitive type touch sensor device, X-Y transparent electrodes are formed in a matrix pattern. These X and Y transparent electrodes are formed via a glass or insulating layer. When a pointer is brought near X-Y transparent electrodes, the capacitance between the electrodes is increased, a change in the capacitance of a line on the X-Y coordinate system is detected by a controller, and the position of the pointer is detected.

On the other hand, a surface capacitive type touch sensor device includes an insulating substrate, a transparent conductive layer uniformly formed on a surface of the insulating substrate, and a thin insulating layer (a protective layer) formed on a top surface of the transparent conductive layer. To drive this touch sensor device, an AC voltage is applied to four corners of the transparent conductive layer. If a pointer touches a surface of the touch sensor device, a minute electric current flows to the pointer via the capacitance formed by the transparent conductive layer and the pointer. This current flows to the point into contact with the pointer from each of the four corners of the transparent conductive layer. Next, a signal processing circuit detects presence or absence of a contact, based on the sum of the currents. In addition, coordinates of the contact position are calculated, based on ratios of the individual currents. For example, Patent Document 1 discloses techniques relating to such surface capacitive type touch sensor device.

Next, one example of a method for determining presence or absence of a contact will be described. First, a signal processing circuit converts capacitance formed on a transparent conductive layer into a signal proportional to the capacitance. Next, the signal is acquired at a certain frequency, and the signal is compared with a predetermined threshold. Immediately after a pointer comes into contact with a surface of the touch sensor device, that is, immediately after the signal is increased and exceeds the threshold, a touch-on determination is made. Subsequently, after the pointer is separated from the surface of the touch sensor device, that is, immediately after the signal falls below the threshold, a touch-off determination is made. For example, Patent Documents 2 to 6 and Non-Patent Document 1 disclose techniques preventing erroneous determinations.

Patent Document 2 discloses a capacitive digital touch panel. According to Patent Document 2, a stable switch operation is realized by setting different thresholds for determining switching from OFF to ON and switching from ON to OFF.

Patent Document 3 discloses a hand gesture detection method for a touch panel. The method includes a step of calculating an object separation time from a touch panel and a step of transmitting, if the separation time exceeds a reference time, a gesture signal. In addition, Patent Document 4 discloses an object detection method for a capacitive touch panel. According to Patent Document 4, if a sensed amount continues to exhibit an increasing tendency within a set time, a touch of an object with a touch panel is displayed.

Non-Patent Document 1 discloses a programmable controller including an automatically-adjusted adaptive threshold and a sensitivity algorithm. This algorithm continuously monitors an output level from each sensor and automatically re-scales a threshold level in proportion to a sensor area covered by a user.

Patent Document 5 discloses a touch panel including: a reference signal storage means storing a reference signal for determining that a human finger or the like is not in contact with a switch; and a switch input determination means comparing the reference signal stored in the reference signal storage means with a switch signal from a touch sensor and determining that the human finger or the like is in contact with the switch if an amount of the change is equal to or greater than a predetermined value. The reference signal storage means updates the stored reference signal, based on the switch signal outputted from the touch sensor in a period when the switch input determination determines that no human finger or the like is in contact with the switch.

Patent Document 6 discloses a touch sensor device including: a touch sensor; an average value calculating means for calculating an average value of output voltages sent from an output section of the touch sensor; a threshold value calculating means for calculating a threshold value based on the average value; and comparing/determining means for comparing the output voltage with the threshold value and outputting, if it is determined that the output voltage exceeds the threshold value, a determination signal. Based on the touch sensor, the average value calculating means includes: sampling means for sampling the output voltages periodically and recording the sampled output voltages as output voltage data in a recording section; and calculating means for calculating a moving average value of the output voltages recorded in the recording section and sending the calculated moving average value to the threshold value calculating means.

PATENT DOCUMENT

Patent Document 1:
Japanese Patent Kohyo Publication No. JP-S56-500230A
Patent Document 2:
Japanese Patent Kokai Publication No. JP2005-18669A
Patent Document 3:
Japanese Patent Kokai Publication No. JP2007-52639A
Patent Document 4:
Japanese Patent Kokai Publication No. JP2007-26065A
Patent Document 5:
Japanese Patent Kokai Publication No. JP2007-208682A
Patent Document 6:
Japanese Patent Kokai Publication No. JP2009-169697A

NON-PATENT DOCUMENT

Non-Patent Document 1:
Analog Devices, Inc., Programmable Controller AD7147 Data Sheet, p. 25, Internet <URL:http://www.analog.com/static/imported-files/jp/data_sheets/AD7 147_jp.pdf>, searched on Sep. 1, 2010.

SUMMARY

The entire disclosures of Patent Documents 1-6 and Non-Patent Document 1 are incorporated herein by reference thereto. The following analyses are given, from a viewpoint of the present disclosure.

The present inventors found out that, an erroneous touch-off determination could possibly be made while a drag operation is executed after a pointer touches a surface of a touch panel and a touch-on determination is made. Examples of the pointer include a finger or a conductive object forming capacitance equivalent to that made by a finger. An arbitrary pointer may be used, as long as the pointer can input instructions to a touch sensor. For example, a finger (including a gloved finger) or a pen can be used as the pointer. A touch-on signifies a state in which a pointer is into contact with the touch panel to input instructions. A touch-off signifies a state in which a pointer is not into contact with the touch panel to input instructions. In addition, a drag operation is an operation in which a pointer is brought into contact with a surface of the touch panel and is moved on the surface. An erroneous determination is caused by that the user lightly touches the touch panel with an object other than the pointer unconsciously during a drag operation and that this decreases the capacitance formed by the pointer and the transparent conductive layer. An erroneous determination is also caused by the change of the capacitance during a drag operation.

The pointer is an elastic body such as a finger tip. If the pointer is brought into contact with the surface of the touch panel and is then pushed by a certain level of force, the pointer receives repelling force. Accordingly, the pointer is deformed on the surface of the touch panel. Since the area of contact between the pointer and the surface of the touch panel is increased, the capacitance is also increased accordingly.

During a drag operation, the user brings the pointer into contact with the surface of the touch panel and moves the pointer on the surface of the touch panel. During this movement, friction is caused between the pointer and the surface of the touch panel. To reduce this friction and smoothly move the pointer on the surface of the touch panel, users tend to reduce the pushing force (contact pressure) of the pointer unconsciously. As a result, the repelling force that the pointer receives from the surface of the touch panel is reduced, and the area of contact between the pointer and the surface of the touch panel is decreased.

In addition, since users tend to vary the pushing force of the pointer on the surface of the touch panel during a drag operation, the capacitance formed by the transparent conductive layer and the pointer is also varied. In addition, during a drag operation, there are cases where the pointer is slightly floated from the surface of the touch panel by the friction between the pointer and the surface of the touch panel. In this case, too, since the area of contact between the pointer and the surface of the touch panel is varied, the capacitance is also varied.

Thus, since the area of contact between the pointer and the surface of the touch panel is relatively small and is varied during a drag operation, the capacitance formed by the pointer and the surface of the touch panel is accordingly affected. Consequently, there are cases where a touch-off determination is made even during a drag operation or where a touch-off determination is not made even if the pointer separates from the touch panel after a drag operation.

Based on a touch sensor device using an equal threshold for a touch-on determination and a touch-off determination as a constant and comparing a signal with the threshold, if a pointer is brought into contact with the surface of the touch panel and the signal exceeds the threshold, a touch-on determination is made. However, if the signal is decreased during a drag operation as described above and the signal falls below the threshold, a touch-off determination is made. Namely, a touch-off determination is made while the pointer remains in contact with the surface of the touch panel.

Based on a touch sensor device previously estimating a signal during a drag operation and setting a threshold lower than the signal, even when a pointer is not in contact with the surface of the touch panel, if the pointer, a palm, or the like is brought near the surface, the signal easily exceeds the threshold. As a result, a touch-on determination is made.

Thus, both the device using an equal threshold for a touch-on determination and a touch-off determination and the device predicting the signal make erroneous determination about presence or absence of inputted instructions.

A related technique disclosed in Non-Patent Document 1 discusses countermeasures against problems caused when a signal magnitude associated with a contact varies among users. Based on the countermeasures, a threshold for the next touch determination is automatically calculated and set based on a signal associated with a previous contact. However, there are cases where the signal associated with the previous contact is large and the threshold calculated based on this signal is high. In such cases, even if the signal exceeds the threshold and a touch-on determination is made, when the signal is decreased during a drag operation, the signal may fall below the threshold. Thus, an erroneous touch-off determination is easily made. Namely, the adaptive threshold of Non-Patent Document 1 is problematic, since the next threshold may be set to an inappropriate value, depending on the difference between a signal associated with the previous contact and a signal associated with the next contact.

Based on the capacitive digital touch panel disclosed in Patent Document 2, a threshold for a touch-off determination is set lower than a threshold for a touch-on determination. However, for example, when a finger tip as a pointer is separated after a touch-on determination is made, if the palm is still located close to the surface of the touch panel, the signal may remain higher than the threshold for a touch-off determination. As a result, a touch-off determination is not made.

Based on the hand gesture detection method disclosed in Patent Document 3 and the object detection method for a capacitive touch panel disclosed in Patent Document 4, if decreasing of a detection signal is continued for a certain period of time, a touch-off determination is made. However, there are cases where the detection signal is decreased and falls below the threshold for a touch-off determination while a finger tip is in contact with the touch panel during a drag operation or the like, and this state continues longer than the certain period of time. In this occasion, the touch-on state is erroneously determined as a touch-off state. In addition, there are cases where the palm still remains near the touch panel for a certain period of time after a finger tip as the pointer is separated. In such cases, since the detection signal continues to remain larger than the threshold for a touch-off determination for the certain period of time, a touch-off determination is not made.

Based on the touch panel disclosed in Patent Document 5, the reference signal is updated based on a switch signal upon a touch-off. Thus, erroneous determinations associated with a drag operation cannot be eliminated. In addition, while the switch signal exhibits a small change amount and ratio upon turning into a touch-off state, the switch signal exhibits a larger change amount and ratio upon turning into a touch-on state. Thus, based on the touch panel disclosed in Patent Document 5, it is difficult to prevent erroneous determinations upon turning into the touch-on state.

Based on the touch sensor device disclosed in Patent Document 6, if the pointer is gradually separated from the touch panel, the threshold is accordingly decreased. However, in this way, the signal is always higher than the threshold. Thus, even when the pointer is separated, if the palm or the like is located near the touch panel, a touch-off determination is not made.

According to an aspect of the present disclosure, it is aimed at providing a capacitive touch sensor device preventing erroneous touch-off determinations. In addition, according to another aspect of the present disclosure, it is aimed at providing an electronic apparatus including the touch sensor device.

According to a first aspect of the present disclosure, there is provided a touch sensor device, comprising: a touch panel on which a capacitance is formed with a pointer; a signal calculation unit (function) calculating a signal output value based on a magnitude of the capacitance; a contact determination unit (function) comparing the signal output value with a threshold and determining whether the pointer has been brought into contact with or separated from the touch panel; and a threshold calculation unit (function) updating a first threshold used for determining whether the pointer has been brought into contact with the touch panel, if an increase of the signal output value is detected during a first unit time within a time period from a determination that the pointer has been brought into contact with the touch panel until a determination that the pointer has been separated from the touch panel. Note, here the term "function" may be expressed by the terms "unit", "mechanism", or "means" which denotes the equivalent component.

According to a second aspect of the present disclosure, there is provided a touch sensor device; wherein a first distance is shorter than a second distance. The first distance is a distance between a pointer and a touch panel at a time of determining that the pointer has been separated from the touch panel, after the pointer is brought to proximity of the touch panel, the pointer is determined to have been brought into contact with the touch panel, and the distance between the pointer and the touch panel is increased monotonously. The second distance is a distance between the pointer and the touch panel at a time of determining that the pointer has been separated from the touch panel, after the pointer is brought to proximity of the touch panel, the pointer is determined to have been brought into contact with the touch panel, and the distance between the pointer and the touch panel is gradually increased while this distance is increased and decreased repeatedly.

According to a third aspect of the present disclosure, there is provided an electronic apparatus including the touch sensor device according to the first or second aspect.

The meritorious effects of the present disclosure are summarized as follows.

The present disclosure has at least one of the following meritorious effects.

According to the present disclosure, since a threshold is updated based on a signal change during a drag operation, erroneous touch-off determinations during a drag operation can be prevented.

PREFERRED MODES

Figure 1:
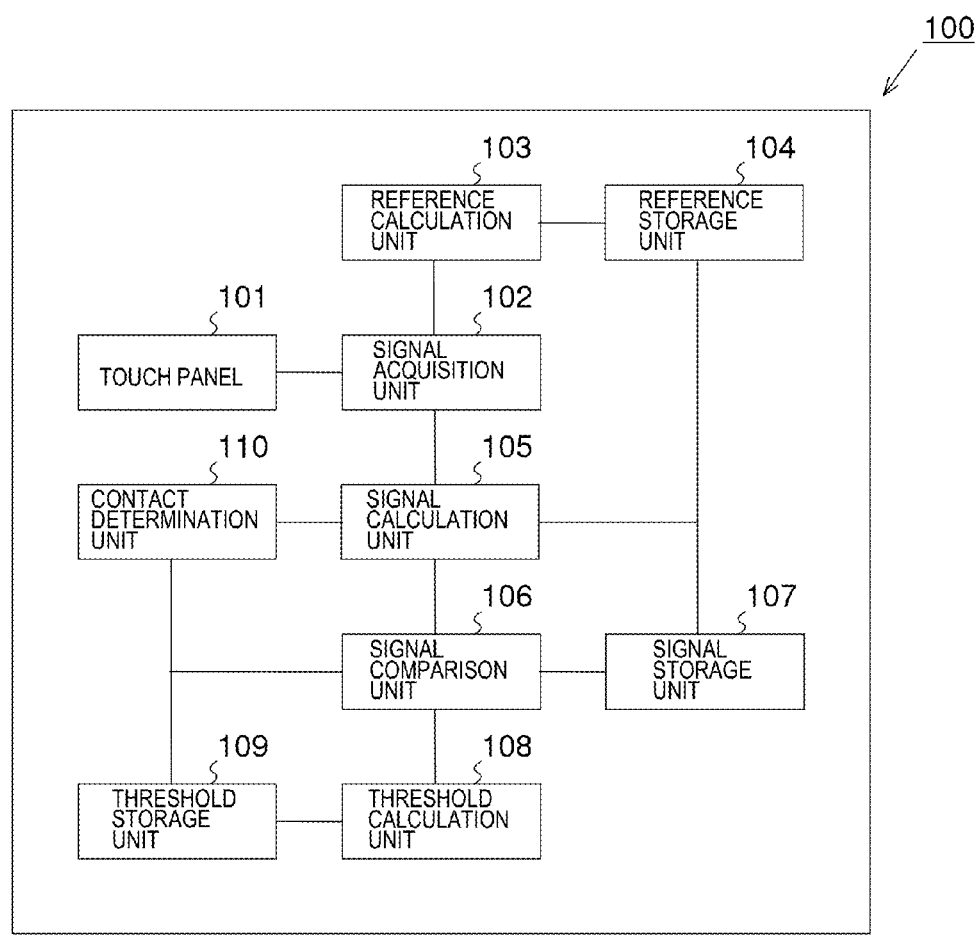
FIG. 1 is a schematic block diagram of a touch sensor device according to a first exemplary embodiment of the present disclosure.

Preferred modes of each of the above various aspects will be hereinafter described.

According to a preferred mode of the above various first aspect, if an increase of the signal output value is detected, the threshold calculation unit updates the first threshold to be smaller than the signal output value determined to have been increased. Note, the term "unit" may be expressed as "function", "mechanism" or in general "means".

According to a preferred mode of the above first aspect, the touch sensor device further comprises a signal comparison unit determining whether the signal output value has been increased during the first unit time being 0.02 to 0.2 seconds.

According to a preferred mode of the above first aspect, the contact determination unit uses a second threshold as a constant to determine whether the pointer has been brought into contact with the touch panel.

According to a preferred mode of the above first aspect, the touch sensor device further comprises a difference calculation unit calculating a first difference value representing a magnitude of change of the signal during a second unit time. In addition, when determining whether or not the pointer has been separated from the touch panel, if an absolute value of the first difference value exceeds the third threshold, the contact determination unit determines that the pointer has been separated from the touch panel.

According to a preferred mode of the above first aspect, when determining whether or not the pointer has been separated from the touch panel, if an absolute value of the first difference value is equal to or less than the third threshold, the contact determination unit compares the signal output value with the threshold.

According to a preferred mode of the above first aspect, the touch sensor device further comprises a difference calculation unit calculating a first difference value representing a magnitude of change of the signal during a second unit time. In addition, when determining whether or not the pointer has been brought into contact with the touch panel, if an absolute value of the first difference value exceeds the third threshold, the contact determination unit determines that the pointer has been brought into contact with the touch panel.

According to a preferred mode of the above first aspect, when determining whether or not the pointer has been brought into contact with the touch panel, if an absolute value of the first difference value is less than the third threshold, the contact determination unit compares the signal output value with the threshold.

According to a preferred mode of the above first aspect, the second unit time is a period of time in which the signal changes when the pointer has been brought into contact with the touch panel or a period of time in which the signal changes when the pointer has been separated from the touch panel.

According to a preferred mode of the above first aspect, the second unit time is set to 0.008 seconds to 0.1 seconds.

According to a preferred mode of the above first aspect, the touch sensor device further comprises a reference calculation unit calculating a baseline based on a magnitude of a capacitance formed on the touch panel when there is no influence of a capacitance by the pointer. In addition, the signal calculation unit calculates the signal output value based on a capacitance formed by the pointer and the baseline.

According to a preferred mode of the above first aspect, the touch sensor device further comprises a change determination unit determining a magnitude of change of the signal. The difference calculation unit calculates a second difference value representing change of the signal during a third unit time. The change determination unit compares the second difference value with a fourth threshold to determine whether or not the signal changes in association with close presence of the pointer.

According to a preferred mode of the above first aspect, the second unit time is from a time the second difference value is equal to or greater than the fourth threshold until a time the second difference value is less than the fourth threshold.

According to a preferred mode of the above first aspect, the second unit time has an upper limit that is set between 16 msec and 80 msec.

According to a preferred mode of the above first aspect, the fourth threshold is obtained by dividing the third threshold by the upper limit of the second unit time.

According to a preferred mode of the above first aspect, the touch sensor device further comprises a position calculation unit calculating position coordinates where the pointer is in contact with the touch panel. The signal calculation unit calculates the signal output value, based on individual channel signals from the touch panel. The position calculation unit calculates the position coordinates, based on a value obtained by subtracting a signal component associated with close presence of an element other than the pointer from the individual channel signals.

According to a preferred mode of the above first aspect, the position calculation unit calculates a signal component associated with close presence of an element other than the pointer by extrapolation based on the second difference value equal to or less than the fourth threshold and on the second unit time.

According to a preferred mode of the above third aspect, the electronic apparatus comprises: a counter electrode also serving as a conductive layer forming a capacitance with a pointer; a wiring; liquid crystal arranged between the counter electrode and the wiring; and a switch unit floating at least part of the wiring.

According to a preferred mode of the above third aspect, the electronic apparatus comprises: a counter electrode also serving as a conductive layer forming a capacitance with a pointer; a wiring; liquid crystal arranged between the counter electrode and the wiring; and a switch unit simultaneously applying an AC voltage applied to the conductive layer to at least part of the wiring.

According to a preferred mode of the above third aspect, the electronic apparatus comprises: a counter electrode; a wiring; liquid crystal arranged between the counter electrode and the wiring; a conductive layer forming a capacitance with a pointer; an insulating substrate arranged between the counter electrode and the conductive layer; and a switch unit simultaneously applying an AC voltage applied to the conductive layer to the counter electrode.

According to a fourth aspect of the present disclosure, there is provided a touch sensor device control method. The method comprises the steps of: calculating a signal output value based on a magnitude of a capacitance formed between a pointer and a touch panel; determining that the pointer has been brought into contact with the touch panel if the signal output value exceeds a second threshold; determining that the pointer has been separated from the touch panel if the signal output value is equal to or less than a first threshold; detecting whether the signal output value has been increased during a first unit time between when it is determined that the pointer has been brought into contact with the touch panel and when it is determined that the pointer has been separated from the touch panel; and updating the first threshold if the signal output value has been increased during the first unit time.

According to a preferred mode of the above fourth aspect, in the step of updating the first threshold, the first threshold is set to be smaller than the signal output value determined to have been increased.

According to a preferred mode of the above fourth aspect, the first unit time is set to 0.02 seconds to 0.2 seconds.

According to a preferred mode of the above fourth aspect, the second threshold is a constant.

According to a preferred mode of the above fourth aspect, the touch sensor device control method further comprises a step of calculating a first difference value representing a magnitude of change of the signal per (during) a second unit time. In the step of determining whether the pointer has been brought into contact with the touch panel, if an absolute value of a first difference value exceeds a third threshold, it is determined that the pointer has been brought into contact with the touch panel. In the step of determining whether the pointer has been separated from the touch panel, if an absolute value of the first difference value falls below the third threshold, it is determined that the pointer has been separated from the touch panel.

According to a preferred mode of the above fourth aspect, in the step of determining whether the pointer has been brought into contact with the touch panel, if an absolute value of the first difference value is equal to or less than the third threshold, the signal output value is compared with the second threshold. In the step of determining whether the pointer has been separated from the touch panel, if an absolute value of the first difference value is equal to or greater than the third threshold, the signal output value is compared with the first threshold.

According to a preferred mode of the above fourth aspect, the second unit time is a period of time in which the signal changes when the pointer has been brought into contact with the touch panel or a period of time in which the signal changes when the pointer has been separated from the touch panel.

According to a preferred mode of the above fourth aspect, the second unit time is set to 0.008 seconds to 0.1 seconds.

According to a fifth aspect of the present disclosure, there is provided a computer program causing a touch sensor device to execute the touch sensor device control method according to the above fourth aspect. The program is computer-readable and may be recorded on (or embodied by) a non-transitory recording medium. The touch sensor device may include therein as a part thereof at least one computer having CPU(s) with peripheral components including memorie(s), register(s), bus line(s) and necessary input and output interface(s), as well as communication means if necessary.

The touch panel may be an arbitrary touch panel having a function of detecting a contact with a pointer. Examples of the touch panel include a touch switch detecting only presence or absence of a contact with a pointer and a touch panel detecting not only presence or absence of a contact with a pointer but also a drag operation.

A touch sensor device according to a first exemplary embodiment of the present disclosure will be described. FIG. 1 is a schematic block diagram of a touch sensor device according to the first exemplary embodiment of the present disclosure. A touch sensor device 100 includes: a touch panel 101 used as a touch sensor to which a user inputs instructions with a pointer such as a finger tip; and a signal acquisition unit 102 acquiring an output signal from the touch panel 101. In addition, the touch sensor device 100 further includes: a reference calculation unit 103 calculating a baseline for calculating a signal output value based on an output signal from the signal acquisition unit 102; and a reference storage unit 104 storing the baseline obtained by the reference calculation unit 103. In addition, the touch sensor device 100 further includes: a signal calculation unit 105 calculating a signal output value used for a touch-on/off determination, based on the output signal obtained by the signal acquisition unit 102 and the baseline stored in the reference storage unit 104; a threshold storage unit 109 storing a threshold used for a touch-on/off determination; and a contact determination unit 110 comparing the threshold stored in the threshold storage unit 109 with the signal output value calculated by the signal calculation unit 105 for a touch-on/off determination. In addition, the touch sensor device 100 further includes: a signal comparison unit 106 comparing the signal output value calculated by the signal calculation unit 105 with a signal output value stored in a signal storage unit 107; and a threshold calculation unit 108 calculating a threshold based on results obtained by the signal comparison unit 106. The threshold calculated by the threshold calculation unit 108 is stored in the threshold storage unit 109.

Figure 2:
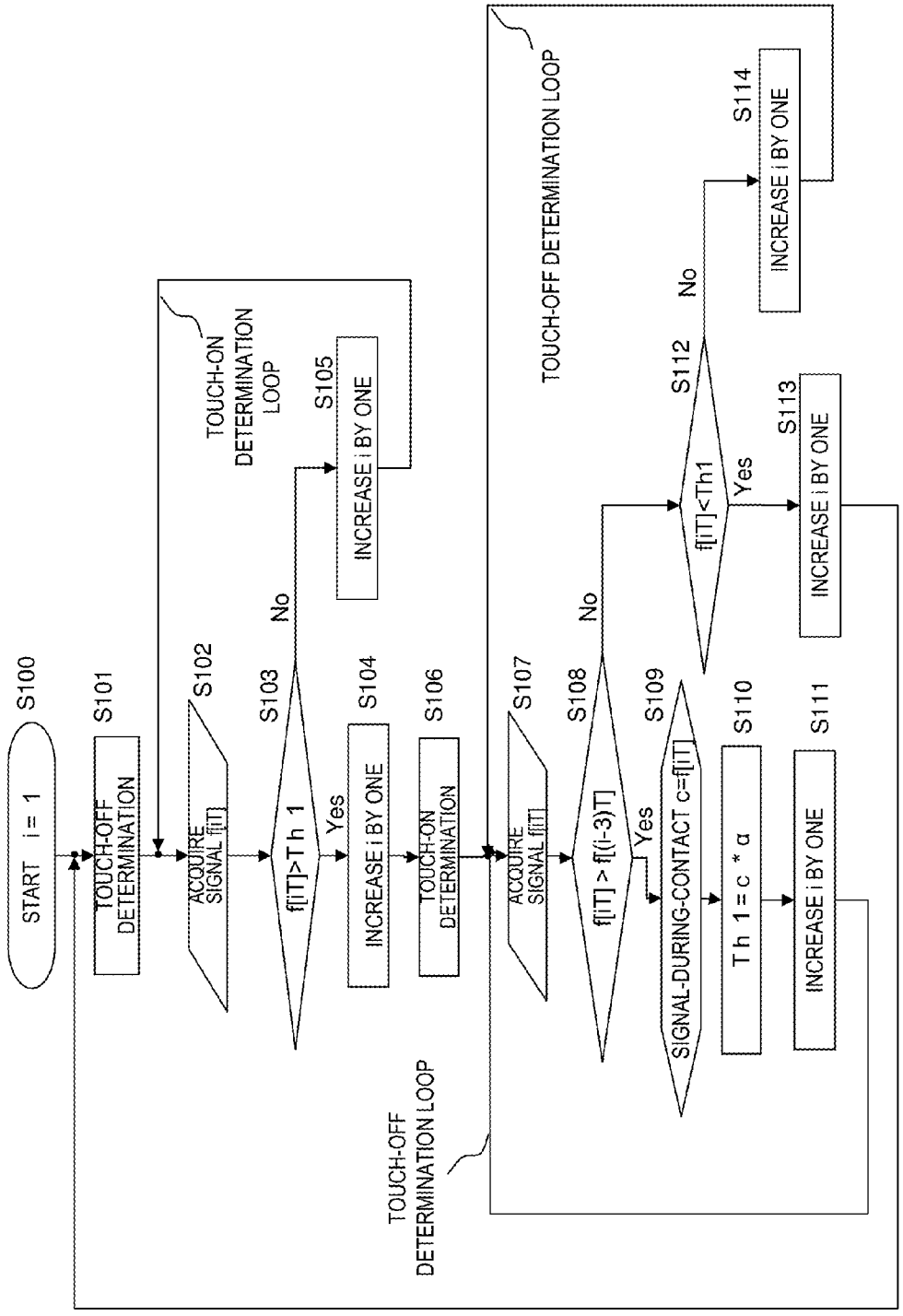
FIG. 2 is a flow chart illustrating a method for operating and controlling a touch sensor device according to a first exemplary embodiment of the present disclosure and a program for operating the touch sensor device.

Next, a method for operating and controlling the touch sensor device 100 and a program for operating the touch sensor device 100 will be described. FIG. 2 is a flow chart illustrating a method for operating and controlling the touch sensor device according to the first exemplary embodiment of the present disclosure and a program for operating the touch sensor device. For convenience, detection unit of the position (coordinates) of a touch is not described. Only the algorithm for determining presence or absence of a touch will be described. In addition, in FIGS. 2, 8 and 10, a signal output value f[iT] is represented as a signal f[nT].

First, after the program is started, i=1 (S100). This i (natural number) represents the i-th touch determination (loop) after the start of the program. Examples of the touch determination include a touch-on determination and a touch-off determination.

Next, when i=1, based on initial determination settings, the contact determination unit 110 makes a touch-off determination (S101), assuming that no pointer is into contact with the surface of the touch panel 101 immediately after the program is started. When i≥2, in S101, the contact determination unit 110 makes a touch-off determination as a result of a touch determination. Note that the term "unit" used here may represent "function", "mechanism" or in general "means".

The invention according to the first exemplary embodiment is an invention relating to a touch-off determination. Thus, in the present exemplary embodiment, a touch-on determination means will be described briefly. The signal acquisition unit 102 acquires a signal from the touch panel 101, and the signal calculation unit 105 corrects an output value of the received signal based on a baseline stored in the reference storage unit 104 and obtains a signal output value f[iT] (S102), wherein T represents a touch determination cycle. Namely, T is the reciprocal of a touch sensor operating frequency. For example, if the touch sensor operating frequency is 40 Hz, T=25 msec. Next, the contact determination unit 110 compares the signal output value f[iT] with a first threshold Th1 stored in the threshold storage unit 109 (S103). If the signal output value f[iT] is larger (f[iT]>Th1), the contact determination unit 110 makes a touch-on determination (S106). After S103, i is increased by one (S104, S105). If i=1, a threshold stored as the initial setting in the threshold storage unit 109 is used as the first threshold Th1. If i and the first threshold Th1 has been updated in S110 described later, the updated first threshold Th1 is used.

After the touch-on determination (S106), as in S102, the signal output value f[iT] in the i-th touch determination is acquired (S107).

Next, the signal comparison unit 106 compares the signal output value f[iT] acquired in S107 with a signal output value f[(i−q)T] acquired in the (i−q)th determination (S108). The signal output value f[(i−q)T] represents signal data acquired in the (i−q)th loop and stored in the signal storage unit 107. For example, a signal comparison time (first unit time) can be set to 3T (namely, q=3). For example, if T=25 msec, the first unit time is 75 msec. However, if i is (q+1) or lower, for example, if q=3 and i is 4 or lower than 4, the signal output value f[(i−q)T] is set to the signal output value f[(1T)]. If the signal output value f[iT] is larger than the signal output value f[(i−q)T], the signal storage unit 107 stores the signal output value f[iT] as "signal-during-contact c". In FIG. 2, q=3.

Next, the threshold calculation unit 108 newly calculates the first threshold Th1 based on the signal-during-contact c and stores the calculated first threshold Th1 in the threshold storage unit 109 (S110). The first threshold Th1 is calculated as follows: Th1=c×α, wherein α represents sensitivity. While the sensitivity α is set in advance in the range of 0<α<1, it is preferred that the sensitivity a be set in the range of 0.5 to 0.7. If the sensitivity α is too high, even when a finger tip is into contact with the surface of the touch panel, the signal output value f[iT] easily falls below Th1. As a result, a touch-off determination is made. On the other hand, if the sensitivity α is too low and the palm is near the touch panel, even when a finger tip is separated from the surface of the touch panel, the signal output value f[iT] may remain larger than the first threshold Th1. As a result, a touch-off determination is not made. Next, after i is increased by one, the operation returns to S107. In this case (f[iT]>f[(i−q)T]), S112 and the like are not executed.

In the flow chart in FIG. 2, after a touch-on determination (S106), a signal output value f[iT] is newly acquired in S107, and the first threshold Th1 is updated in S110. However, S107 may be omitted, that is, the signal output value f[iT] used in the touch-on determination in S103 may be used as the signal output value f[iT] in S108. Namely, in S108, the signal output value f[iT] used in the touch-on determination in S103 may be compared with the signal output value f[(i−q)T] acquired in the (i−q)th determination. In this way, if the output value f[iT] is larger, the first threshold Th1 is updated in S110.

In S108, if the signal output value f[iT] is lower than the signal output value f[(i−q)T] acquired in the (i−q)th determination, the contact determination unit 110 compares the signal output value f[iT] with the first threshold Th1 (S112). If the signal output value f[iT] exceeds the first threshold Th1, i is increased by one (S114) and the operation returns to S107. In this case, a touch-off determination is not made.

On the other hand, if the signal output value f[iT] is lower than the first threshold Th1, i is increased by one (S113), and the contact determination unit 110 makes a touch-off determination (S101). The operation proceeds to the touch-on determination loop from the touch-off determination loop.

If the operation proceeds to S101 via S110, namely, if the first threshold Th1 has been updated, the updated first threshold Th1 is used in the next S103.

While the i-th signal output value f[iT] is compared with the (i−q)th signal output value f[(i−q)T] in S108, it is preferred that q (a natural number) is set so that a unit time of (i−q)T to iT (first unit time), namely qT, becomes 20 msec to 200 msec.

First, grounds for the upper limit of the first unit time will be described. According to examples described below, if signal increase and decrease during a drag operation is viewed as a sinusoidal voltage, the frequency is approximately 2.5 Hz. To accurately sample this trend (waveform), sampling needs to be executed at a frequency more than twice the frequency component bandwidth of the waveform (this is referred to as sampling theorem). The frequency twice as large as the frequency of the signal increase and decrease is 5 Hz. Since the reciprocal of the sampled frequency is the first unit time, it is preferred that the first unit time for determining the signal increase and decrease be 200 msec or less.

Next, grounds for the lower limit of the first unit time will be described. If a pointer is separated from the surface of the touch panel more slowly, the signal is decreased more gradually. If there is a period in which noise components vary the signal more significantly compared with a decrease amount in the first unit time, the signal is not decreased monotonously. In each of the periods in which the signal is increased, the first threshold Th1 is updated. A signal component that changes depending on a user operation is overlapped with other noise components. Since such noise components are due to 100 V single-phase AC voltage of 50 Hz or 60 Hz inputted to the power supply, the peak of the noise components appears at 50 Hz or 60 Hz. While this frequency band signal is attenuated by an analog filter included in a current detection circuit and a digital filter incorporated in a program of a microcontroller, the signal cannot be eliminated completely. Examples of such filer include a bandpass filter and a low-pass filter. Low-pass filters pass low-frequencies but block (attenuate) frequency bands higher than a certain cutoff frequency. To attenuate 50 Hz noises, the cutoff frequency needs to be set lower than 50 Hz. If the cutoff frequency is set even lower for the 50 Hz noises, the 50 Hz band is attenuated further. A signal change in the first unit time is a result of integration of signal changes per touch determination cycle period T. Since noise components included in signal changes per touch determination cycle period T are integrated (added), the noise components are canceled out by each other and are brought close to 0. Thus, the longer the first unit time is, the greater the attenuation of the noise components included in signal changes will be. Since the cycle period is the reciprocal of the frequency, the first unit time is the reciprocal of the cutoff frequency of the low-pass filter. Thus, it is preferred that the first unit time be set to 20 msec or more.

Figure 3:
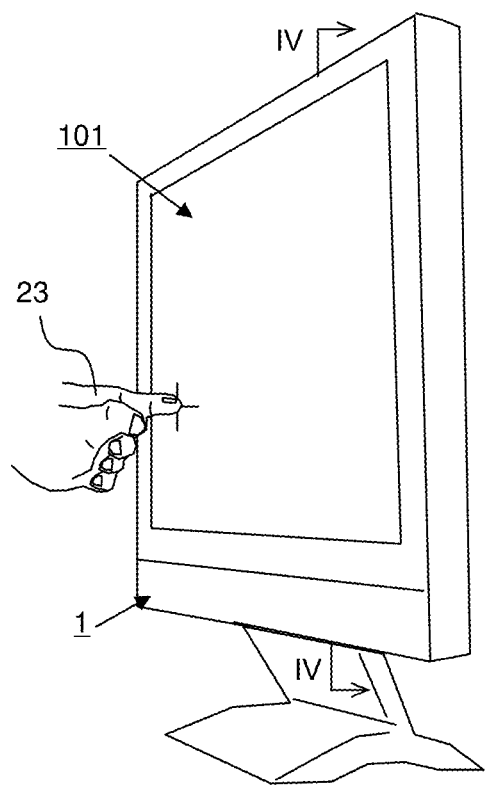
FIG. 3 is a schematic perspective view of an electronic apparatus according to the present disclosure.
Figure 4:
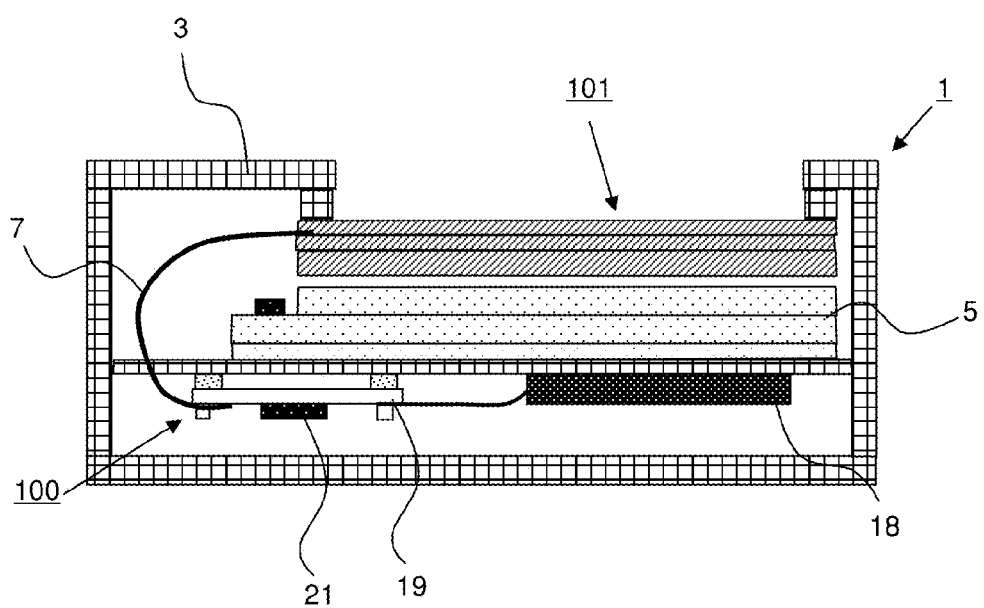
FIG. 4 is a schematic sectional view of the electronic apparatus according to the present disclosure, taken along IV-IV line in FIG. 3.
Figure 5:
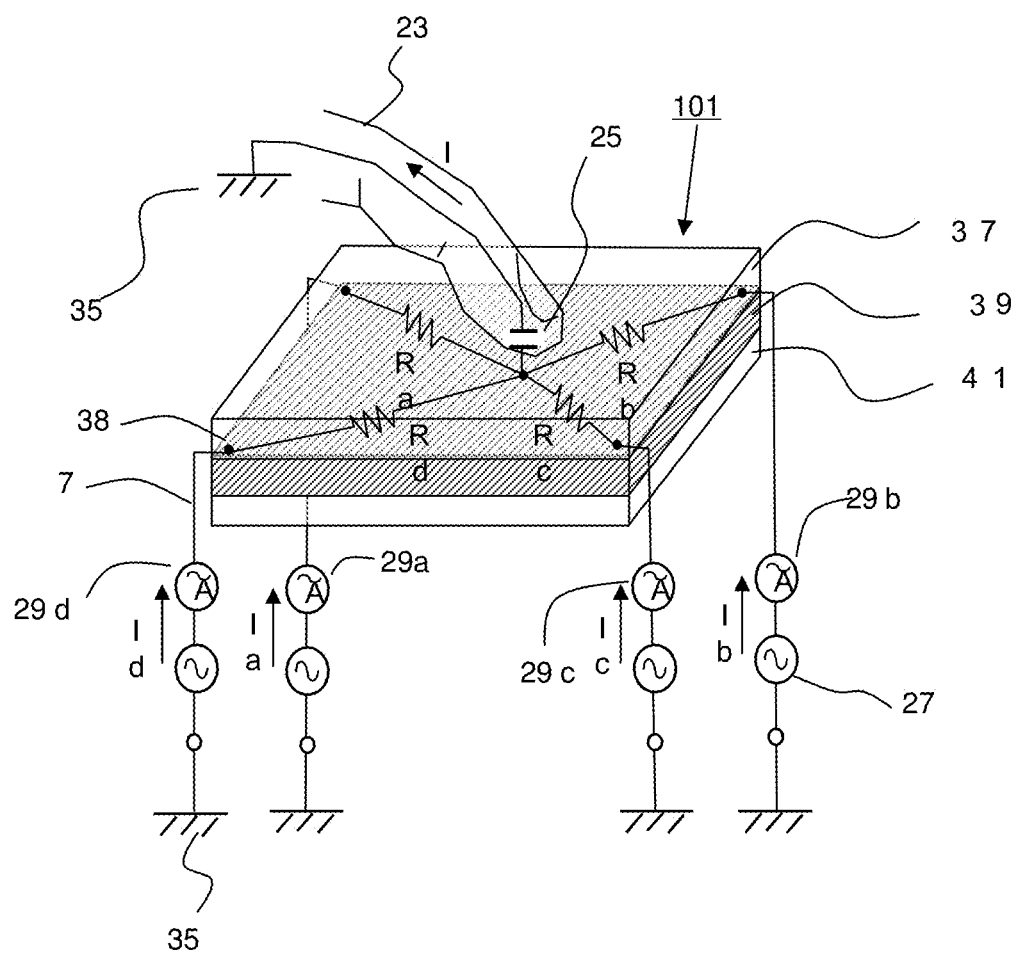
FIG. 5 is an equivalent circuit diagram of a touch sensor function of a touch sensor device according to the present disclosure.
Figure 6:
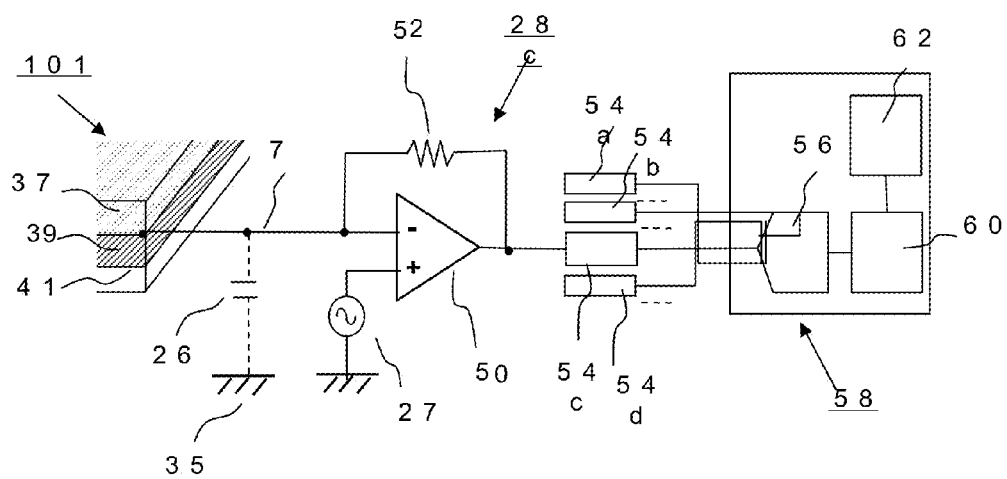
FIG. 6 is a schematic block diagram of a current detection circuit and peripheral functions thereof of a touch sensor device according to the present disclosure.

Next, an electronic apparatus according to the present disclosure will be described. In the following, a monitor will be described as an example of the electronic apparatus according to the present disclosure. FIG. 3 is a schematic perspective view of an electronic apparatus according to the present disclosure. FIG. 4 is a schematic sectional view of the electronic apparatus according to the present disclosure, taken along IV-IV line in FIG. 3. FIG. 5 is an equivalent circuit diagram of a touch sensor function of the electronic apparatus according to the present disclosure. FIG. 6 is a schematic block diagram of a current detection circuit and peripheral functions thereof. In FIGS. 4 to 6, the monitor in FIG. 3 is rotated by 90 degrees clockwise.

An electronic apparatus 1 according to the present disclosure includes the touch sensor device 100 according to the present disclosure. The touch panel 101 includes: an impedance surface 39 such as a transparent conductive layer on an insulating substrate 41; a plurality of electrodes 38 arranged on four corners of the impedance surface 39; and a protective layer 37 covering a surface of the impedance surface 39. An AC voltage outputted from an oscillator is applied to the impedance surface 39 via the plurality of electrodes 38. If a pointer 23 is brought into contact with (near) a surface of the touch panel 101, a capacitance 25 is formed between the pointer 23 and the impedance surface 39. The touch sensor device 100 has a current detection unit including a plurality of current detection circuits 29a to 29d for detecting currents flowing through the plurality of electrodes, respectively. The sum of the currents flowing through the plurality of electrodes 38 is proportional to the capacitance 25 formed between the pointer 23 and the impedance surface 39. Each of the output signals from the plurality of current detection circuits 29a to 29d is converted into a numerical value by sampling and discretization. Based on these numerical values, a signal proportional to the capacitance 25 (hereinafter simply referred to as "signal") is calculated. The signal is outputted at a certain frequency of 30 to 120 Hz. Such impedance surface as used herein includes a three-dimensional structure, and an example of the impedance surface is a transparent conductive layer including an area that is not patterned, the area corresponding to a display unit.

In the mode illustrated in FIG. 4, since the top surface of the outer periphery of the touch panel 101 is fixed to an inner portion of a housing 3 of the electronic apparatus 1, the touch panel 101 is supported. The housing 3 can be made of plastic, for example. Plastic is made of a polymer, has plasticity, and is an insulator. In addition, an LCD 5 as a display device is arranged below the touch panel 101. In FIG. 4, the touch panel 101 and the LCD 5 are separated from each other. However, an adhesive film may be used between the LCD 5 and the touch panel 101 to bond these components by lamination or the like. If the LCD 5 and the touch panel 101 are bonded to each other, since no air layer is present between the LCD 5 and the touch panel 101, light transmission from the LCD 5 to the touch panel 101 is increased, counted as an advantage. Since the LCD 5 is thinner and lighter than other display devices such as a cathode ray tube (CRT) and a PDP, the LCD 5 can be mounted on an electronic apparatus more suitably. The LCD 5 uses a liquid crystal panel including two glass plates sandwiching liquid crystal. By applying a voltage, the direction of liquid crystal molecules is changed, and by increasing/decreasing the light transmission, an image is displayed. To illuminate the liquid crystal, a backlight is arranged behind the liquid crystal panel. The two glass substrates are generally formed by a thin film transistor (TFT) substrate and a counter substrate. Thus, a transmission LCD causing a liquid crystal panel to modulate planar backlight emitted from behind to display an image has been described as an example. However, a reflective LCD may be used, instead. In this case, a metal electrode used as a reflective plate is formed on the above TFT substrate, and ambient light is used to display an image. Alternatively, a semi-transmission LCD including minute holes in the reflective plate in the form of a grid of holes may be used as both a transmission LCD and a reflective LCD.

The touch panel 101 can be formed by forming the transparent conductive layer 39 on the insulating substrate 41 by a sputtering method or the like. The transparent conductive layer 39 can be made of indium tin oxide (ITO), for example. The transparent conductive layer 39 can have a thickness of 10 nm to 300 nm and a sheet resistance of 100Ω to 1000Ω. Four corners of the transparent conductive layer 39 are connected to terminal portions (the electrodes 38) of a flexible printed circuit (FPC) 7, respectively, via conductive and adhesive material such as an anisotropic conductive film (ACF). Alternatively, electrodes made of metal may be formed on four corners of the transparent conductive layer 39. In this case, it is preferred that material having a low contact resistance with respect to the ITO such as silver or titanium be used as the metal. Alternatively, a wiring made of metal may be formed and extended around the outer periphery of the transparent conductive layer 39. In this case, to obtain insulation between the wiring and the ITO, the ITO under the wiring is patterned.

Further, the protective layer 37 covering the transparent conductive layer 39 is formed. The protective layer 37 can be made of glass, plastic, resin, or the like. It is preferred that the protective layer 37 have a thickness of 0.1 mm to 2.0 mm. The thinner the protective layer 37 is, the greater the capacitance 25 formed between the pointer 23 and the transparent conductive layer 39 that are in contact with each other will be. Thus, the signal-to-noise ratio (S/N) of the touch sensor function can be increased. In contrast, the thicker the protective layer 37 is, the greater the resistance to repetitive input operations by the pointer 23 will be.

In the mode illustrated in FIG. 4, since the touch panel 101 is separated from a main substrate 19, the FPC 7 is formed as a wiring transmitting electrical signals. Since there are portions where wirings or substrates need to be bent due to spatial restriction, use of the FPC 7 is preferable. Generally, the FPC 7 is a flexible printed substrate that can be greatly deformed. The FPC 7 can be formed by forming a bonding layer on a film insulating substrate of a thickness of 12 μm to 50 μm and by forming a conductive foil of a thickness of approximately 12 μm to 50 μm on the bonding layer. Portions of the FPC 7, other than the terminal portions and the solder portions, are covered and protected by insulating material.

The other terminal portions of the FPC 7 extended from the transparent conductive layer 39 via the electrodes 38 are connected to the input side of a controller 21 for the touch sensor device 100 via a connector on the main substrate 19. The main substrate 19 is connected to an LCD module including the liquid crystal panel, the backlight, and the like via a connector (not illustrated). A power supply device 18 is connected to the main substrate 19 without a connector. Wirings for a positive power supply voltage +3 V to +15 V, a negative power supply voltage −15 V to −3 V, and a reference voltage 0 V can be arranged for connection between the power supply device 18 and the main substrate 19.

In addition, the main substrate 19 is formed by a surface mount substrate and includes: a chip incorporating a microcontroller 58 and a flash memory; a display interface IC; a power supply control IC; the controller 21 for the touch sensor device 100; and a chip having primary functions of an oscillation circuit IC, for example. Alternatively, the main substrate 19 may be mounted on the thin printed wiring board in which the controller 21 is provided on the FPC 7.

In the mode illustrated in FIG. 5, the controller 21 for the touch sensor device 100 includes the four current detection circuits 29a to 29d and is electrically connected to the four corners of the transparent conductive layer 39 via the respective electrodes 38. In addition, output terminals (AC voltage supply 27) of the oscillation circuit IC are electrically connected to the four corners of the transparent conductive layer 39. The AC voltage can be set as a sinusoidal voltage having an amplitude of 0.5 V to 2 V and a frequency of 20 kHz to 200 kHz.

In the mode illustrated in FIG. 6, the current detection circuit 29c includes a current-voltage conversion circuit 28c located upstream and an AC-DC conversion circuit 54c located downstream. An output terminal of the AC-DC conversion circuit 54c is connected to an analog-digital conversion circuit 56 included in the microcontroller 58. Since this analog-digital conversion circuit 56 can receive multi-channel inputs, four outputs from the AC-DC conversion circuits 54a to 54d can be inputted to the analog-digital conversion circuit 56.

In addition, a CPU 60 is a central processing unit in the microcontroller 58 and is connected to the analog-digital conversion circuit 56, a flash memory 62, and the like. An inventive program of the touch sensor device 100 is stored in the flash memory 62. A nonvolatile memory capable of holding data even when the power supply is turned off is used to store the program, such as the flash memory 62.

Next, an operation of the electronic apparatus 1 including the touch sensor device 100 according to the first exemplary embodiment will be described in detail mainly with reference to FIG. 5.

A sinusoidal voltage is applied from the AC voltage supply 27 to the transparent conductive layer 39, and the transparent conductive layer 39 is maintained at a constant voltage. When the pointer 23 is brought into contact with the surface of the protective layer 37, the capacitance 25 of 5 pF to 50 pF is formed between the pointer 23 and the transparent conductive layer 39 via the protective layer 37. If the pointer 23 is a finger tip, since a human body is conductive, the capacitance 25 formed by a contact with the pointer 23 is connected to a human body potential. Since a human body is connected to ground, one end of the capacitance 25 is connected to ground.

The current associated with this touch is divided into currents Ia to Id, which flow through the current detection circuits 29a to 29d, respectively, via the transparent conductive layer 39. The currents Ia to Id are detected by the current detection circuits 29a to 29d illustrated in FIG. 5, respectively. Namely, the current Ia is a current detected by the current detection circuit 29a, the current Ib by the current detection circuit 29b, the current Ic by the current detection circuit 29c, and the current Id by the current detection circuit 29d. The ratio of the currents Ia to Id varies depending on resistances Ra to Rd of the transparent conductive layer 39. The resistances Ra to Rd vary depending on the position of the pointer 23 into contact with the touch panel 101. The following expressions are examples of the calculation relating to a touch position.

$$X = k1 + k2 \cdot (Ib+Ic)/(Ia+Ib+Ic+Id) \quad \text{(expression 1)}$$

$$Y = k1 + k2 \cdot (Ia+Ib)/(Ia+Ib+Ic+Id) \quad \text{(expression 2)}$$

In expressions 1 and 2, x and y represent x and y coordinates of a touch position, respectively, and k1 and k2 are constants.

Figure 7:
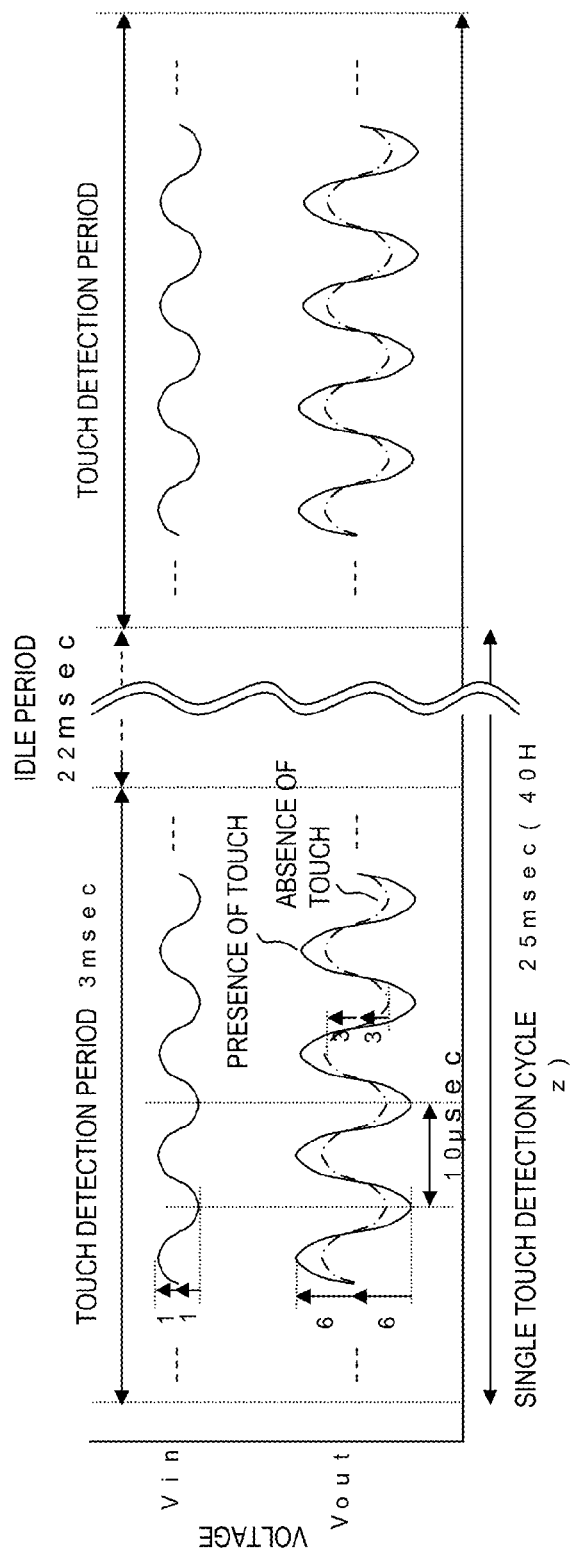
FIG. 7 illustrates an example of voltage waveforms in an operation of a touch sensor device according to the present disclosure.

FIG. 7 illustrates voltage waveforms in an operation of the touch sensor device 100 according to the first exemplary embodiment. In the example illustrated in FIG. 7, a touch detection period is set to 3 msec, and a touch detection period cycle is set to a frequency of 40 Hz. The touch detection period cycle may be set to a frequency of 20 Hz to 120 Hz. In this example, while one cycle is 25 msec, since the touch detection period is 3 msec, the remaining 22 msec is set as an idle period.

In FIG. 7, Vin represents an output waveform from the AC voltage supply 27 and Vout represents an output waveform from the current-voltage conversion circuit 28 included in the current detection circuit 29. In this example, Vin has a frequency of 100 kHz and an amplitude of 1 V. For example, when a touch is absent, Vout has an amplitude of 3V, and when a touch is present, Vout has an amplitude of 6V. Namely, the amplitude is increased by 3 V when a touch is present. In this example, even when a touch is absent, Vout has an amplitude of 3 V. This is because of the presence of a parasitic capacitance (floating capacitance) viewed from the transparent conductive layer 39, and Vin is included in Vout. In reality, even when a human body such as the pointer 23 or a palm is not into contact with the touch panel 101, the analog-digital conversion circuit 56 outputs a signal of a certain level.

In the modes illustrated in FIGS. 5 and 6, since the current detection circuits 29a to 29d output AC voltages, the AC-DC conversion circuits 54a to 54d located downstream thereof convert the AC voltages into DC voltages. In addition, since the DC voltages outputted from the AC-DC conversion circuits 54a to 54d are analog signals, the analog-digital conversion circuit 56 located downstream thereof convert the analog signals into digital signals. Next, based on the converted digital signals, the CPU 60 calculates numerical values. Through such signal processing executed by the current detection circuits 29 to the CPU 60, each of the currents Ia to Id flowing through the current detection circuits 29 (29a to 29d) in a single touch determination cycle is converted into a numerical value (detection signal) proportional to a magnitude of the corresponding current. Thus, numerical values are calculated.

Based on these detection signals, the CPU 60 detects presence of a touch, executes calculation relating to a touch position, and executes a mouse event on an operating system. Examples of the mouse event include movement of a pointer (a mouse cursor) and selection (determination) of an item indicated by a pointer. For example, selection of an item can be executed by a mouse click down when a touch-on determination is made immediately after a pointer is brought into contact, by maintenance of a mouse click down while a pointer is into contact, and by a mouse click up when a touch-off determination is made immediately after a pointer is separated. The microcontroller 58 repeats these operations by causing the CPU 60 to read a program from the flash memory 62, after a power is supplied to the electronic apparatus 1. In this way, the microcontroller 58 automatically executes operations from analog-digital conversion to mouse event processing at a predetermined cycle 40 Hz.

Next, presence of the parasitic capacitance (floating capacitance) viewed from the transparent conductive layer 39 will be described. Each of the current detection circuits 29a to 29d includes an operational amplifier 50 and a resistive element 52, and a non-inverting input terminal of the operational amplifier 50 is electrically connected to the transparent conductive layer 39. While the non-inverting input terminal of the operational amplifier 50 is connected to the transparent conductive layer 39 by a wiring such as the FPC 7, a parasitic capacitance 26 is formed between wirings or between a wiring and a ground 35.

As a countermeasure against this, it is preferred that a baseline correction be executed. In this correction, a signal associated with the parasitic capacitance 26 is held as a baseline, and the signal is subtracted from a newly acquired signal. In this example, signals that correspond to the current detection circuits 29a to 29d and that are outputted from the analog-digital conversion circuit 56 will be represented as detection signals a to d. In addition, detection signals a to d acquired when the touch sensor device 100 determines that no human body such as the pointer 23 or a palm is near (i.e., at proximity of) the touch panel 101 will be represented as baselines a to d. As represented in the following expression 3, a sum of the detection signals a to d will be represented as a detection signal value h(iT). In addition, as represented in the following expression 4, a sum of the baselines a to d will be represented as a baseline BL. The baseline BL is stored in the reference storage unit 104. In addition, as represented in expression 5, the reference calculation unit 103 subtracts the baseline BL from the detection signal value h(iT) to calculate the signal output value f(iT).

Detection signal value $h(iT)$=detection signal $a$+detection signal $b$+detection signal $c$+detection signal $d$ (expression 3)

Baseline BL=baseline $a$+baseline $b$+baseline $c$+baseline $d$ (expression 4)

Signal output value $f(iT)$=detection signal value $h(iT)$−baseline BL (expression 5)

According to the present exemplary embodiment, after a touch-on determination, if the signal increases, a threshold (first threshold Th1) for a touch-off determination corresponding to the touch-on determination is updated. On the other hand, if the signal is constant or decreases, the first threshold Th1 is not updated. Next, the signal is compared with the first threshold Th1, and if the signal falls below the first threshold Th1, a touch-off determination is made. When a pointer is separated, the signal tends to decrease monotonously with time. Suppose that the first threshold Th1 be not updated while the signal is decreased. In this case when a pointer is completely separated from the surface of the touch panel, the signal greatly decreases. Thus, when the signal falls below the first threshold Th1, a touch-off determination is made. On the other hand, when a pointer is brought into contact with the surface of the touch panel and a drag operation is executed, the signal tends to increase and decrease repeatedly. During a period in which the signal is increasing, the signal is acquired, and based on this acquired signal, the first threshold Th1 is calculated and updated. Thus, when the signal generally decreases while repeating increase and decrease, the first threshold Th1 can be adjusted to be low. Thus, erroneous touch-off determination(s) during a drag operation can be prevented. Therefore, when a pointer is in contact with the surface of the touch panel, an erroneous touch-off determination can be prevented, and when a pointer is separated, a touch-off determination is made accurately, counted as a meritorious effect.

Figure 8:
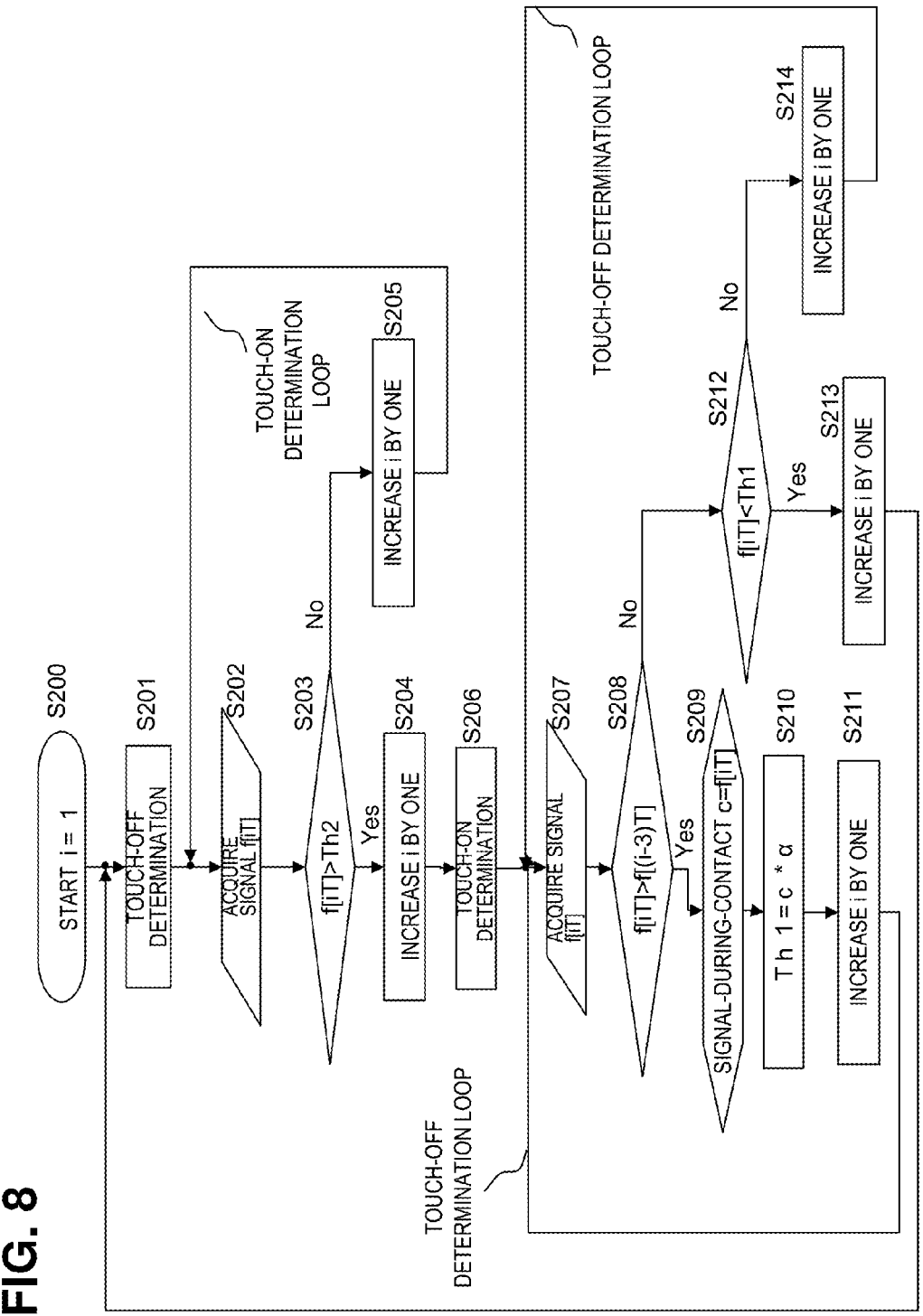
FIG. 8 is a flow chart illustrating a method for operating and controlling a touch sensor device according to a second exemplary embodiment of the present disclosure and a program for operating the touch sensor device.

Next, a touch sensor device according to a second exemplary embodiment will be described. FIG. 8 is a flow chart illustrating a method for operating and controlling a touch sensor device according to a second exemplary embodiment of the present disclosure and a program for operating the touch sensor device. Hereinafter, configurations substantially the same as those according to the first exemplary embodiment will be denoted by the same reference symbols according to the first exemplary embodiment. Portions different from the first exemplary embodiment will be described mainly. According to the first exemplary embodiment, a common threshold (first threshold) is used for a touch-off determination and a touch-on determination. However, according to the second exemplary embodiment, different thresholds are used for a touch-on determination and a touch-off determination. The threshold used for a touch-off determination will be hereinafter referred to as a first threshold Th1 and the threshold for a touch-on determination as a second threshold Th2.

According to the first exemplary embodiment, the first threshold Th1 is updated as needed, based on a signal during a contact. In this case, there is a possibility that the first threshold Th1 calculated based on a signal during a previous contact is an inappropriate value for the current touch-on determination, depending on the difference between the signal during the previous contact and a signal during the current contact. For example, there is a possibility that an output value of a signal during a contact is significantly high. If a signal during a previous contact is significantly high, the first threshold Th1 is also increased to be significantly high. As a result, a touch-on determination will be more difficult in the current touch determination. On the other hand, if a signal during a previous contact is significantly low, the first threshold Th1 is also decreased to be significantly low. As a result, even when a finger tip is not into contact with the touch panel, close presence of a palm may cause an erroneous touch-on determination in the current touch determination.

Thus, according to the second exemplary embodiment, while the first threshold Th1 used for a touch-off determination is updated as in the first exemplary embodiment, the second threshold Th2 used for a touch-on determination is not updated. Namely, the second threshold Th2 is set as a constant (fixed value). A signal associated with a palm near the surface of the touch panel or a signal associated by a wandering finger is measured in advance, and the second threshold Th2 is set sufficiently higher than output values of these signals. For example, the second threshold Th2 is set to be 3 pF to 5 pF higher than an output value of the signal associated with a palm near the surface of the touch panel. When measuring the signal associated with a palm present near the surface of the touch panel, it is preferred that the distance between the touch panel and the palm be set to 5 mm to 50 mm. This is because, while a palm can be brought near the surface of the touch panel without a contact, the minimum distance is approximately 5 mm, and the distance between the palm and the surface of the touch panel is 30 mm to 50 mm when a finger is wandering. The second threshold Th2 is stored in the threshold storage unit 109, along with the first threshold Th1. Regarding a touch-on determination, when a finger tip is brought into contact, if the touch panel does not respond (mouse event), the user is motivated to touch the touch panel, again. The user tries to touch the touch panel more deeply next time. Touching the touch panel more deeply increases the contact area between the surface of the touch panel and the finger tip. This observation is based on an idea that if a finger tip is brought into contact with a touch panel shallowly for example, a touch-on determination is not always made.

In the mode illustrated in FIG. 8, in S203, the signal output value f[iT] is compared with the second threshold Th2 for a touch-on determination. Other steps are the same as those in the mode illustrated in FIG. 2.

According to the present exemplary embodiment, a threshold (the second threshold Th2) for a touch-on determination is set as a constant, and the value of the second threshold Th2 is set to be sufficiently higher than a signal associated with a wandering finger or the like. Thus, a meritorious effect of preventing an erroneous touch-on determination is obtained.

Figure 9:
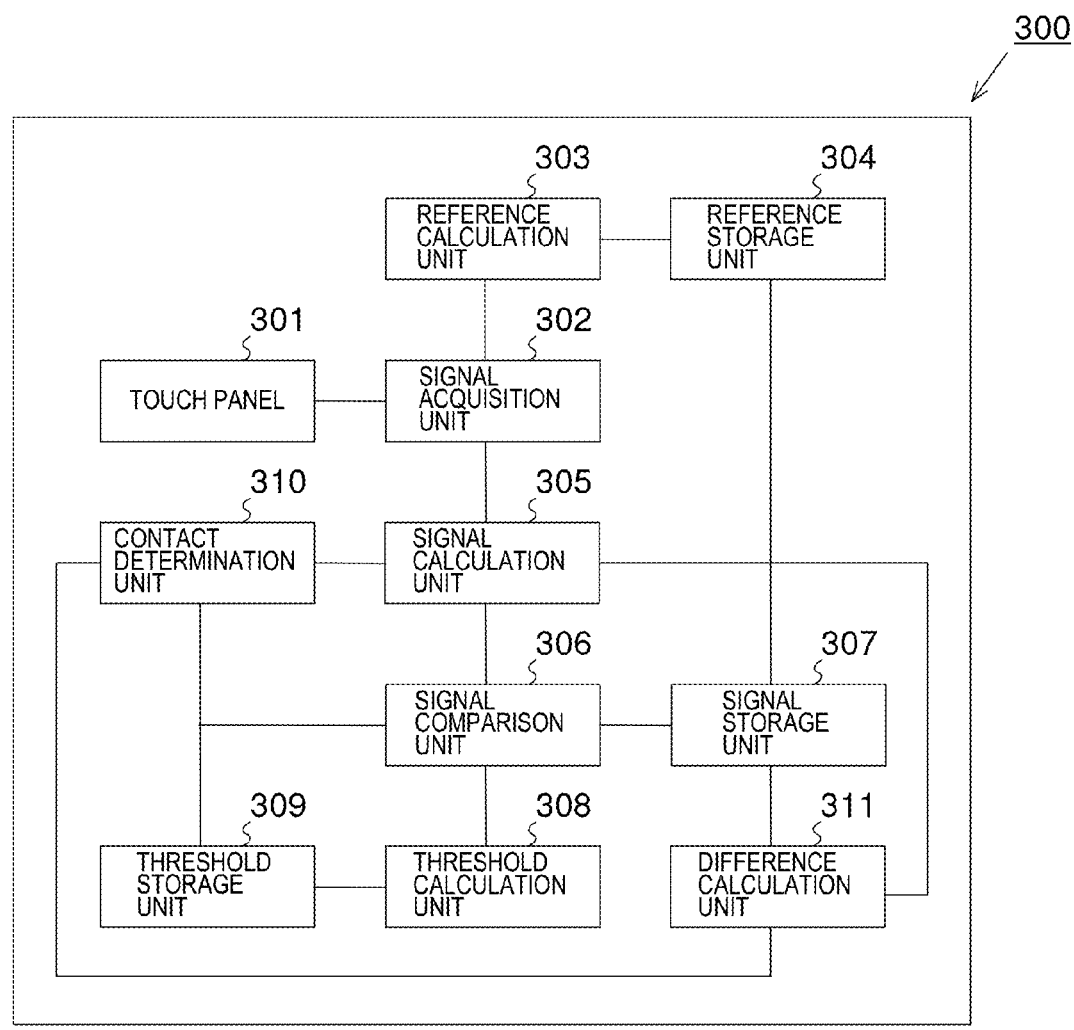
FIG. 9 is a schematic block diagram of a touch sensor device according to a third exemplary embodiment of the present disclosure.

A touch sensor device according to a third exemplary embodiment of the present disclosure will be described. FIG. 9 is a schematic block diagram of a touch sensor device according to the third exemplary embodiment of the present disclosure. According to the third exemplary embodiment, in addition to comparison between a signal output value and a threshold, a magnitude of a signal change in a predetermined unit time (second unit time) (hereinafter, "first signal difference value") is also used as an index for a touch determination.

A touch sensor device 300 according to the third exemplary embodiment further includes a difference calculation unit 311, in addition to the configurations according to the first exemplary embodiment. The difference calculation unit 311 calculates a first signal difference value per predetermined time, based on a signal output value calculated by the signal calculation unit 305 and a signal output value stored in the signal storage unit 307.

Figure 10:
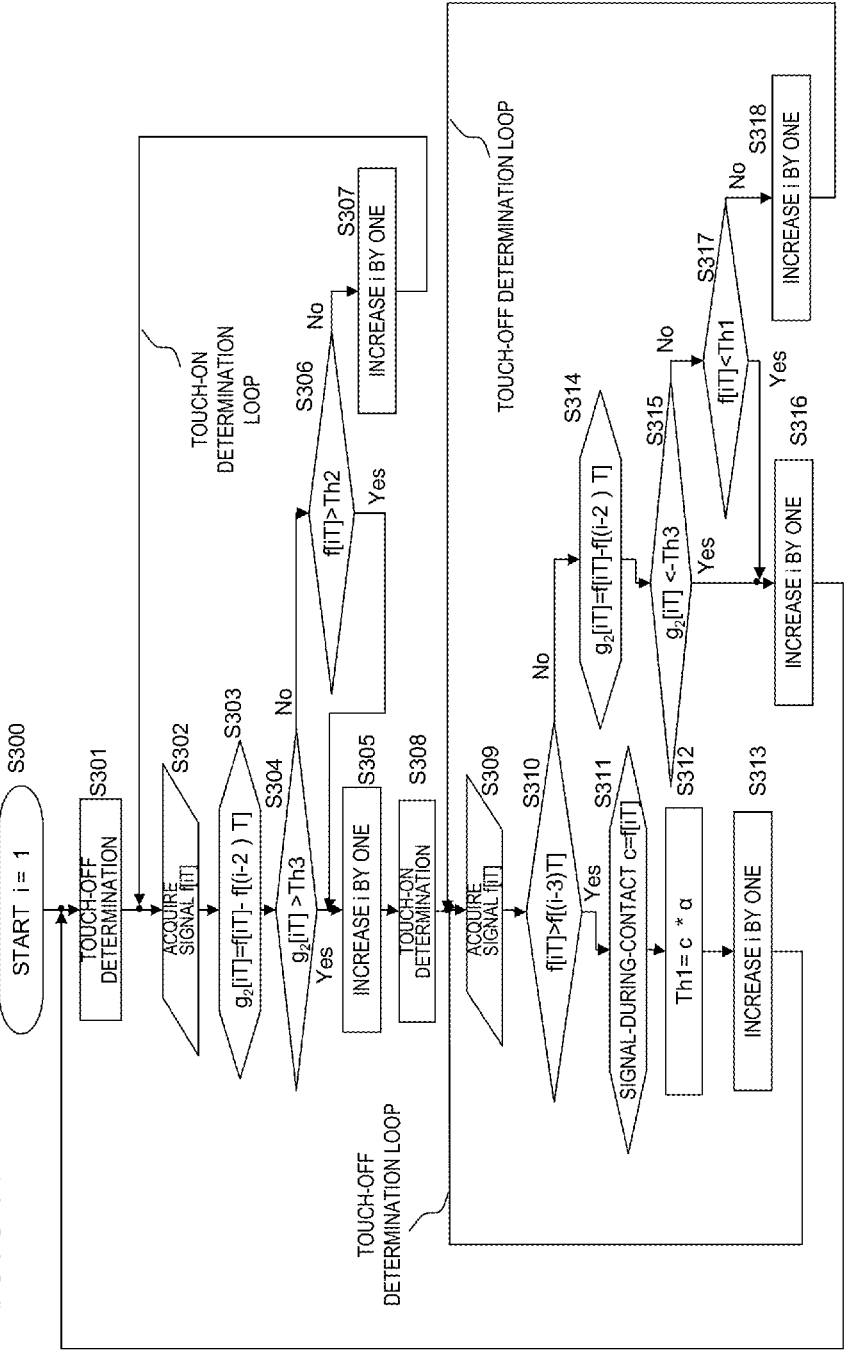
FIG. 10 is a flow chart illustrating a method for operating and controlling a touch sensor device according to a third exemplary embodiment of the present disclosure and a program for operating a touch sensor device.

Next, a method for operating and controlling the touch sensor device 300 and a program for operating the touch sensor device 300 will be described. FIG. 10 is a flow chart illustrating a method for operating and controlling the touch sensor device according to the third exemplary embodiment of the present disclosure and a program for operating the touch sensor device.

First, after the operation is started (S300), a contact determination unit 310 makes a touch-off determination, as in the first exemplary embodiment (S301). Next, a signal acquisition unit 302 acquires a signal in the i-th touch determination. A signal calculation unit 305 calculates the signal output value f[iT], as in the first exemplary embodiment.

Next, the difference calculation unit 311 calculates a first signal difference value gj[iT] in a second unit time jT (S303). The first signal difference value gj[iT] is calculated by f[iT]-f[(i−j)T]. Based on the mode illustrated in FIG. 10, coefficient j for determining the second unit time is 2. For example, if T is 25 msec, the second unit time is 50 msec. The signal output value f[(i−2)T] is signal data acquired in the (i−2)th loop and stored in a signal storage unit 307. However, if n is 3 or less, f[(i−2)T] is set to f[1T].

Next, the contact determination unit 310 compares the first difference value g2[iT] calculated by the difference calculation unit 311 with a third threshold Th3 set in a threshold storage unit 309 (S304). If the first difference value g2[iT] exceeds the third threshold Th3, i is increased by one (S305), and the contact determination unit 310 makes a touch-on determination (S308).

In S304, if the first difference value g2[iT] is equal to or greater than the third threshold Th3, as in the first or second exemplary embodiment, the contact determination unit 310 compares the signal output value f[iT] with the first threshold Th1 or the second threshold Th2 (S306). In the mode illustrated in FIG. 10, as in the second exemplary embodiment, the second threshold Th2 set as a constant is used. If the signal output value f[iT] exceeds the second threshold Th2, i is increased by one (S305), and the contact determination unit 310 makes a touch-on determination (S308). However, in S306, if the signal output value f[iT] is equal to or less than the second threshold Th2, i is increased by one (S307), and the operation returns to S302. In this case, the contact determination unit 310 does not make a touch-on determination.

Next, after the touch-on determination (S308), the signal calculation unit 305 calculates the signal output value f[iT] in the i-th touch determination (S309).

Next, as in the first exemplary embodiment, a signal comparison unit 306 compares the i-th signal output value f[iT] with the (i−q)th signal output value f[(i−q)T] (S310). In the mode illustrated in FIG. 10, q=3. If the i-th signal output value f[iT] falls below the (i−3)th signal output value f[(i−3)T], as in S303, the difference calculation unit 311 calculates the first difference value g2[iT]=f[iT]-f[(i−2)T] (S314). Next, the contact determination unit 310 compares the first difference value g2[iT] with a negative third threshold −Th3 (S315). If the first difference value g2[iT] falls below the negative third threshold −Th3, i is increased by one (S316), and the contact determination unit 310 makes a touch-off determination (S301). On the other hand, in S315, if the first difference value g2[iT] is equal to or greater than the negative third threshold −Th3, the contact determination unit 310 compares the signal output value f[iT] with the first threshold Th1 (S317). If the signal output value f[iT] falls below the first threshold Th1, i is increased by one (S316), and the contact determination unit 310 makes a touch-off determination (S301). In S317, if the signal output value f[iT] is equal to or greater than the first threshold Th1, i is increased by one (S318), and the operation returns to S309. In this case, the contact determination unit 310 does not make a touch-off determination.

In S304 and S306, and S315 and S317, comparison between the first difference value and the third threshold and comparison between the signal output value and the first threshold are used for a touch determination. If a touch or a separation of a pointer is slow, the difference value per unit time is small. While a touch determination cannot be made in S304 and S315, by using also the signal output value in S306 and S317, a touch determination can be made accurately. For example, even if a finger tip is separated, suppose a case where a touch-off determination be not made, a mouse click down (pointer selection) is maintained. Since the position (coordinates) of a pointer is calculated based on a signal irrelevant to a contact with the pointer, the position (coordinates) exhibits a random value. As a result, pointer selection and determination are made at a position (coordinates) different from the intention of the user. This phenomenon is an erroneous operation and causes a significantly serious situation where the touch sensor device cannot return to the original normal state automatically.

In the above mode, for example, while the positive and negative signs are compared in S304 and S315, respectively, the absolute values of the difference value may be compared with the absolute value of the threshold.

It is preferred that the absolute value of the third threshold Th3 be set to 1 pF to 3 pF. As long as the absolute value is in this range, when a finger tip is brought into contact with or separated from the touch panel, a touch determination can be made, whether a user wears a bare hand or a glove.

It is preferred that the second unit time be set to 8 msec to 100 msec. By setting the second unit time in view of an amount of time required for a signal change, influence associated with close presence of a palm can be reduced significantly in a touch determination. In addition, influence associated with a wandering (or stalling) finger, which causes a palm to continuously remain near the touch panel, can be reduced significantly. This is because a movement in which a palm is brought near the surface of the touch panel and is moved horizontally is significantly slower than a finger tip contact movement.

In the above mode, while the difference value is used for both a touch-on determination and a touch-off determination, the difference value may be used only for one of the determinations. In addition, in the above mode, while the third threshold Th3 is used as a common threshold for both a touch-on determination and a touch-off determination, the third threshold Th3 may be set to have a different value between a touch-on determination and a touch-off determination.

Other modes according to the third exemplary embodiment are the same as those according to the first exemplary embodiment. In the above description, the third exemplary embodiment is combined with the second exemplary embodiment. However, the third exemplary embodiment can be combined with the first exemplary embodiment that does not use the second threshold Th2.

According to the third exemplary embodiment, even if a user wears a glove or even if the touch panel 301 has a thick cover glass (protective layer), a touch determination can be made appropriately. By increasing the thickness of the cover glass, durability of the touch sensor device can be improved. In particular, in a touch determination using only the difference value, if the user wears a glove, there is a possibility that an erroneous touch-off determination is made. However, by combining the touch-off determination according to the first exemplary embodiment with the touch determination using the difference value, even when a user wears a glove, a touch-off determination can be made accurately.

Based on the touch sensor device according to the first to third exemplary embodiments, after a touch-on determination is made, the first threshold Th1 for a touch-off determination varies between when the signal output value is decreased at a constant rate and a touch-off determination is made and when the signal output value is increased and decreased periodically and is decreased as a whole and a touch-off determination is determined. Namely, the first threshold Th1 can be set to lower in the case where the signal output value is increased and decreased periodically.

Regarding the distance between a pointer and the touch panel, the distance between the pointer and the touch panel for a touch-off determination can be increased in the case where the signal output value is increased and decreased periodically and is decreased as a whole and a touch-off determination is made, compared with a case where the signal output value is decreased at a constant rate and a touch-off determination is made.

If the signal output value is increased and decreased periodically, it is preferred that the frequency of a cycle in which the signal exhibits a decrease and an increase be set to 2.5 Hz or less. This is because, since it is preferred that the first unit time, which is a unit time for determining whether the signal is increasing or not, be 200 msec or less, to sample increase and decrease of the signal as a sinusoidal wave, the cycle of increase and decrease of the signal needs to be 400 msec or more. In 1 cycle, a magnitude of a decrease of the signal output value is set to be larger than a magnitude of an increase of the signal output value, and the absolute value of the magnitude of the decrease is set to be larger than the absolute value of the increase by 1 pF to 3 pF. In addition, if the signal decreases in the first cycle and the signal output value falls below the first threshold Th1, the distance L for a touch-off determination cannot be sufficiently increased. Thus, a signal decrease amount is set so that, when the signal decreases in the first cycle, the signal output value does not fall below the first threshold Th1. On the other hand, if the signal output value is decreased at a constant rate, the signal output value is decreased by 0.12 pF per second. The first threshold Th1 is updated, for instance, as follows: Th1=current signal output value c×sensitivity α (=0.6).

Thus, by repeating raising and lowering of a pointer to separate the pointer from the surface of the touch panel, signal transition during a drag operation can be created. Namely, it is possible to confirm meritorious effects provided by updating of the first threshold Th1 used in the touch sensor device.

The electronic apparatus according to the present disclosure includes the touch sensor device according to the present disclosure. Examples of the electronic apparatus according to the present disclosure include a game machine, a mobile information terminal, a PDA, a car navigation system, a notebook computer, a mobile DVD player, a video game machine attached to passenger seats on airplanes or buses, and factory automation (FA) equipment.

A computer program according to the present disclosure can cause a touch sensor device to realize the above functions or procedures, at least partly or dominantly.

Figure 11:
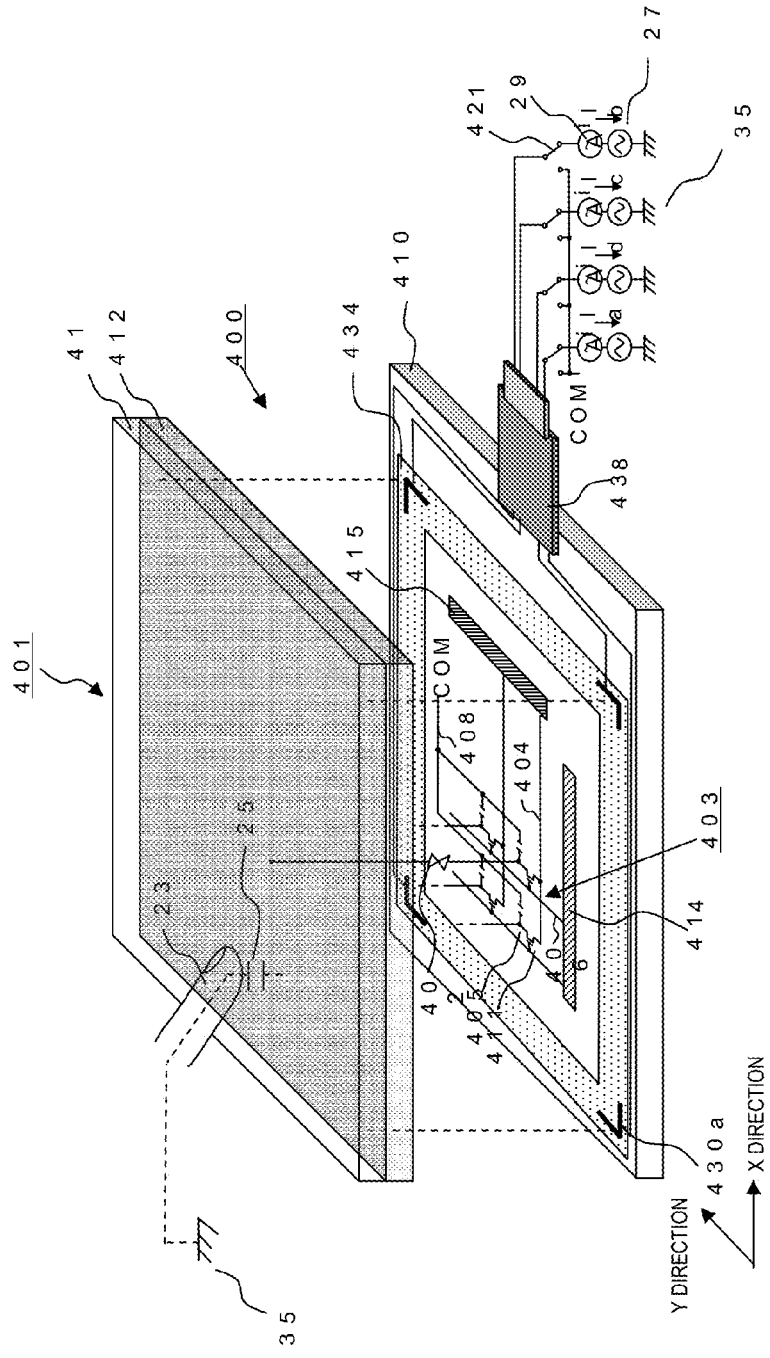
FIG. 11 is a schematic exploded perspective view of an electronic apparatus according to a fourth exemplary embodiment of the present disclosure, the electronic apparatus including a touch sensor device according to the present disclosure.
Figure 12:
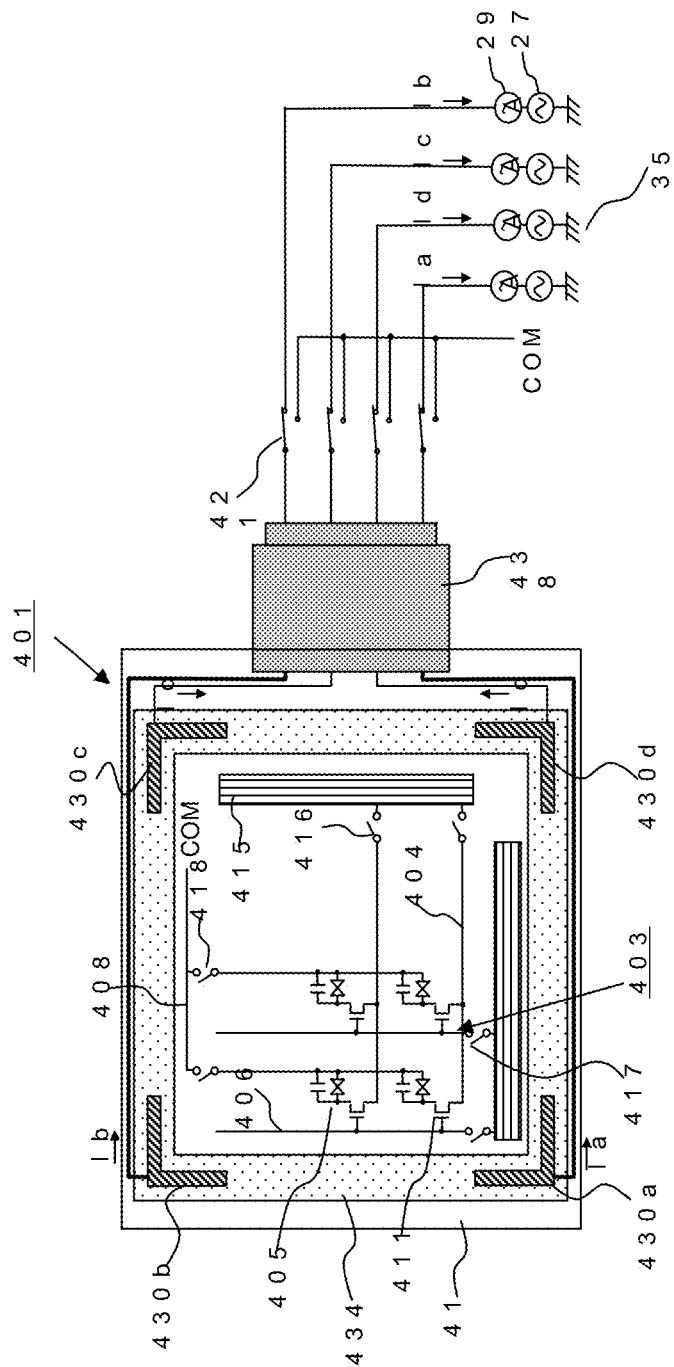
FIG. 12 is a schematic plan view of the electronic apparatus in FIG. 11.

Next, an electronic apparatus according to a fourth exemplary embodiment of the present disclosure will be described. FIG. 11 is a schematic exploded perspective view of an electronic apparatus according to the present disclosure including the touch sensor device of the present disclosure. FIG. 12 is a schematic plan view of the electronic apparatus in FIG. 11. FIGS. 11 and 12 illustrate an LCD as the electronic apparatus. In FIG. 12, illustration of a counter substrate is omitted. In FIGS. 11 and 12, to facilitate comprehension, portions that are not cross-sections are also illustrated by hatching. In addition, in FIGS. 11 and 12, elements identical to those according to the above exemplary embodiments are denoted by identical reference symbols.

An electronic apparatus 401 according to the fourth exemplary embodiment includes a touch sensor device 400 according to the present disclosure. The electronic apparatus 401 includes: a counter electrode 412; pixel electrodes 405; wirings 404, 406, and 408; and liquid crystal 402 between the counter electrode 412 and the group of wirings 404, 406, and 408. The counter electrode 412 also serves as an impedance surface. The electronic apparatus 401 further includes switch units 416, 417, 418, and 421 for electrically floating at least a portion of the wirings 404, 406, and 408 or for electrically floating at least a portion of the wirings 404, 406, and 408 and applying an AC voltage applied to the impedance surface to at least a portion of the wirings 404, 406, and 408. The LCD 401 has a three-layer structure of the counter electrode 412, the liquid crystal 402, and the pixel electrodes 405, and the counter electrode 412 also serves as an impedance surface. The LCD 401 further includes the switch units 416, 417, 418, and 421 applying an AC voltage applied to the impedance surface to a storage capacitor line 408 at the same time or electrically floating a scanning line 406.

Based on a current detected by the current detection circuit 29, the signal output value and the difference value are calculated and used for a touch-on determination and a touch-off determination. Since operations relating to a touch-on determination and a touch-off determination are the same as those in the above first to third exemplary embodiments, description thereof will be omitted herein.

According to the first exemplary embodiment, the touch sensor device is manufactured separately from the display device. However, according to the fourth exemplary embodiment, the LCD 401 is used as a display device, and a surface capacitive coupling touch sensor device 400 is incorporated. For example, a transparent conductive layer used for the counter electrode 412 of the LCD 401 is used as an impedance surface. In this way, the manufacturing process for the touch sensor device 400 and the electronic apparatus 401 can be simplified, and manufacturing costs can be reduced. In addition, since the touch sensor device 400 does not require a dedicated substrate, the touch sensor device 400 can be lighter and thinner. In addition, since light transmission is increased, image quality of the display device is improved, counted as a meritorious effect.

However, since the counter electrode 412 is present near a TFT substrate 410 via the liquid crystal element 402, significantly large capacitance such as the liquid crystal element 402 is present. Thus, depending on potentials of the electrodes and wirings (the storage capacitor lines 408, the signal lines 404, and the scanning lines 406, for example) on the TFT substrate 410, an electric potential difference is caused between the counter electrode 412 and the TFT substrate 410. Thus, the counter electrode 412 also serving as an impedance surface is affected by the significantly large parasitic capacitance. As a result, the S/N of the touch sensor function is decreased, making it difficult to sense presence of a touch and accurately detect the position of the touch.

Thus, according to the fourth exemplary embodiment, a display period and a position detection period are temporally separated. In the position detection period, by bringing a display area 403 in a high-impedance state with respect to the outside thereof, the display area 403 is electrically floated. Alternatively, in the position detection period, the same voltage applied to the counter electrode 412 is applied to electrodes and wirings on the TFT substrate 410. As a result, because of capacitive coupling between the display area 403 and the counter electrode 412, the display area 403 is held at the same potential as that of the counter electrode 412. Thus, since the potential of the display area 403 follows the potential of the counter electrode 412, influence of the parasitic capacitance on the counter electrode 412 can be reduced significantly.

The electronic apparatus 401 according to the fourth exemplary embodiment will be described in detail. According to the fourth exemplary embodiment, switch elements are arranged on wirings for transmitting electrical signals from the outside of the display area to the inside of the display area. Specifically, the first to third high-impedance switch units 416 to 418 are arranged on wiring portions for transmitting electrical signals from a second circuit portion (a scanning line driving circuit 414, a signal line driving circuit 415, and the like) located outside the display area 403 to a first circuit portion (TFT 411 and the like) located inside the display area 403.

The second circuit portion located outside the display area 403 may be formed on a single substrate with the first circuit portion located inside the display area 403 or may be formed on an external substrate. If the second circuit portion located outside the display area 403 is arranged on a single substrate with the first circuit portion located inside the display area 403, it is preferred that the high-impedance switch units 416 to 418 be arranged on wiring portions connecting the outside of the display area 403 to an external substrate. Specifically, it is preferred that the wiring portions on which high-impedance switch units 416 to 418 are arranged be at least one of the signal lines 404, the scanning lines 406, the storage capacitor lines 408, and the power supply lines (not illustrated).

In addition, it is preferred that a switching control circuit for controlling the high-impedance switch units 416 to 418 be arranged. It is preferred that the switching control circuit controls at least one of the wiring portions for transmitting electrical signals from the outside of the display area 403 to the inside of the display area 403 to be in a high-impedance state, in a period in which the current detection circuit 29 detects a current.

The high-impedance switch units 416 to 418 and the switching control circuit can form an impedance control unit. This impedance control unit may be formed on the TFT substrate 410 or on a separate control circuit substrate.

This impedance control unit can bring the first circuit portion inside the display area 403 of the TFT substrate 410 to be in an electrically high-impedance state with respect to the second circuit portion outside the display area 403, in a detection period in which the position of a contact is detected. In addition, this impedance control unit can include: the high-impedance switch units 416 to 418 formed on the wiring portions connecting the first and second circuit portions; and the switching control circuit controlling on/off of the high-impedance switch units 416 to 418.

Next, an operation of the high-impedance switch units 416 to 418 will be described. To achieve an electrically high-impedance state between the first circuit portion inside the display area 403 (inside the pixel matrix portion) and the second circuit portion located around the outer periphery of the display area 403, the outer periphery of the display area 403 is configured as follows. The individual first to third high-impedance switch units 416 to 418 are arranged on the signal paths of the scanning lines 406, the signal lines 404, and the storage capacitor lines 408, respectively. The switching control circuit controls switching of the high-impedance switch units 416 to 418. In this way, the scanning lines 406 and the signal lines 404 for transmitting electrical signals from the outside of the display area 403 to the inside of the display area 403 can be brought in a high-impedance state.

A vertical blanking interval is used for a position detection period. As illustrated in FIG. 12, all of the high-impedance switch units 416 to 418 are in an off-state in a position detection period. In this state, the signal lines 404, the scanning lines 406, and the storage capacitor lines 408 are brought in a high-impedance state with respect to the wirings outside the display area 403 (wirings connected to the scanning line driving circuit 414, the signal line driving circuit 415, and a common electrode COM).

In addition, in a position detection period, the COM-current detection circuit changeover switch unit 421 is brought in a conductive state with respect to the AC voltage supply 27 side including the current detection circuits 29. In the switch state illustrated in FIG. 12, in-phase AC voltages generated by the AC voltage supply 27 are applied to electrodes 430a to 430d near four corners of the TFT substrate 410. Since the electrodes 430a to 430d are electrically connected to the counter electrode 412 via an anisotropic conductor 434, the AC voltages are applied to portions near four corners of the counter electrode 412.

Figure 13:
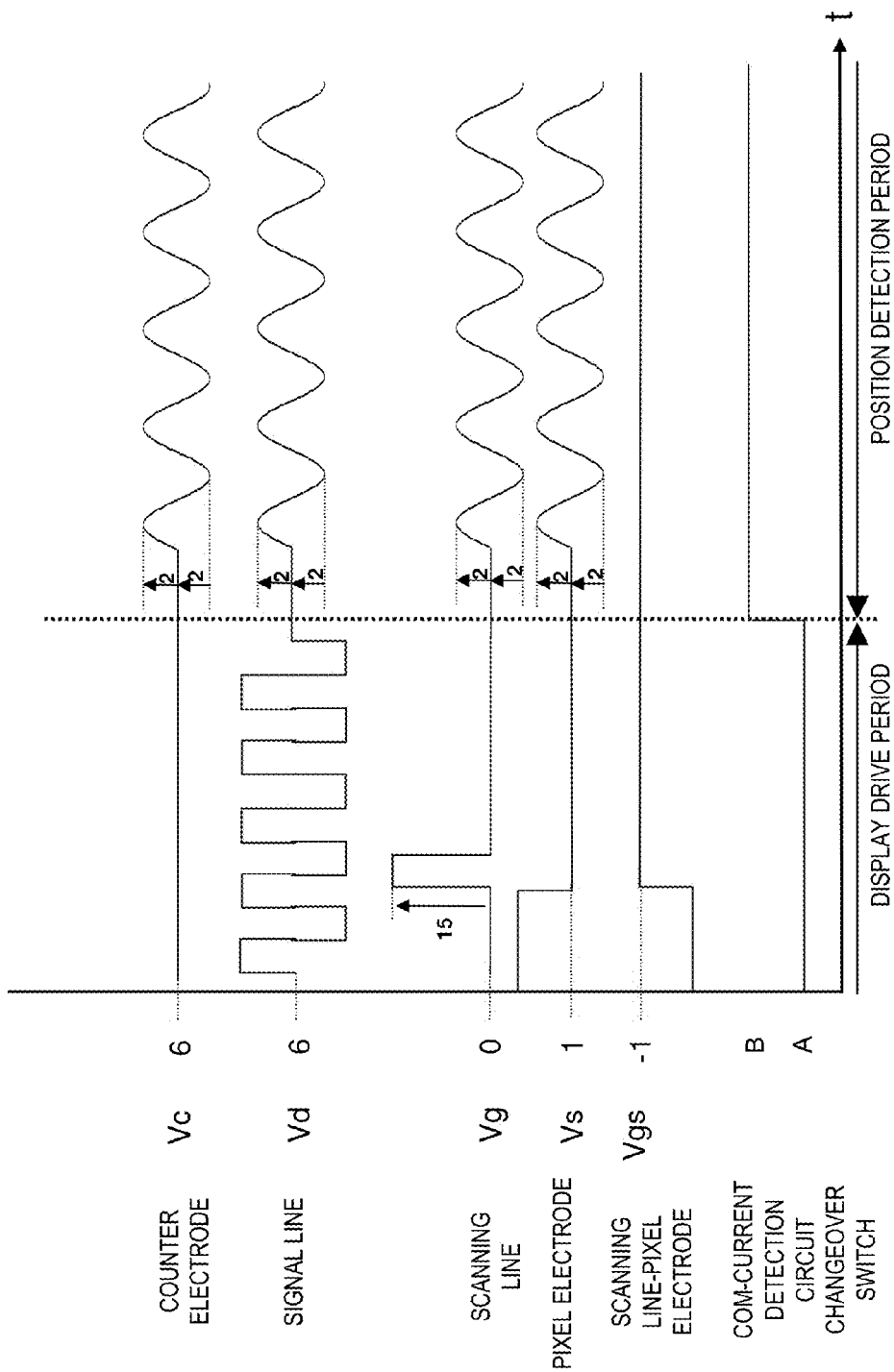
FIG. 13 is a voltage timing diagram of an electronic apparatus according to a fourth exemplary embodiment.

FIG. 13 is a timing diagram illustrating voltages at portions of the electronic apparatus 401 according to the fourth exemplary embodiment. The voltages applied to the counter electrode 412, the signal lines 404, the scanning lines 406, and the pixel electrodes 405 are denoted by Vc, Vd, Vg, and Vs, respectively. The difference between the voltage Vg applied to the scanning lines 406 and the voltage Vs applied to the pixel electrodes 405 is denoted by Vgs. The counter electrode 412, the signal lines 404, the scanning lines 406, and the pixel electrodes 405 are electrically connected to the common electrode COM or the current detection circuits 29 via wirings. The COM-current detection circuit changeover switch unit 421 is used for switching between the common electrode COM and the current detection circuits 29.

In addition, a position detection period is set after a display drive period. While FIG. 13 illustrates examples of the individual voltages, since the voltage Vd applied to the signal lines 404 varies depending on a write signal, no particular numerical value is given. Referring to the voltage timing diagram of FIG. 13, in a position detection period, each of the scanning lines 406 is in a high-impedance state and exhibits capacitive coupling with the counter electrode 412. Thus, the voltage Vg of the scanning lines 406 fluctuates with the same amplitude as that of the voltage of the counter electrode 412.

As described above, according to the fourth exemplary embodiment, the same meritorious effects provided by the first exemplary embodiment are provided. In addition, in a position detection period, circuits (pixel electrodes 405 and the like) located inside the pixel matrix are brought in a high-impedance state relative to the external circuits. Thus, when an AC voltage is applied to the counter electrode 412, the parasitic capacitance viewed from the counter electrode 412 is significantly small. Specifically, in a related technique (a configuration in which the display area is not electrically floated), the parasitic capacitance is 15 nF, for example. However, according to the fourth exemplary embodiment, the parasitic capacitance is decreased to 100 pF, for example. As a result, according to the fourth exemplary embodiment, the S/N ratio of signals outputted from the current detection circuits 29 is $6 \times 10^{-2}$, for example. This S/N ratio is 140 times greater than the S/N ratio $4 \times 10^{-4}$, for example, in the related technique.

In addition, since both the gate and source voltages of the TFT 410 vary with the same voltage amplitude of the counter electrode 412 in a position detection period, a relative difference between the gate and source voltages is constant. Thus, Vgs applied to a transistor does not fluctuate. As a result, deterioration of image quality by driving in a position detection period can be minimized, counted as a particularly meritorious effect.

In the present exemplary embodiment, N-channel TFTs are used for the high-impedance switch units 416 to 418 achieving an electrically high-impedance state between the inside and the outside of the display area 403. However, P-channel TFTs or transfer gates in which N-channel and P-channel transistors are combined may be used for these high-impedance switch units.

Thus, the manufacturing process for the touch sensor device 400 and the electronic apparatus 401 can be simplified, and manufacturing costs can be reduced. In addition, since the touch sensor device 400 does not require a dedicated substrate, the touch sensor device 400 can be lighter and thinner. In addition, since light transmission is increased, image quality of the display device is improved, counted as a meritorious effect.

The insulating substrate 41 and a polarizing plate are present between the counter electrode 412 as a touch-detection impedance surface and the pointer 23. For example, the thickness of the insulating substrate 41 can be set to 0.2 mm to 1.0 mm, and the thickness of the polarizing plate can be set to 0.1 mm to 0.3 mm. In this case, the distance between the pointer 23 and the counter electrode 412 is increased. Consequently, compared with the touch sensor device and the display device that are assembled together externally, based on the electronic apparatus 401 according to the present exemplary embodiment, there are cases where the capacitance formed by the pointer 23 and the counter electrode 412 is smaller. Accordingly, since the influence of a signal associated with close presence of a palm or the like is increased, there are cases where an accurate touch determination is difficult. Thus, based on the configurations according to the first to third exemplary embodiments, the electronic apparatus 401 can reduce the influence associated with close presence of a palm, while capturing transition of a signal associated with a contact with a pointer. In this way, an accurate touch determination can be made when a pointer is separated, counted as a meritorious effect. Other configurations, operations, and meritorious effects are the same as those according to the first to third exemplary embodiments.

Figure 14:
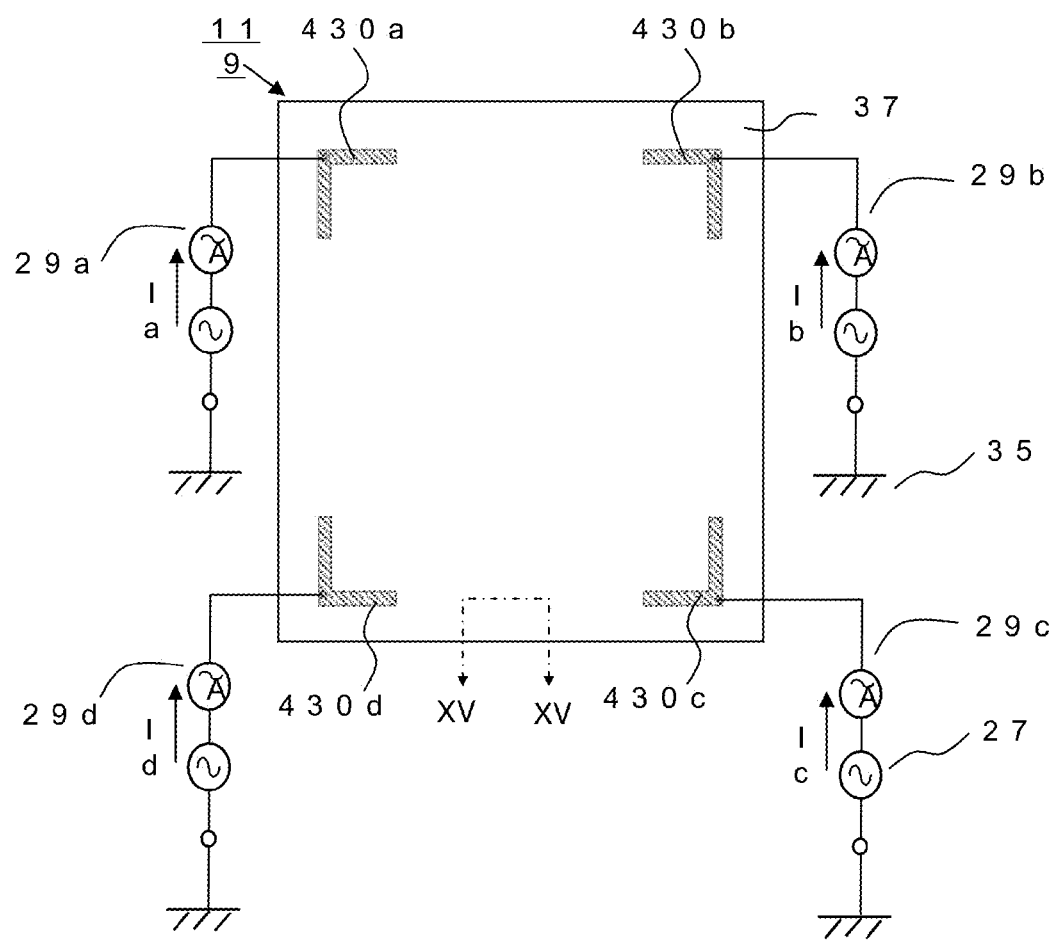
FIG. 14 is a schematic plan view of a counter substrate of an electronic apparatus according to a fifth exemplary embodiment of the present disclosure, the electronic apparatus including a touch sensor device according to the present disclosure.
Figure 15:
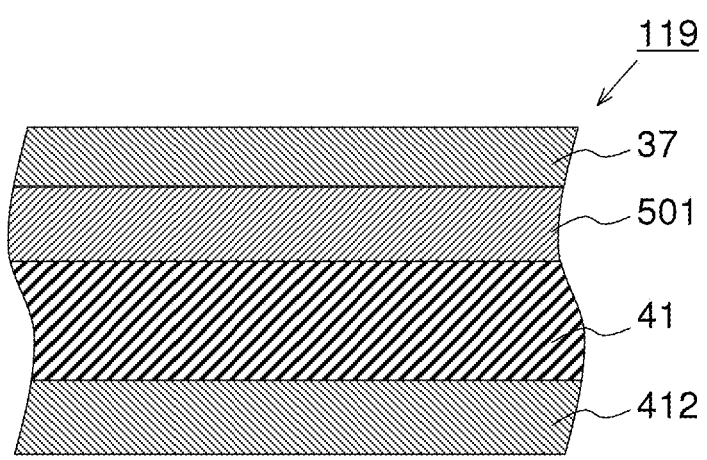
FIG. 15 is a schematic sectional view of the counter substrate, taken along XV-XV line in FIG. 14.

Next, a touch sensor device according to a fifth exemplary embodiment of the present disclosure will be described. Configurations substantially the same as those according to the fourth exemplary embodiment are not illustrated, and only portions different from the fourth exemplary embodiment will be described. FIG. 14 is a schematic plan view of a counter substrate of an electronic apparatus according to the fifth exemplary embodiment including the touch sensor device according to the present disclosure. FIG. 15 is a schematic sectional view, taken along XV-XV line in FIG. 14. In FIG. 14, to facilitate comprehension, portions that are not cross-sections are also illustrated by hatching. In addition, in FIGS. 14 and 15, elements the same as those according to the above exemplary embodiments are denoted by the same reference characters.

The electronic apparatus according to the fifth exemplary embodiment includes switch units (see the fourth exemplary embodiment) for simultaneously applying an AC voltage applied to an impedance surface 501 to the counter electrode 412 and the storage capacitor lines (see the fourth exemplary embodiment). Namely, the fifth exemplary embodiment is different from the fourth exemplary embodiment in the counter substrate 119.

According to the fourth exemplary embodiment, the counter electrode 412 of the LCD as an electronic apparatus is used as a touch sensor in a position detection period, and the display area is brought in an electrically high-impedance state with respect to the outside of the display area. As a result, while parasitic capacitance of the counter electrode 412 is decreased, parasitic capacitance viewed from the counter electrode 412 is still significantly larger than capacitance associated with a touch.

In contrast, according to the fifth exemplary embodiment, as illustrated in FIG. 15, the insulating substrate 41 is formed on the counter electrode 412, and the position detection conductive layer 501 formed of a transparent conductive layer is formed on the insulating substrate 41. This position detection conductive layer 501 is used as part of the touch panel. In addition, an insulating protective layer 37 is formed on the position detection conductive layer 501. A polarization plate may be used as the protective layer 37. This is because a polarization plate is needed for display by the LCD and a step of forming the protective layer 37 for the touch sensor device can be eliminated.

In FIG. 14, the electrodes 430*a* to 430*d* are formed on the respective four corners of the position detection conductive layer 501, and the current detection circuits 29*a* to 29*d* are electrically connected to the respective electrodes 430*a* to 430*d*. In addition, the electrodes 430*a* to 430*d* are electrically connected to the AC voltage supply 27 via the respective current detection circuits 29*a* to 29*d*.

Compared with the transparent conductive layer of the counter electrode 412 according to the fourth exemplary embodiment, the position detection conductive layer 501 is farther from the TFT substrate and closer to the surface (pointer contact surface) of the touch sensor device. Thus, compared with the counter electrode 412, parasitic capacitance viewed from the position detection conductive layer 501 is smaller, and capacitance associated with a contact with a pointer is larger. As a result, the S/N ratio of the touch sensor device is improved.

However, compared with the capacitance associated with a contact with a pointer, a change of the parasitic capacitance viewed from the position detection conductive layer 501 is larger, counted as a problem. In particular, a change associated with display contents on the LCD is problematic. This is due to dielectric constant anisotropy of liquid crystal molecules. In addition, this is a problem caused based on the principle that the orientation is changed based on display contents, and parasitic capacitance of the position detection conductive layer 501 is affected. As a result, it will be difficult for a signal processing circuit to detect presence or absence of a touch, counted as a problem. Namely, it will be difficult for the signal processing circuit to distinguish whether the signal has changed by a contact with a finger tip or by a change of display contents.

Figure 16:
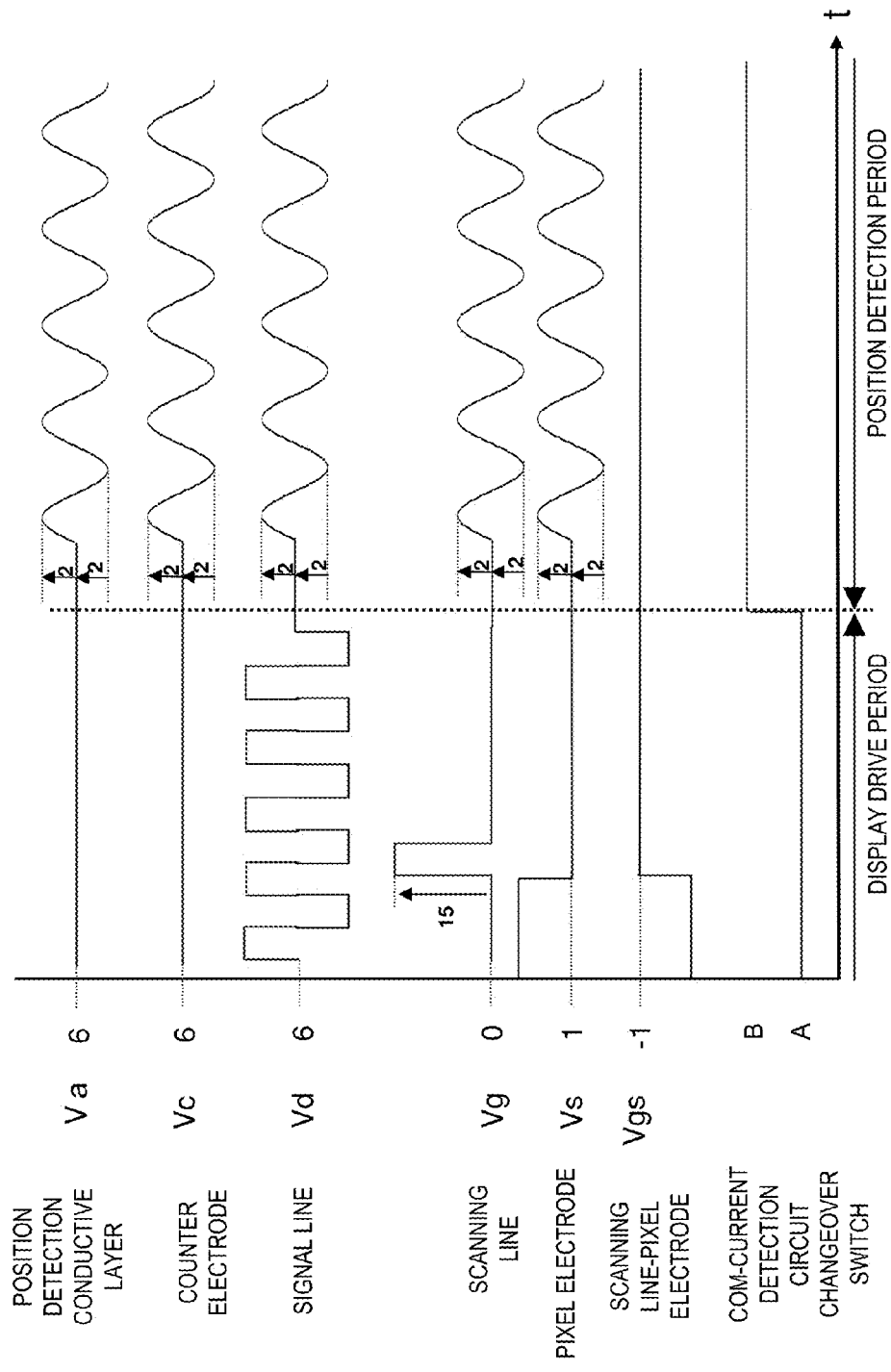
FIG. 16 is a voltage timing diagram of an electronic apparatus according to a fifth exemplary embodiment.

FIG. 16 is a timing diagram illustrating voltages at electrodes of the electronic apparatus according to the fifth exemplary embodiment. In FIG. 16, Va denotes the voltage applied to the position detection conductive layer 501. The other voltages are denoted by the same reference characters as those in the fourth exemplary embodiment, and the same voltages are applied. The voltage Va is a voltage applied from the AC voltage supply 27, and a voltage having the same phase and amplitude as the voltage Va is applied to the counter electrode 412 as the voltage Vc. In this way, since the counter electrode 412 serves as an ideal shield layer for the position detection conductive layer 501, the position detection conductive layer 501 is less susceptible to influence of a capacitance change of the TFT substrate viewed from the counter electrode 412, the change being caused by a dielectric constant change of the dielectric material present between the counter electrode 412 and the TFT substrate.

As a result, the parasitic capacitance of the position detection conductive layer 501 (more accurately, a signal detected as the parasitic capacitance) is significantly decreased. In addition, since a change of the capacitance associated with display contents on the LCD can be made smaller than the capacitance formed by a human finger and the position detection conductive layer 501, presence or absence of a touch can be detected accurately, counted as a meritorious effect. Other configurations, operations, and meritorious effects are the same as those according to the first to fourth exemplary embodiments.

Figure 17:
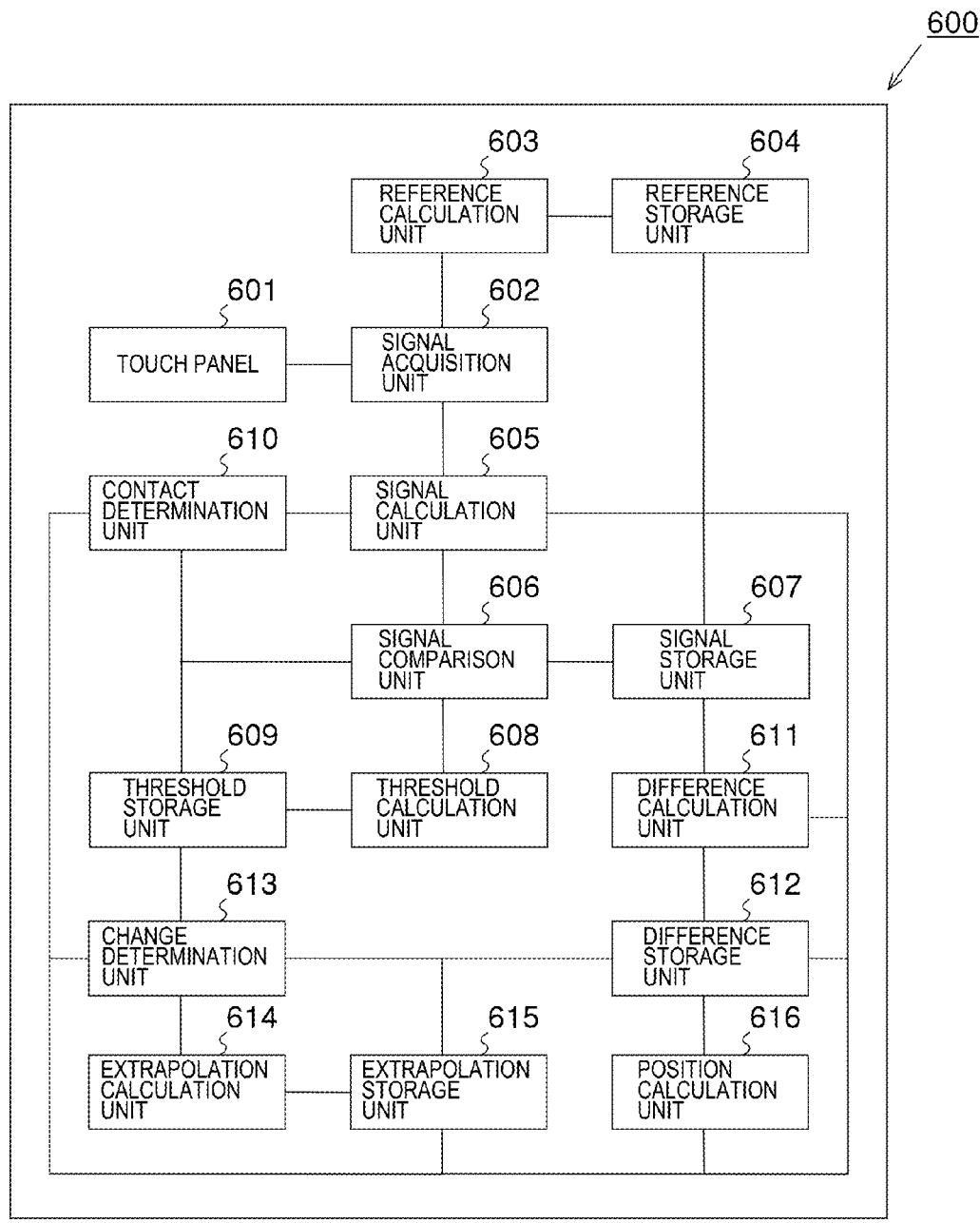
FIG. 17 is a schematic block diagram of a touch sensor device according to a sixth exemplary embodiment of the present disclosure.

A touch sensor device according to a sixth exemplary embodiment of the present disclosure will be described. FIG. 17 is a schematic block diagram of a touch sensor device according to the sixth exemplary embodiment of the present disclosure. According to the third exemplary embodiment, a magnitude of change of the signal during a predetermined unit time (second unit time), that is, the first signal difference value, is compared with the third threshold Th3 to determine whether or not a touch-on state is established, and the second unit time is a fixed value determined by initial settings. However, according to the sixth exemplary embodiment, the second unit time is automatically adjusted based on states per touch. In addition, an extrapolated value is used to calculate a pointer position in view of the influence associated with close presence of a palm.

In addition to the configurations (corresponding to a touch panel 601 to a difference calculation unit 611) according to the third exemplary embodiment, a touch sensor device 600 according to the sixth exemplary embodiment includes a change determination unit 613 determining a magnitude of change of the signal output value per unit time, an extrapolation calculation unit 614 calculating an extrapolated value, and an extrapolation storage unit 615 storing an extrapolated value used to make a contact determination and to calculate a pointer position. While not illustrated in the above exemplary embodiments, to describe the present exemplary embodiment, a difference storage unit 612 storing difference values and a position calculation unit 616 calculating a pointer position are illustrated in FIG. 17. These difference storage unit 612 and position calculation unit 616 are not exclusively included in the present exemplary embodiment only.

Figure 18:
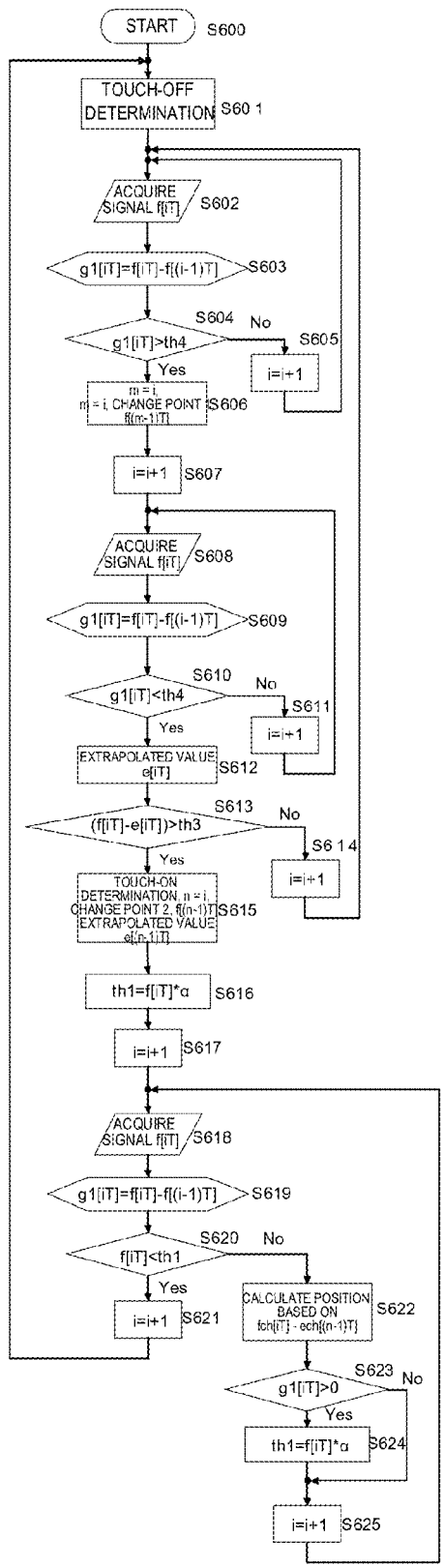
FIG. 18 is a flow chart illustrating a method for operating and controlling a touch sensor device according to a sixth exemplary embodiment of the present disclosure and a program for operating a touch sensor device.

FIG. 18 is a flow chart illustrating a method for operating and controlling the touch sensor device according to the sixth exemplary embodiment of the present disclosure and a program for operating the touch sensor device. According to the sixth exemplary embodiment, each of the channel signal output values acquired from four corners of the panel is represented as fch[iT]. The contact position of a pointer is calculated based on each of the channel signal output values fch

Figure 40:
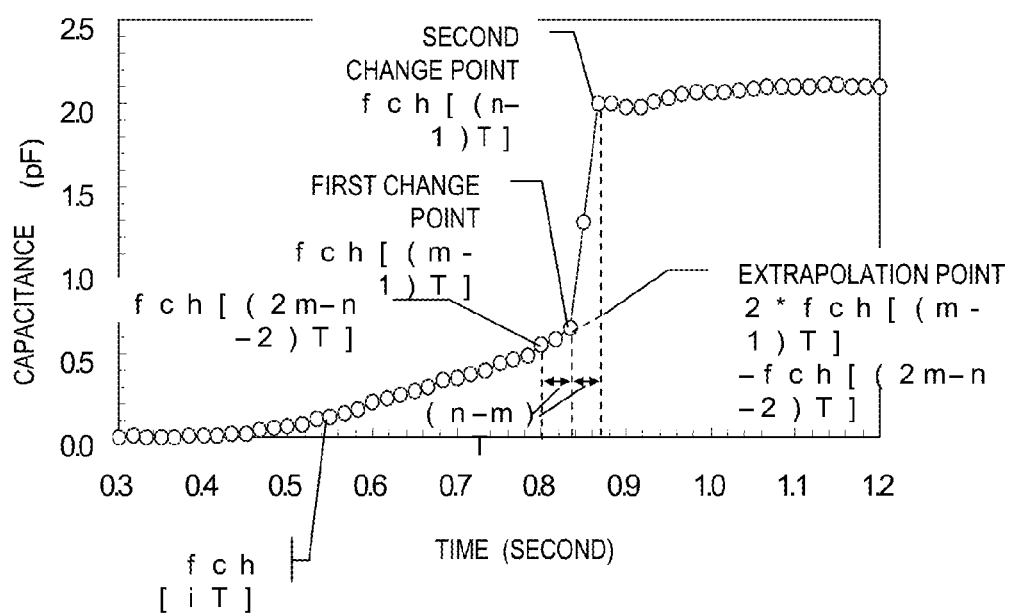
FIG. 40 is a graph illustrating transition of a channel signal output value in example 8.

[iT]. The sum of these four channel signal output values fch[iT] is represented as a signal output value f[iT], and a touch-on determination or the like is made based on this signal output value f[iT]. In the description of each of the steps in the flow chart, the sum f[iT] of the four channel signals is used as much as possible, and the individual channel signal output values fch[iT] are used only in steps relating to position calculation. FIG. 40 illustrates measurement results in example 8 carried out based on the present exemplary embodiment. FIG. 40 includes descriptions corresponding to the following descriptions.

First, as in the first exemplary embodiment, after initial settings, the contact determination unit 610 makes a touch-off determination (S601). Next, the signal acquisition unit 602 acquires a signal in the i-th touch determination. The signal calculation unit 605 calculates a signal output value f[iT], as in the first exemplary embodiment (S602).

Next, the difference calculation unit 611 calculates a second difference value g1[iT] of the signal per third unit time (S603). The second difference value g1[iT] of the signal is calculated by f[iT]−f[(i−1)T]. The third unit time is a period for determining whether or not f[iT] is gradually changing. For example, 16 msec (=1 T=1*16 msec) can be set as the third unit time.

Next, the change determination unit 613 compares the second difference value g1[iT] with a fourth threshold Th4 (S604). The fourth threshold Th4 is a threshold for determining whether or not f[iT] is gradually changing, namely, for determining whether or not the signal is changing as a palm is brought closer to the touch sensor. The fourth threshold Th4 is stored in the threshold storage unit 609 in advance. The fourth threshold Th4 is obtained by dividing the third threshold Th3 by max(n−m) (Th4=Th3/max(n−m)). As in the third exemplary embodiment, the third threshold Th3 is a threshold for a touch-on determination. In the above expression, m means i where a sharp increase of f[iT] is determined when a pointer is brought into contact with the touch sensor, and n means i where a touch-on determination is made. The second unit time for determining a touch-on determination is represented as (n−m)T. In the above expression, max(n−m) is the upper limit of (n−m), and the upper limit of (n−m)T is max{(n−m)T}. For example, if T=16 msec and max(n−m)=5, max{(n−m)T}=5*16 msec=80 msec. If the third threshold Th3 is set to 1.5 pF, the fourth threshold Th4 is 0.3 pF (=Th3/max(n−m)=1.5 pF/5).

In S604, if the second difference value g1[iT] is equal to or less than the fourth threshold Th4, i is increased by one in S605, and the operation returns to S602. On the other hand, if the second difference value g1[iT] exceeds the fourth threshold Th4, i is substituted into m in order to set a first change point, at which f[iT] starts to increase sharply, to f[(m−1)T] at time (m−1)T, which is prior to mT by 1T (S606).

Next, i is increased by one (S607). Next, as in S602, the signal acquisition unit 602 acquires the signal, and the signal calculation unit 605 calculates the signal output value f[iT] (S608).

Next, as in S603, a difference calculation unit 611 calculates the second difference value g1[iT] of the signal per third unit time (S609). The difference storage unit 612 stores the second difference value g1[iT].

Next, the change determination unit 613 compares the second difference value g1[iT] with the fourth threshold Th4 (S610). In this step, if the second difference value g1[iT] is equal to or greater than the fourth threshold Th4, i is increased by one (S611), and the operation returns to S608. On the other hand, if the second difference value g1[iT] falls below the fourth threshold Th4, the extrapolation calculation unit 614 calculates an extrapolated value extrapolated from the first change point to time iT, based on a gradual increase trend prior to the first change point, even if the signal output value f[iT] sharply increases after the first change point (S612). In this step, the extrapolated value e[iT] is set to 2*f[(m−1)T]−f[(2m−i−2)T], based on the second unit time (i−m+1)T and the signal output value f[(m−1)T] at the first change point. The extrapolation storage unit 615 stores the extrapolated value e[iT].

Figure 41:
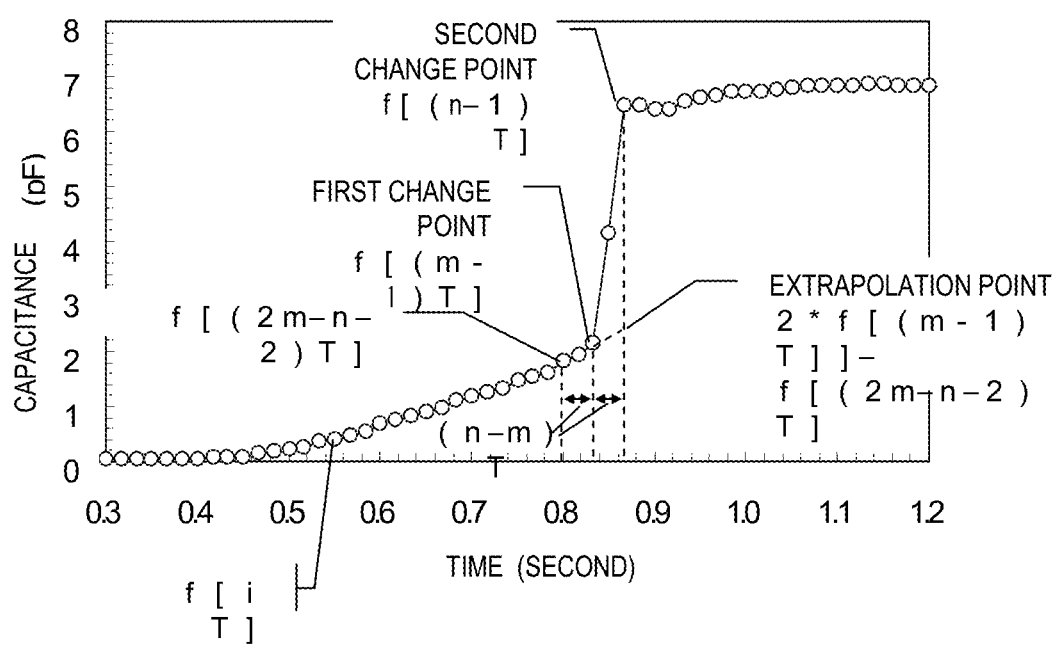
FIG. 41 is a graph illustrating transition of the sum of four channel signal output values.

The equation (2*f[(m−1)T]−f[(2m−i−2)T) for obtaining the extrapolated value e[iT] will be described with reference to FIG. 41 used in the following example. (Note, in FIG. 41, n is used for "i".) The difference between time iT and time (m−1)T at the first change point is (i−m+1)T. The time prior to time (m−1)T by (i−m+1)T is (2m−i−2)T, and the signal at this time (2m−i−2)T is represented as f[(2m−i−2)T]. Since the time at the first change point is (m−1)T, the signal at the first change point is represented as f[(m−1)T]. If the signal at time (m−1)T is subtracted from the signal prior to (m−1)T by (i−m+1)T, f[(m−1)T]−f[(2m−i−2)T] is obtained. By adding this subtracted value and f[(m−1)T] at the first change point together, the extrapolated value e[iT] can be obtained as 2*f[(m−1)T]−f[(2m−i−2)T].

The extrapolated value e[iT] can be obtained by extrapolation from the first change point to time iT, based on a gradual increase trend prior to the first change point, even if fch[iT] sharply increases after the first change point. When the finger tip is brought into contact with the panel surface and the signal sharply increases, the palm is also brought near the panel surface. However, by calculating the extrapolated value and taking an increase of the palm signal component in this period into consideration, the signal associated with close presence of the palm can be estimated more accurately.

Next, the difference calculation unit 603 calculates the difference between the signal output value f[iT] and the extrapolated value e[iT]. Next, the contact determination unit 610 compares the difference with the third threshold Th3 (S613). If the difference (f[iT]−e[iT]) is equal to or less than the third threshold Th3, i is increased by one (S614), and the operation returns to S602. This is a case where the threshold for a touch-on determination is not reached and a touch-on determination is executed from the beginning. On the other hand, if the difference (f[iT]−e[iT]) exceeds the third threshold Th3, i is substituted into n. A second change point, at which f[iT] starts to be saturated, is set to time (n−1)T prior to nT by 1T, and the signal output value at time (n−1)T is set to f[(n−1)1]. Next, a touch-on determination is made (S615).

If the fourth threshold Th4 is obtained by dividing the third threshold Th3 by max(n−m), the fourth threshold Th4 increases as max{(n−m)T} shortens. Thus, the second difference value g1[iT] easily falls below the fourth threshold Th4 in S604. On the other hand, in S604, if the period where the second difference value g1[iT] exceeds the fourth threshold Th4 continues for max{(n−m)T}, based on Th4=Th3/max(n−m), the difference (f[iT]−e[iT]) can exceed the third threshold Th3 in S613, and a touch-on determination is made.

If the first change point f[(m−1)T] is used instead of e[iT], naturally, f[iT]−f[(m−1)T]>Th3 is established. Next, grounds for this will be described. As described above, g1[iT] is a difference value between f[iT] and f[(i−1)1]. The individual difference values g1 per period T from time (m−1)T to time iT are as follows:

$$g1[iT]=f[iT]-f[(i-1)T]$$

$$g1[(i-1)T]=f[(i-1)T]-f[(i-2)T]$$

$$g1[(m+1)T]=f[(m+1)T]-f[mT]$$

$$g1[mT]=f[mT]-f[(m-1)T]$$

Next, if g1[mT] to g1[iT] are added, the right-hand side is eliminated other than f[iT] and −f[(m−1)T], and mathematical expression 1 is obtained.

$$g1[iT]+g1[(i-1)T]+\ldots+g1[mT]=f[iT]-f[(m-1)T] \quad \text{(mathematical expression 1)}$$

If the period in which the relationship in S604 g1[iT]>Th4 is TRUE continues for max{(n−m)T}, mathematical expression 2 is established.

$$g1[iT]+g1[(i-1)T]+\ldots+g1[mT]>Th4*\max\{(n-m)T\} \quad \text{(mathematical expression 2)}$$

If g1[iT]+g1[(i−1)T]+ . . . +g1[(m)T] on the left-hand side of mathematical expressions 1 and 2 is eliminated, the relationship f[iT]−f[(m−1)T]>Th4*max{(n−m)} is established. Since Th4 is obtained by Th3/max(n−m) due to the initial settings, Th4 and max(n−m) are eliminated, resulting in f[iT]−f[(m−1)T]>Th3. In this relationship, f[(m−1)T] is the first change point, and if the period where the relationship g1[iT]>Th4 is TRUE in S604 continues for max{(n−m)T}, based on the expression Th4=Th3/max(n−m), naturally, the relationship f[iT]−f[(m−1)T]>Th3 is established. Next, a case where the extrapolation point e[iT] is used will be described. Since the extrapolation point e[iT] at time i after (m−1)T is calculated based on a gradual increase trend until time (m−1)T, the relationship f[(m−1)T]<e[iT] is often established. Thus, the relationship f[iT]−e[(n−1)T]>Th3 is not always established.

The extrapolation calculation unit 614 determines the sum of 4-channel extrapolated values when a touch-on determination is made as e[(n−1)T]=2*f[(m−1)T]]−f[(2m−n−1)1]. In addition, the extrapolation calculation unit 614 determines the extrapolated values of the individual channels as ech[(n−1)T]=2*fch[(m−1)T]]−fch[(2m−n−1)T] and stores these extrapolated values in the extrapolation storage unit 615. Since a touch-on has thus been determined, next, a touch-off determination will be described.

Next, the threshold calculation unit 608 uses f[iT]*α as the first threshold Th1 for a touch-off determination and stores f[iT]*α in the threshold storage unit 609 (S616). As in the first exemplary embodiment, this α is a parameter used to calculate the first threshold Th1 for a touch-off determination. For example, α is set to 0.6. Next, i is increased by one (S617).

Next, as in S602, the signal calculation unit 605 acquires the signal output value f[iT] (S618).

Next, as in S603, the difference calculation unit 611 calculates the second difference value g1[iT] of the signal per third unit time (S619).

Next, the contact determination unit 610 compares the signal output value f[iT] with the first threshold Th1 (S620). If the signal output value f[iT] falls below the first threshold Th1, i is increased by one (S621), and the operation returns to S601. Namely, a touch-off determination is made, and the touch sensor device 600 waits for the next touch-on operation. On the other hand, if the signal output value f[iT] is equal to or greater than the first threshold Th1, the position calculation unit 616 calculates a pointer position, based on the difference between each channel signal output value and each channel extrapolated value (fch[iT]−ech[(n−1)T]) (S622). If the pointer is a finger, ech[(n−1)T] corresponds to a palm signal component. Namely, the position calculation unit 616 calculates a pointer position based on a value from which the palm signal component has been eliminated.

Next, the change determination unit 613 compares the second difference value g1[iT] calculated in S619 with 0 (S623). If the second difference value g1[iT] is equal to or less than 0, the operation proceeds to S625 by skipping S624. However, if the second difference value g1[iT] exceeds 0, f[iT]*α is set as a new first threshold Th1 for a touch-off determination (S624). Next, i is increased by one (S625), and the operation returns to S618.

According to the sixth exemplary embodiment, by eliminating the influence associated with close presence of a palm from the signal output value fch[nT], accuracy in pointer position can be increased. Regarding accuracy of the position, a sharp signal change associated with a touch, namely, a signal change per second unit time (n−m)T, is determined to be a signal (S) component, and a gradual signal change associated with close presence of a palm, namely, a signal change prior to the second unit time (n−m)T, is determined to be a noise (N) component. If the signal output value fch[iT] is saturated after the second change point, the second difference value g1[iT] falls below the fourth threshold Th4 in S612. In this exemplary embodiment, a touch-on determination is made at time nT when the signal output value fch[iT] is saturated, and the first calculation of the position coordinates after the touch is executed at time (n+1)T. By calculating the position coordinates after the signal output value fch[iT] is saturated, a sharp signal change associated with a touch, namely, the signal, can be extracted without loss. Thus, with an increased S/N, the first calculation of the position coordinates after a touch can be executed more accurately.

In addition, along with the position calculation in S622, the touch sensor device responds to a mouse event or the like. However, since time (n+1)T when the signal output value fch[iT] is saturated is immediately after the finger tip is firmly brought into contact with the panel surface, the time of the response from the touch sensor device is appropriate. In addition, while the position is calculated at time (n+1)T in S622, the position can be calculated at time nT.

Thus, based on temporal change in the signal output value f[iT] before and after a touch, the second unit time for a touch-on determination is automatically adjusted, and the signal associated with close presence of a palm is estimated. In addition, by eliminating the influence associated with close presence of a palm, the present exemplary embodiment provides a meritorious effect of improving position accuracy, while preventing an erroneous touch-on determination.

Regarding the method for calculating the extrapolated value in S612, the extrapolated value may be obtained by calculating an approximation expression based on a gradual signal change prior to the first change point and by executing extrapolation from the first change point to time iT. For example, regarding a calculation method of such approximate expression, fch[iT] of {(m−6)T to (m−1)T} can be used and a linear approximation expression can be calculated by a least-squares method. In this case, even if fch[iT] fluctuates by the noise superimposed therein, since the random noise is averaged and eliminated, the extrapolated value can be calculated more accurately.

In S613 and S622, extrapolated values are used for the signal associated with close presence of a palm. However, the first change point can be used, instead. Compared with the extrapolated values, the first change point can be calculated more easily. Thus, load on the calculation process can be significantly reduced.

Other modes of the sixth exemplary embodiment are the same as those according to the first and third exemplary embodiments.

Figure 19:
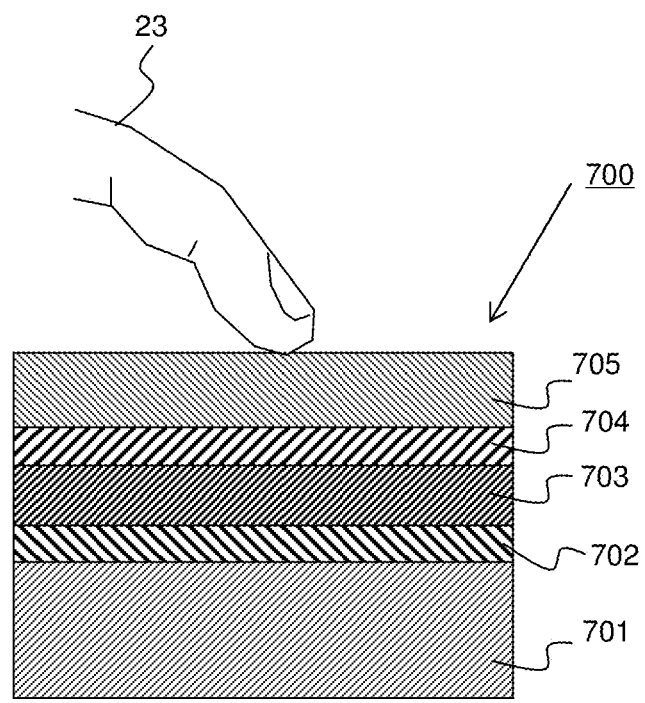
FIG. 19 is a schematic sectional view of a touch sensor device according to a seventh exemplary embodiment.
Figure 20:
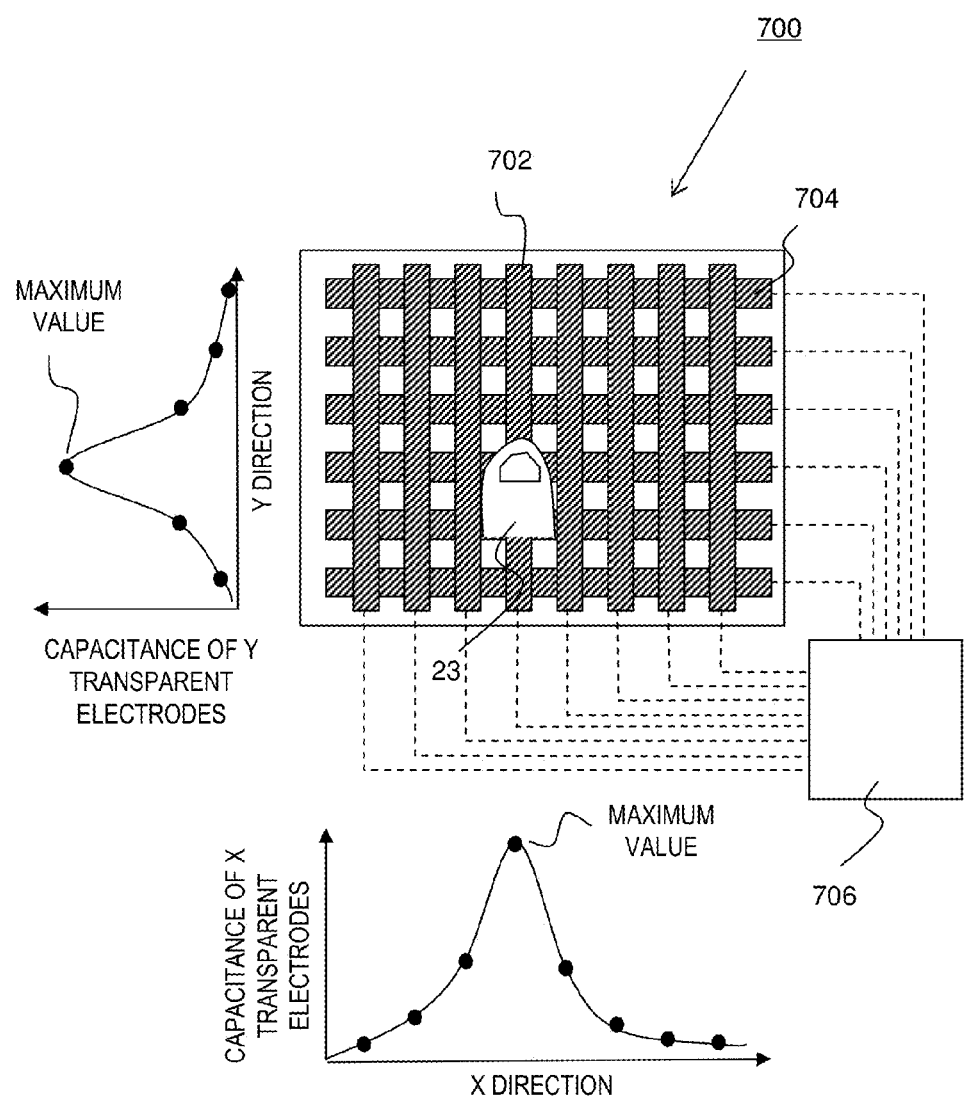
FIG. 20 is a schematic plan view of a touch sensor device according to a seventh exemplary embodiment.

Next, a touch sensor device according to a seventh exemplary embodiment will be described. FIG. 19 is a schematic sectional view of a touch sensor device according to the seventh exemplary embodiment. FIG. 20 is a schematic plan view of the touch sensor device according to the seventh exemplary embodiment. The first exemplary embodiment has been described by using a surface capacitive type touch panel as an example. However, the seventh exemplary embodiment will be described by using a projected capacitive type touch panel as an example. FIG. 19 is a schematic sectional view of an LCD with a projected capacitive type touch panel, and FIG. 20 is a schematic plan view thereof. To briefly illustrate the operating principle of the projected capacitive type touch panel, in FIG. 20, illustration of a protective glass 705, a touch panel substrate 703, and an LCD 701 illustrated in FIG. 19 is omitted.

A touch panel 700 arranged on the LCD 701 includes: a plurality of Y transparent electrodes 702 that are formed on the LCD 701 and that extend in the vertical direction in the figure; the touch panel substrate 703 formed on the Y transparent electrodes 702; a plurality of X transparent electrodes 704 that are formed on the touch panel substrate 703 and that extend in the horizontal direction in the figure; the protective glass 705 formed on the X transparent electrodes 704; and a controller 706 detecting capacitance change of the X transparent electrodes 704 and Y transparent electrodes 702. The X and Y transparent electrodes 704 and 702 are formed in a matrix.

FIG. 20 also illustrates a graph in which capacitance detected by the individual X transparent electrodes 704 is plotted and a graph in which capacitance detected by the individual Y transparent electrodes 702 is plotted. Based on the touch panel 700, if the pointer 23 is brought near the X and Y transparent electrodes 704 and 702, the interelectrode capacitance is increased. By detecting the capacitance change of the X and Y transparent electrodes 704 and 702, the controller 706 detects the position of the pointer 23. The capacitances of the X transparent electrodes 704 and Y transparent electrodes 702 exhibits a maximum value in the position where the pointer 23 is in contact with the touch panel 700.

In addition, while the seventh exemplary embodiment has been described by using a projected capacitive type touch panel as an example, the first threshold Th1 in the first exemplary embodiment may be applied to a touch switch detecting touch-on/off only.

Other modes of the seventh exemplary embodiment are the same as those of the first exemplary embodiment.

EXAMPLES

Example 1

Figure 21:
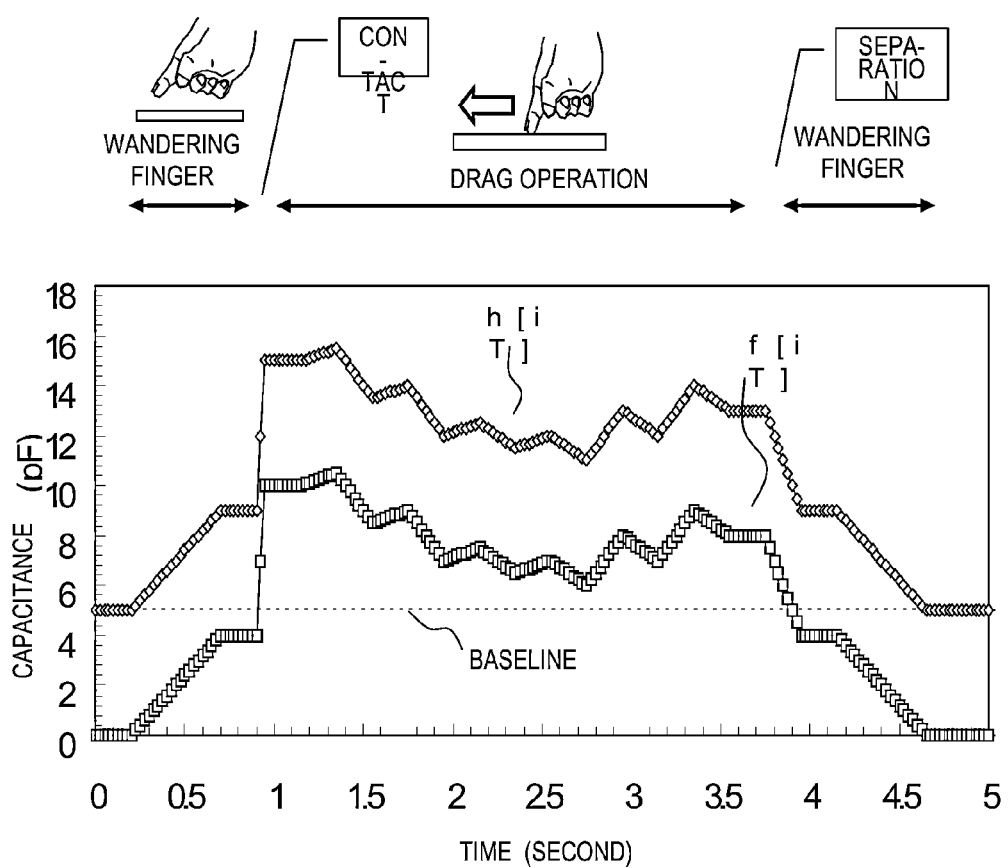
FIG. 21 is a simulation result illustrating transition of a detection signal value h(iT) and a signal output value f(iT) when closeness (proximate conditions) of a finger tip, a palm, and the like to a touch panel is varied in example 1.

By using the touch sensor device according to the first exemplary embodiment, transition of a signal corrected by a baseline was simulated, and it was confirmed that there is a decrease in the signal transition during a drag operation. FIG. 21 illustrates transitions of a detection signal value h(iT) and a signal output value f(iT) when the thickness of the cover glass is 0.5 mm and closeness of a finger tip, a palm, and the like to the touch panel is varied. Each of the values h(iT) and f(iT) was converted from a voltage value to a capacitance value. The signal output value f(iT) was calculated based on the above expression 5. A finger tip was used as the pointer.

As illustrated in FIG. 21, when no human body such as a finger tip and a palm was present near the touch panel, while the detection signal value h(iT) was 5 pF, the signal output value f(iT) was approximately 0 (t=0 to 0.2 seconds in FIG. 21). This is because the baseline used in the baseline correction cancels out a signal associated with parasitic capacitance. In addition, even when a human body such as a finger tip and a palm is present near the touch panel, since the baseline cancels out the signal associated with the parasitic capacitance, a signal associated with a user operation is extracted. From t=0.2 to 0.7 seconds, a human body such as a palm is brought near the touch panel, and the signals are gradually increased. After bringing the palm near the touch panel, users unconsciously tend to recheck the horizontal position of the finger tip with respect to an icon or the like displayed on the LCD. If the position is misaligned, a user adjusts the position of the finger tip. Thus, the signals were measured, assuming that the finger tip was not into contact with the surface of the touch panel, the palm was maintained approximately at a certain distance from the surface of the touch panel, and the palm did not move horizontally. As a result, the signal was maintained at a certain level of 4 pF (t=0.7 to 0.9 seconds).

Next, when the finger tip was brought into contact with the surface of the touch panel, the signal sharply increased to 10 pF (t=0.9 to 0.95 seconds). Next, when the finger tip remained on the surface of the touch panel or when a drag operation was executed, the signal increased and decreased repeatedly (t=1.15 to 3.75 seconds). It was confirmed that the signal tends to decrease during a drag operation, and the signal exhibited the smallest value 6.5 pF at t=2.75 seconds. For example, if the first threshold Th1 had been set to 6.5 pF or greater, a touch-off determination would have been made even during the touch-on state.

Next, when the finger tip was separated from the surface of the touch panel, the signal decreased from 8 pF to 4 pF (t=3.75 to 3.95 seconds). Next, after the finger tip was separated, when the palm or arm remained near the touch panel, the signal exhibited a constant level of 4 pF (t=3.95 to 4.15 seconds). Next, when the palm and arm were further separated from the touch panel, the signal decreased (t=4.15 to 4.65 seconds). Subsequently, the signal decreased to 0 pF (after t=4.65 seconds).

Thus, it was confirmed that there are cases where the signal decreases during a drag operation when a pointer is in contact with the touch panel and an erroneous determination is made.

Figure 22:
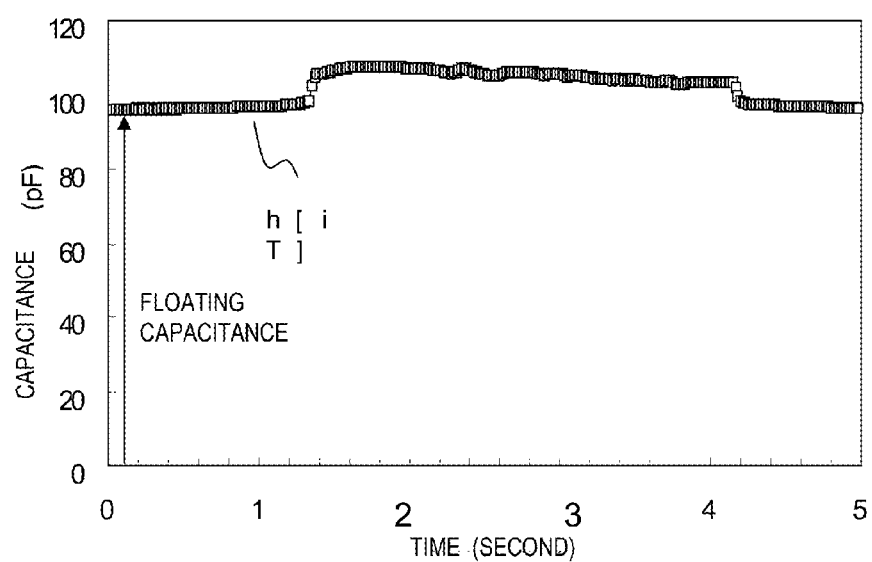
FIG. 22 is a graph illustrating measurement results of transitions of a detection signal value h(iT) when closeness of a finger tip, a palm, and the like to a touch panel is varied in example 1.

FIG. 21 illustrates results of a simulation based on temporal change of f[iT] associated with a touch and with close presence of a palm. The detection signal value h(iT) was measured under the same conditions in the above simulation. FIG. 22 illustrates measurement results of the detection signal value h(iT). Data in FIG. 22 is obtained before baseline correction was executed, and the floating capacitance was as high as approximately 100 pF. FIG. 22 confirms that the signal decreases during a drag operation when a pointer is in contact, as the simulation results show.

Example 2

Figure 23:
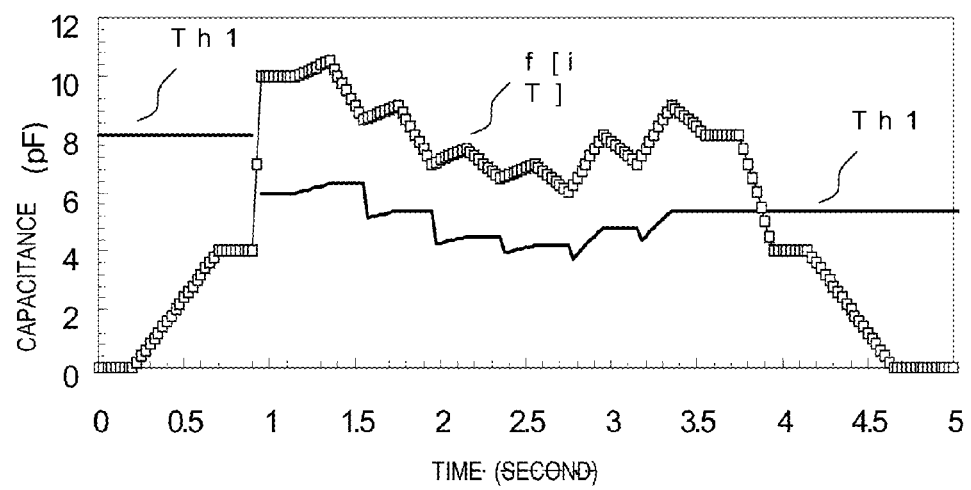
FIG. 23 is a simulation result illustrating transition of a first threshold Th1 in example 2.

Transition of the first threshold was calculated with respect to the signal transition obtained in example 1, assuming that, if the signal increases after a touch-on determination, the first threshold for a touch-off determination is updated, and if the signal decreases (or remains at a certain level), the first threshold Th1 is not updated, as illustrated in the flow according to the first exemplary embodiment in FIG. 2. FIG. 23 illustrates signal transition of the first threshold (Th1). The initial value of the first threshold Th1 was set to 8 pF. The same signal transition as that illustrated in FIG. 21 was used.

When the finger tip was brought into contact with the surface of the touch panel, the signal increased to 10 pF, and a touch-on determination was made (t=0.9 to 0.95 seconds).

In the present example, unlike the flow chart illustrated in FIG. 2, a new signal output value was not acquired. Thus, next, immediately after the touch-on determination was made (t=0.95 seconds), the signal output value 10 pF obtained when the touch-on determination was made was compared with the signal output value 4 pF obtained three touch-on determinations before. Since the signal output value when the touch-on determination was made was larger, based on the signal output value 10 pF acquired when the touch-on determination was made, the first threshold after the touch-on determination was updated. In this example, the sensitivity a was set to 0.6. Based on the expression, that is, the first threshold Th1=current signal(10 pF)*sensitivity(0.6), a new first threshold Th1 was calculated to 6 pF. The current signal was a signal acquired in the same loop in which the signal was determined to be increasing. Since the signal associated with the parasitic capacitance had already been canceled out by the baseline correction, if the first threshold Th1 was calculated based on the current signal (10 pF), the component associated with the parasitic capacitance could also be eliminated from the first threshold Th1. Therefore, even if the parasitic capacitance varies depending on manufacturing variations or surrounding environments of the touch sensor device, by executing the baseline correction, the first threshold Th1 can be set appropriately.

During a period when the signal decreased from 10.5 pF to 8.5 pF (t=1.35 to 1.55 seconds), the first threshold Th1 remained at 6.3 pF and was not updated. In the next step, while the signal output value f[iT] was compared with the first threshold Th1, since the signal was larger than the threshold, a touch-off determination was not made.

Next, during a period when the signal output value f[iT] increased from 8.5 pF to 9 pF (t=1.55 to 1.75 seconds), whereupon the first threshold Th1 was updated from 5.1 pF to 5.4 pF. The smallest value of the signal output value f[iT] while the finger tip is in contact (t=2.75 seconds) was 6.5 pF. However, since the first threshold Th1 was updated to 4.5 pF, and the signal was larger than the first threshold Th1, a touch-off erroneous determination was not made.

If, for example, the first threshold Th1 has been set at a constant level of 8 pF for both a touch-off determination and a touch-on determination, an erroneous touch-off determination could have been made. Meritorious effects of the present exemplary embodiment can be provided, since the first threshold Th1 can be adjusted to be low when the signal generally decreases while increasing and decreasing repeatedly.

Next, during a period when the finger tip was separated from the surface of the touch panel, the signal decreased from 8 pF to 4 pF (t=3.75 to 3.95 seconds). Since the signal decreased in this period, the first threshold Th1 was not updated from 5.4 pF. When the signal output value f[iT] fell below the first threshold Th1, a touch-off determination was made. Thus, when the finger tip is separated, a touch-off determination can be made accurately. This operation is based on the tendency that the signal decreases monotonously (i.e., in a straight slope of decline) when the finger tip is separated. In addition, when the finger tip is separated, the signal decrease amount is large. Thus, if the threshold is not updated, the signal output value f[iT] falls below the first threshold Th1. Next, while the finger tip was separated, the palm or the like still remained near the touch panel. In this state, while the signal was constant at 4 pF (t=3.95 to 4.15 seconds), a touch-off determination had already been made when the finger tip was separated.

Figure 24:
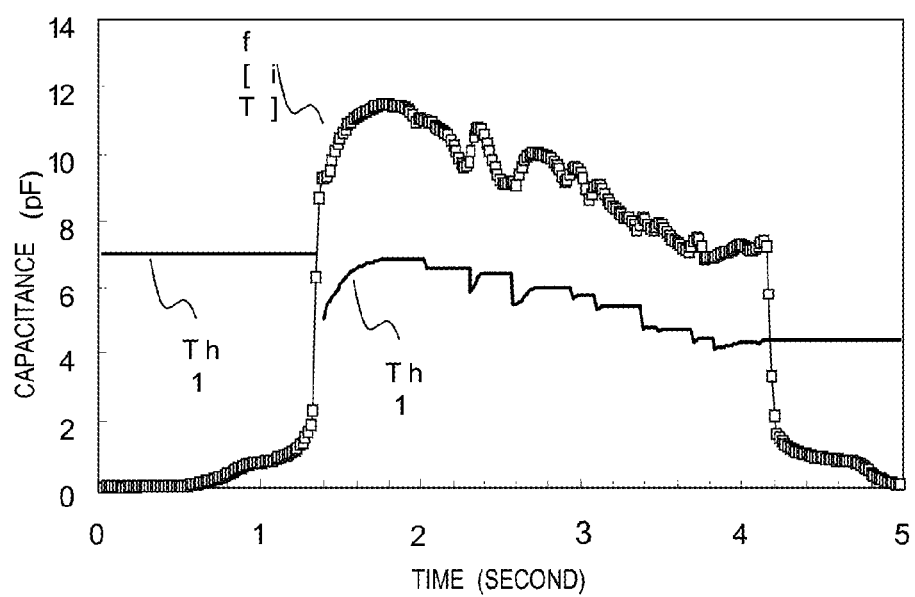
FIG. 24 is a graph illustrating a measurement result of transition of a first threshold (Th1) in example 2.

FIG. 23 illustrates results of a simulation based on temporal change of f[iT] associated with a touch and with close presence of a palm. Under the same conditions in the above simulation, transitions of the signal output value f[iT] and the first threshold Th1 were measured. FIG. 24 illustrates measurement results of the signal output value f[iT] and the first threshold Th1. As the simulation results show, FIG. 24 confirms that the signal decreases and the first threshold Th1 can be adjusted to be low during a drag operation when a pointer is in contact.

Example 3

Figure 25:
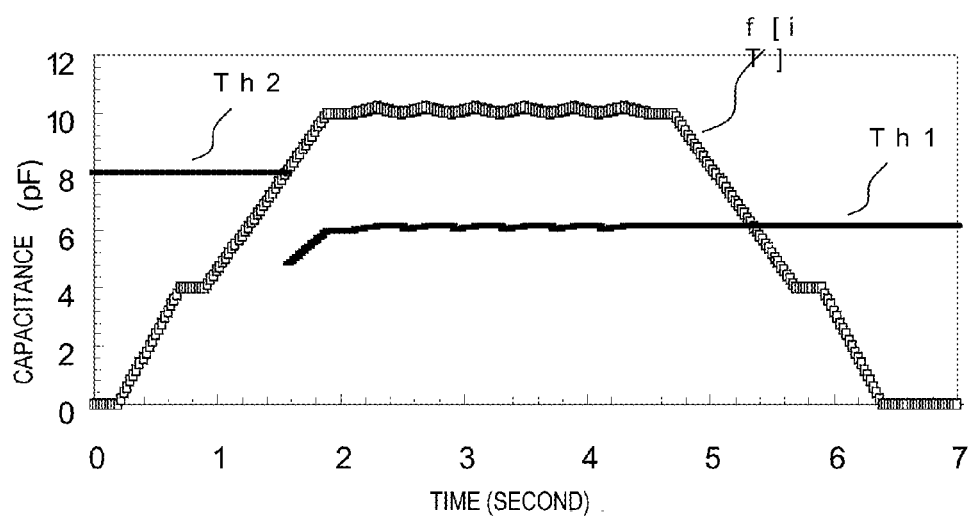
FIG. 25 is a simulation result illustrating transitions of a signal output value, a first threshold, and a second threshold in example 3.

By using the touch sensor device according to the second exemplary embodiment, transition of the signal output value was simulated. FIG. 25 illustrates transition of the signal output value, the first threshold, and the second threshold. When the palm was brought near the touch panel, the signal output value was 4 pF. Thus, the second threshold Th2 was set to 8 pF, which was a constant that was not updated after the program is started.

Figure 26:
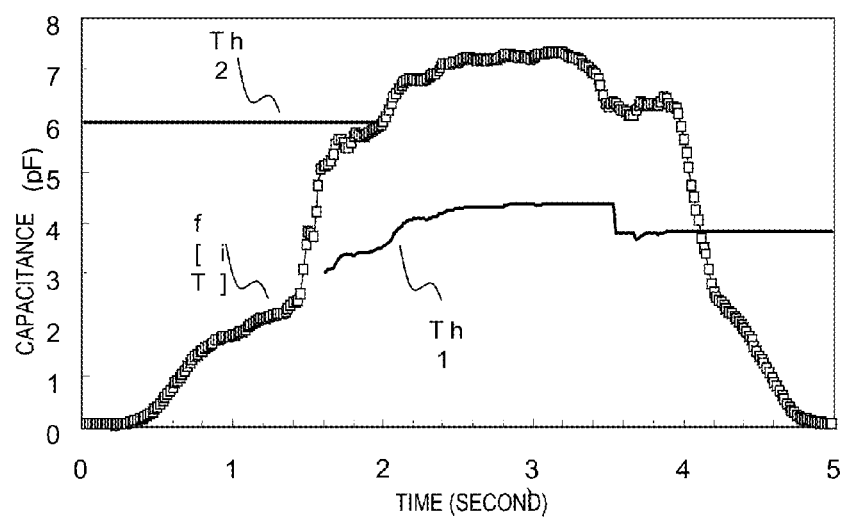
FIG. 26 is a graph illustrating measurement results of transitions of a signal output value, the first threshold, and the second threshold in example 3.

FIG. 25 illustrates results of a simulation based on temporal change of f[iT] associated with a touch and with close presence of a palm. Under the same conditions in the above simulation, transitions of the signal output value f[iT], the first threshold Th1, and the second threshold Th2 were measured. FIG. 26 illustrates measurement results of the signal output value f[iT], the first threshold Th1, and the second threshold Th2. FIG. 26 confirms that the first threshold Th1 changes as the simulation results show.

Example 4

Figure 27:
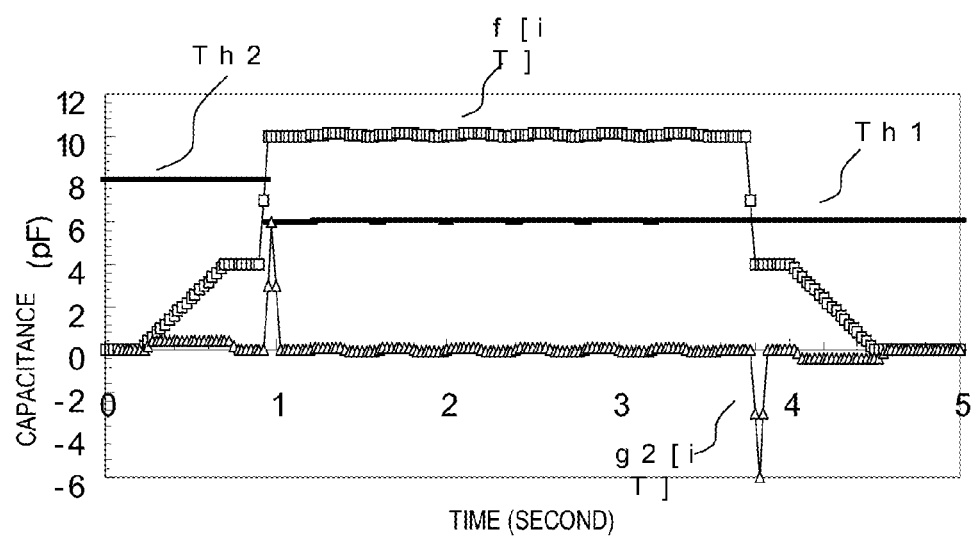
FIG. 27 is a simulation result illustrating transitions of a signal output value, a difference value, a first threshold, and a second threshold in example 4.

By using the touch sensor device according to the third exemplary embodiment, transition of the signal output value was simulated. FIG. 27 is a graph illustrating transitions of the signal output value, the difference value, and the first and second thresholds. In FIG. 27, illustration of the third threshold Th3 is omitted.

When the palm was brought near the surface of the touch panel (t=0.2 to 0.7 seconds), the signal output value gradually increased, and the difference value g2[iT] was 0.4 pF. Next, while the palm was present near the surface of the touch panel and an index finger remained stationary in the same plane of the palm (t=0.7 to 0.9 seconds), the difference value g2[iT] was approximately 0 pF.

Next, when the finger tip was brought into contact with the surface of the touch panel (t=0.9 to 0.95 seconds), the signal output value sharply increased. In this period, the difference value g2[iT] depicted a maximum value of 6 pF. Next, when the finger tip remained stationary on the surface of the touch panel (t=0.95 to 3.75 seconds), the difference value g2 was approximately 0.2 pF. When the finger tip was separated from the surface of the touch panel (t=3.75 to 3.8 seconds), the signal output value sharply decreased. In this period, the difference value g2[iT] depicted a minimum value of −6 pF.

Immediately after the finger tip was separated (t=3.8 to 4 seconds) and when the palm still remained near the surface of the touch panel, the difference value g2[iT] was approximately 0 pF. Next, when the palm was further separated from the surface of the touch panel (t=4 to 4.5 seconds), the difference value g2[iT] was −0.4 pF.

The difference value g2[iT] obtained when the finger tip was brought into contact with the touch panel was more than ten times larger than the difference value g2[iT] obtained when the palm was brought near the touch panel. In addition, the palm was present near the touch panel while the finger was wandering. However, the difference value was approximately 0. Thus, it has become clear that a contact with a finger tip can be distinguished from close presence of a palm by setting the third threshold Th3 between these difference values 0.4 pF and 6 pF.

The difference value depends on the setting of the second unit time. A signal change in a period shorter than the second unit time can directly be extracted as a difference value. On the other hand, for a signal change that continues longer than the second unit time, the longer the period is, the more the difference value decreases.

In FIG. 27, the signal rise time associated with a contact with the finger tip was 50 msec, and the signal change time associated with close presence of the palm was 500 msec. To eliminate a signal change associated with close presence of a palm, a shorter second unit time is preferable. However, to extract a signal associated with a contact with a finger tip, the second unit time needs to be longer than the signal rise time. Thus, it is preferred that a signal rise time associated with a contact with a finger tip be measured in advance and that the second unit time be set based on or in view of the signal rise time.

In FIG. 27, since the second unit time=50 msec and the signal change associated with a contact with the finger tip was 50 msec, the signal change of 6 pF associated with a contact with the finger tip was directly extracted as a difference value. On the other hand, while the signal change associated with close presence of the palm was 4 pF, the difference value was decreased to 0.4 pF, which as approximately 1/10 of the above difference value. Thus, it has become clear that a signal change associated with a contact with a finger tip can be distinguished from a signal change associated with close presence of a palm, by setting the second unit time to approximately 50 msec.

Figure 28:
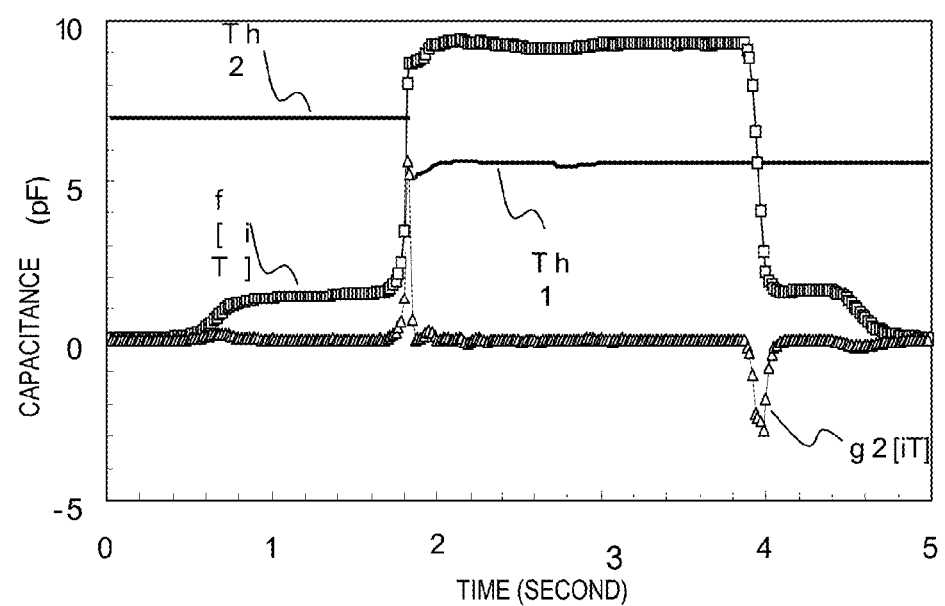
FIG. 28 is a graph illustrating measurement results of transitions of a signal output value, a difference value, a first threshold, and a second threshold Th2 in example 4.

FIG. 27 illustrates results of a simulation based on temporal change of f[iT] associated with a touch and with close presence of a palm. Under the same conditions in the above simulation, transitions of the signal output value f[iT], the first threshold Th1, the second threshold Th2, and the difference value g2[iT] were measured. FIG. 28 illustrates measurement results of the signal output value f[iT], the first threshold Th1, the second threshold Th2, and the difference value g2[iT]. FIG. 28 confirms that the same results as the simulation results show can be obtained.

Example 5

Figure 29:
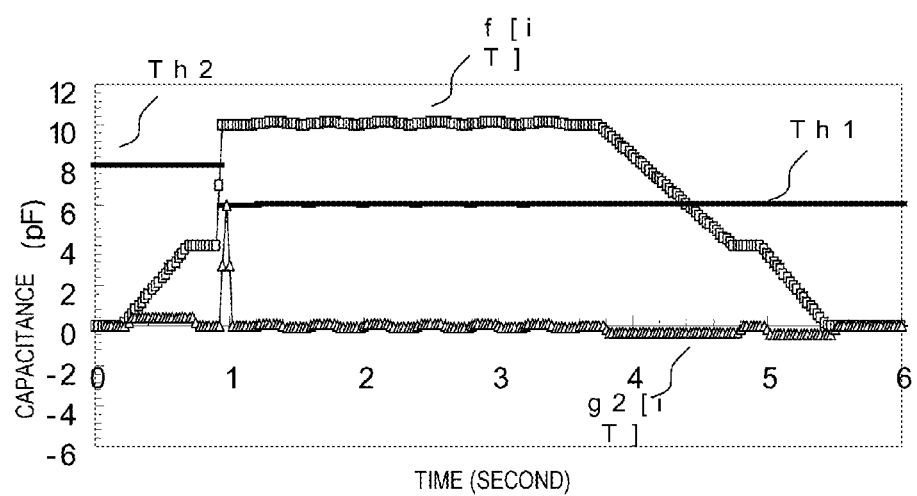
FIG. 29 is a simulation result illustrating transitions of a signal output value, a difference value, a first threshold, and a second threshold in example 5.

By using the touch sensor according to the third exemplary embodiment, transitions of the signal output value and the difference value were simulated. In example 5, intentionally, the pointer was separated slowly from the touch panel. FIG. 29 is a graph illustrating transitions of the signal output value, the difference value, and the first and second thresholds.

When the finger tip was separated, the finger tip was gradually separated in 1 second (t=3.75 to 4.75 seconds). In this period, the difference value g2[iT] was −0.3 pF, which was approximately the same as the difference value g2[iT]−0.4 pF obtained when the palm was separated (t=4.95 to 5.45 seconds). Thus, it has become clear that if use of the difference value g2[iT] alone as a touch determination index may make it difficult to make a touch determination. Therefore, it has become clear that it is preferred that the signal output value described in the first exemplary embodiment be used for a touch determination, in addition to the difference value.

Figure 30:
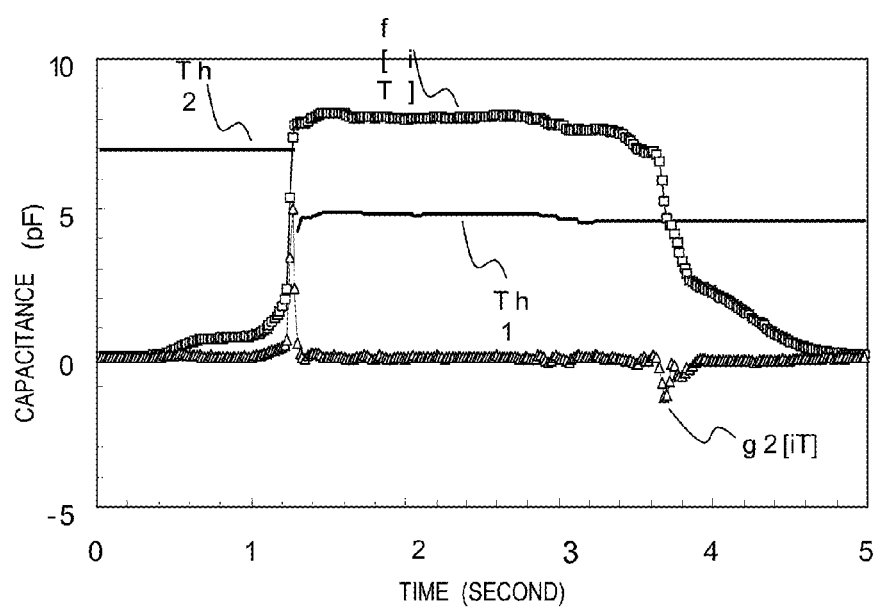
FIG. 30 is a graph illustrating measurement results of transitions of a signal output value, a difference value, a first threshold, and a second threshold Th2 in example 5.

FIG. 29 illustrates results of a simulation based on temporal change of f[iT] associated with a touch and with close presence of a palm. Under the same conditions in the above simulation, transitions of the signal output value f[iT], the first threshold Th1, the second threshold Th2, and the difference value g2[iT] were measured. FIG. 30 illustrates measurement results of the signal output value f[iT], the first threshold Th1, the second threshold Th2, and the difference value g2[iT]. FIG. 30 confirms that the same results as the simulation results shown in FIG. 29 can be obtained.

Example 6

Figure 31:
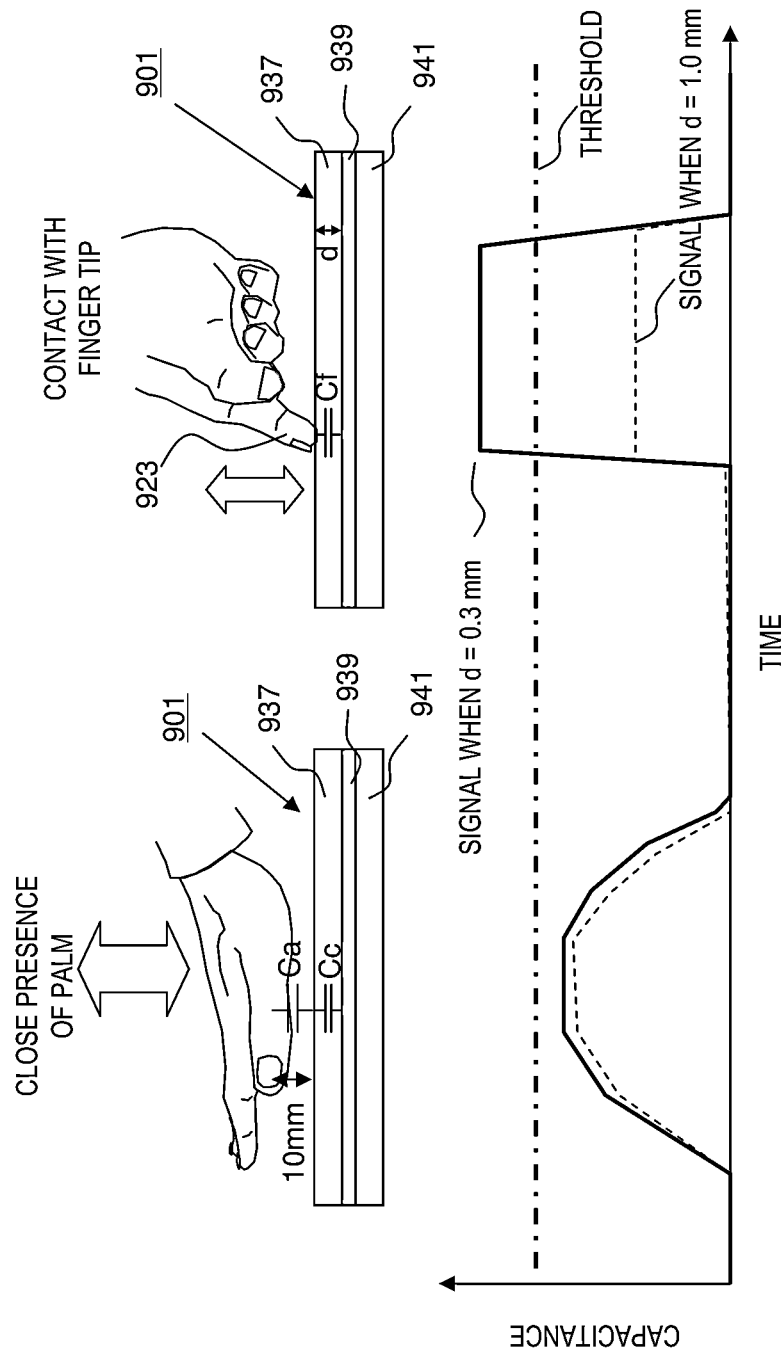
FIG. 31 is a simulation result illustrating transitions of signal output values when cover glasses having different thicknesses are used in example 6.
Figure 33:
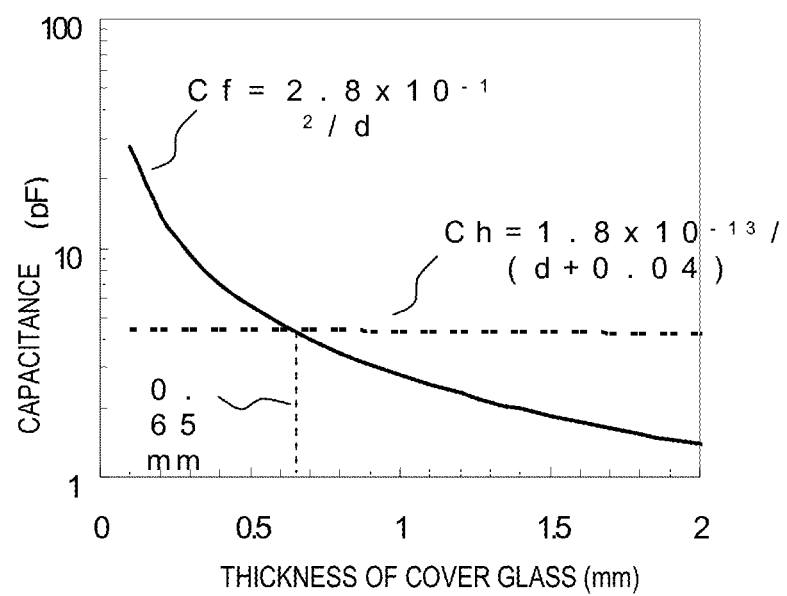
FIG. 33 is a graph illustrating measurement results of transitions of signal output values when cover glasses having different thicknesses are used in example 6.

Next, a co-relationship between a cover glass thickness and a touch determination was examined. FIG. 31 illustrates transitions of the signal output value when a finger tip was brought into contact with the surface of the touch panel and when a palm was brought as close as 10 mm to the surface of the touch panel. In FIG. 31, the thickness d of the cover glass was varied. FIG. 33 is a graph illustrating change of the signal output value with respect to the thickness of the cover glass. When a finger tip 923 as a pointer is brought into contact with a surface of a touch panel 901, in reality, the palm is brought as close as several cm to the surface of the touch panel 901. However, in FIGS. 31 and 33, to extract a signal associated with a contact with the finger tip, a signal associated with the palm brought as close as several cm to the surface of the touch panel 901 was ignored.

When a cover glass 937 as a protective layer has a thickness of 0.3 mm, the signal output value associated with a contact with the finger tip 923 is larger than the signal output value associated with close presence of the palm. Thus, by setting a threshold between these signal output values, a touch determination can be made. However, if the thickness of the cover glass 937 is increased to 1.0 mm, the signal associated with a contact with the finger tip falls below the signal associated with close presence of the palm, reversing the signal magnitude relationship. Thus, an accurate touch determination cannot be made by simply comparing the signal magnitudes.

Figure 32:
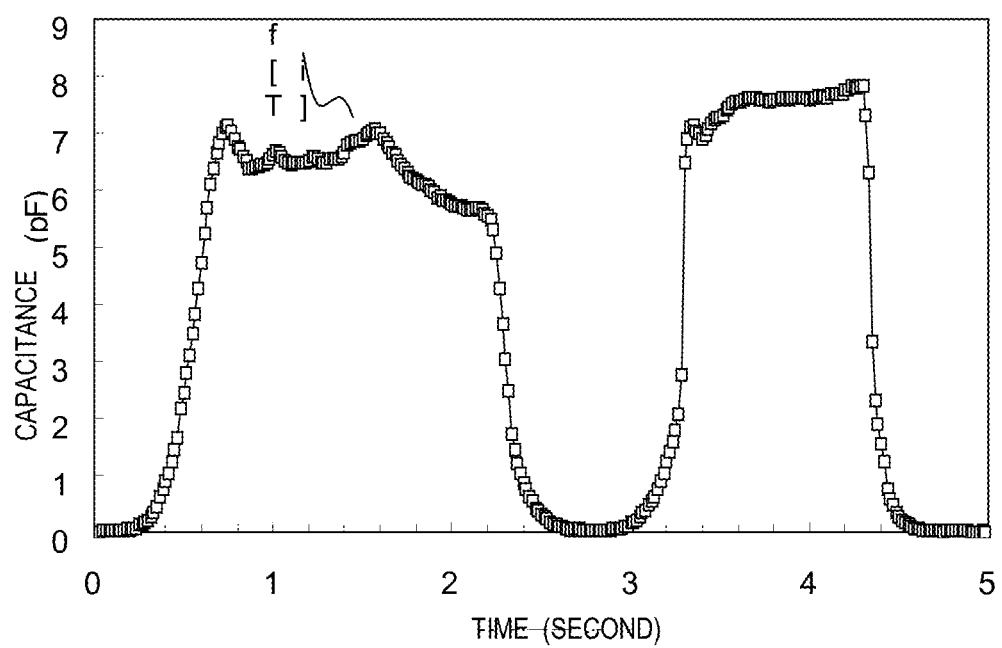
FIG. 32 is a graph illustrating transitions of signal output values with respect to thickness of a cover glass in example 6.

FIG. 31 illustrates results of a simulation based on temporal change of f[iT] associated with a touch and with close presence of a palm. Under the same conditions in the above simulation, change in the signal output value f[iT] was measured. FIG. 32 illustrates measurement results of the signal output value f[iT]. In the measurement in FIG. 32, the thickness d of the protective layer was set to 0.2 mm. FIG. 32 confirms that the same results as the simulation results shown in FIG. 31 can be obtained.

Next, the signal output value associated with a contact with the finger tip 923 and the signal output value associated with close presence of the palm were calculated based on a capacitance model using parallel plate conductors. When two parallel conductors, each having an area S $[m^2]$ and separated from the other by a distance d [m], uniformly sandwich a dielectric material having dielectric constant $\in$, the capacitance C is represented by $C=\in*S/d$, wherein $\in=\in_r*\in_0$, $\in_r$ is a relative dielectric constant of the dielectric material, and $\in_0$ is a dielectric constant for vacuum ($8.8\times10^{-12}$ (F/m)).

FIG. 33 illustrates dependency of a signal output value Cf associated with a contact with the finger tip 923 and dependency of a signal output value Ch associated with close presence of the palm on the thickness of the cover glass 937. The signal output value Cf associated with a contact with the finger tip 923 was calculated (expression 6), assuming that the parallel plates were the finger tip 923 and a transparent conductive layer 939 and that the dielectric material was the cover glass 937. Thus, the relative dielectric constant was set to 4.0, which was the relative dielectric constant of the cover glass 937, the area was set to $8\times10^{-5}$ $(m^2)$, which was the area of contact between the finger tip 923 and the surface of the touch panel 901, and the distance was set to d (variable), which was the thickness of the cover glass 937.

$$Cf = 8.8 \times 10^{-12} \times 4 \times 8 \times 10^{-5}/d \quad \text{(expression 6)}$$
$$= 2.8 \times 10^{-15}/d(F)$$

In addition, the signal output value Ch associated with close presence of the palm was calculated, assuming that the parallel conductors were the palm and the transparent conductive layer 939 and that the dielectric material was the air and the cover glass 937. Thus, these capacitances were connected in series and synthesized (expression 7).

$$1/Ch = 1/Ca + 1/Cc \quad \text{(expression 7)}$$

In expression 7, Ca represents capacitance of the air, and Cc represents capacitance of the cover glass 937.

The air capacitance Ca was calculated by expression 8, wherein the relative dielectric constant was set to 1.0, which was the relative dielectric constant of the air, the area was set to $5 \times 10^{-3}$ (m$^2$), which was the area of the palm, and the distance was 10 mm, which was the distance between the palm and the surface of the touch panel 901.

$$Ca = 8.8 \times 10^{-12} \times 1 \times 5 \times 10^{-3}/1 \times 10^{-2} \quad \text{(expression 8)}$$
$$= 4.5 \times 10^{-12}(F)$$

The capacitance Cc of the cover glass 937 was calculated by expression 9, wherein the relative dielectric constant was set to 4.0, which as the relative dielectric constant of the cover glass 937, the area was set to $5 \times 10^{-3}$ (m$^2$), which was the area of the palm, and the distance was set to d (variable), which was the thickness of the cover glass 937.

$$Cc = 8.8 \times 10^{-12} \times 4 \times 5 \times 10^{-3}/d \quad \text{(expression 9)}$$
$$= 1.8 \times 10^{-13}/d(F)$$

The following expression 10 can be obtained from expressions 7 to 9:

$$Ch = 1.8 \times 10^{-13}/(d+0.04)(F) \quad \text{(expression 10)}$$

In FIG. 33, as the thickness of the cover glass 937 increases, while the signal output value Cf associated with a contact with the finger tip 923 noticeably decreases, the signal output value Ch associated with close presence of the palm remains at approximately the same level. If the thickness of the cover glass 937 exceeds 0.65 mm, the signal output value Cf associated with a contact with the finger tip 923 falls below the signal output value Ch associated with close presence of the palm, reversing the magnitude relationship. This thickness that reverses the magnitude relationship can be used as an index for an allowable range of the thickness of the cover glass 937. This is because, as expression 6 indicates, the signal output value Cf associated with a contact with the finger tip 923 is inversely proportional to the thickness d of the cover glass 937. On the other hand, the signal output value Ch associated with close presence of the palm greatly depends on the distance between the palm and the surface of the cover glass 937. However, if this distance is maintained to be constant, dependency of the signal output value Ch on the thickness of the cover glass 937 is significantly small. Thus, if a touch determination is made by simply comparing the capacitance magnitudes, an increase of the thickness of the cover glass 937 makes it difficult to make an accurate touch determination.

The same principle is applied when a user wears a glove. Namely, when a finger tip is brought into contact with the touch panel, part of a human body such as a palm or an arm is also brought into contact with the touch panel, and capacitance is formed between the palm or the like and the transparent conductive layer. However, since capacitance formed between a finger tip in a glove and the transparent conductive layer is smaller, influence by close presence of the palm is relatively increased.

Thus, a difference value ($\Delta$Cf) associated with a contact with the finger tip and a difference value $\Delta$Ch associated with close presence of the palm are calculated. The difference value ($\Delta$Cf) associated with a contact with the finger tip is calculated based on expression 6, the second unit time setting (50 msec), and the signal change time (50 msec) (expression 11). The difference value ($\Delta$Ch) associated with close presence of the palm is calculated based on expression 10, the second unit time setting (50 msec), and the signal change time (500 msec) (expression 12).

$$\Delta Cf = \frac{Cf \times (\text{second unit time setting})}{(\text{signal change time})} \quad \text{(expression 11)}$$
$$= 2.8 \times 10^{-12}/d \times 50 \text{ msec}/50 \text{ msec}$$
$$= 2.8 \times 10^{-12}/d$$

$$\Delta Ch = \frac{Ch \times (\text{second unit time setting})}{(\text{signal change time})} \quad \text{(expression 12)}$$
$$1.8 \times 10^{-13}/(d+0.04) \times 50 \text{ msec}/500 \text{ msec}$$
$$= 1.8 \times 10^{-14}/(d+0.04)$$

If (signal change time)≤(second unit time setting), (second unit time setting)/(signal change time)=1.

Figure 34:
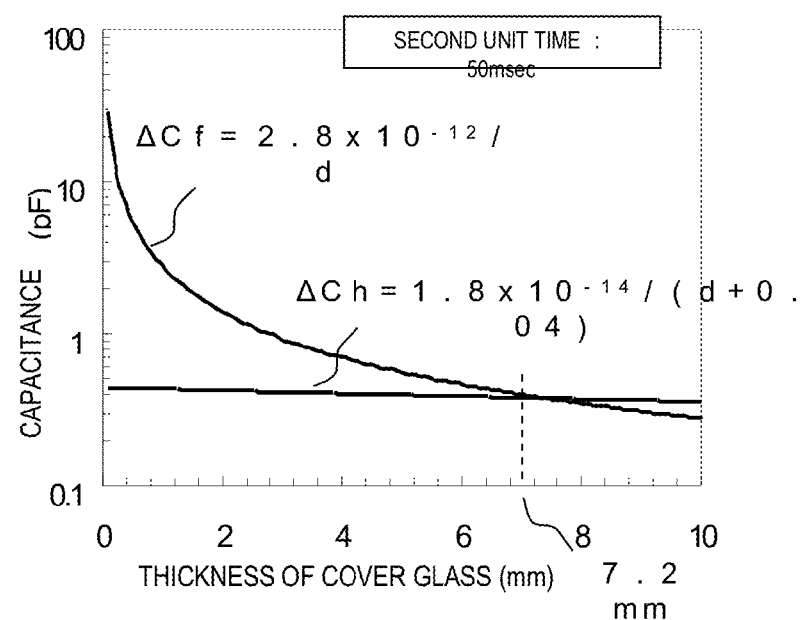
FIG. 34 is a graph illustrating transitions of difference values with respect to thickness of a cover glass in example 6.

FIG. 34 illustrates the difference values $\Delta$Cf and $\Delta$Ch calculated based on expressions 11 and 12 by varying the thickness of the cover glass. As is clear from FIG. 34, when the thickness of the cover glass was 7.2 mm, the difference value $\Delta$Ch associated with close presence of the palm exceeded the difference value $\Delta$Cf associated with a contact with the finger tip. It has become clear that use of these difference values $\Delta$Cf and $\Delta$Ch as indexes for a touch determination provides a significantly meritorious effect of increasing an allowable range of the thickness of the cover glass to approximately 10 times greater, compared with the allowable range in FIG. 33 in which only the signal magnitudes are compared.

Since it was confirmed that the influence by close presence of a palm can be significantly reduced and a smaller capacitance change can be detected, next, whether a user can input instructions with a glove was examined. If a user wears a glove over a bare hand and touches the surface of the touch panel, capacitance is formed between the finger tip and the transparent conductive layer. Since the glove and the cover glass are present between the finger tip and the transparent conductive layer, the capacitance is the serially-connected capacitances stored in the glove and the cover glass. Assuming that the glove and the cover glass have an equal relative dielectric constant, it is possible to deem that this situation is equivalent to when the thickness of the cover glass is increased by the thickness of the glove.

Figure 35:
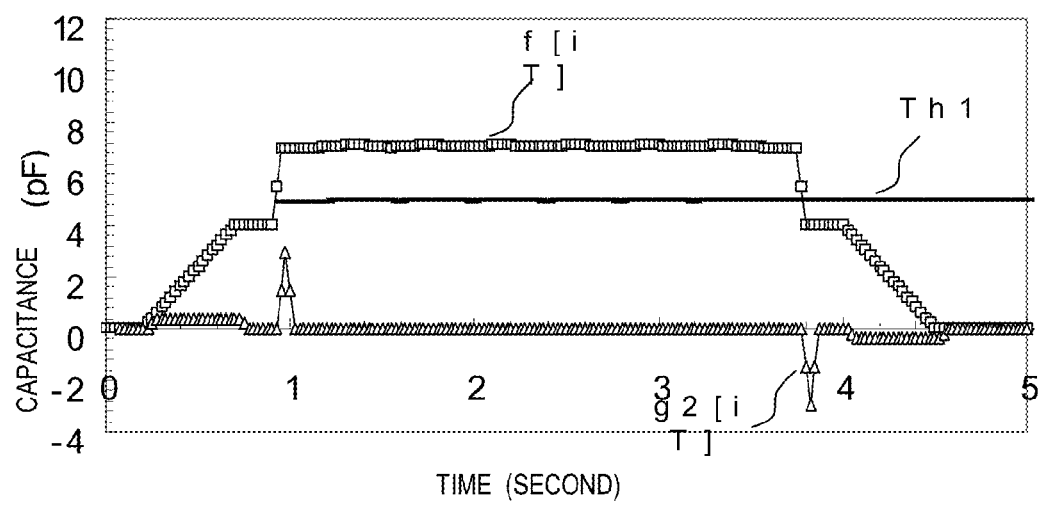
FIG. 35 is a simulation result illustrating transitions of a signal output value, a difference value, and a first threshold in example 6.

FIG. 35 illustrates simulation results of transitions of the signal output value, the difference value, and the first threshold when a user wore a plastic glove. In FIG. 35, illustration of the second threshold Th2 is omitted. A plastic glove having a thickness of 0.5 mm was used. The difference value associated with a contact with a finger tip in the glove was 3 pF, which was approximately ½ of the difference value in FIG. 28 and the like in which a bare hand was used. However, this difference value 3 pF associated with a contact with the glove is sufficiently larger than the difference value 0.4 pF associated with close presence of the palm. Thus, it has been confirmed that a contact with a finger tip can be distinguished from close presence of a palm by setting the third threshold Th3 between these values. In addition, the signal obtained when a user touches the touch panel with a bare hand is larger than the signal obtained when a user touches the touch panel with a gloved finger. Thus, it has been confirmed that an accurate touch determination can be made by setting the third threshold Th3 to be smaller than the difference value 3 pF associated with a contact with a finger tip in the glove, whether the user touches the touch panel with a gloved finger or a bare hand. For example, it is preferred that the third threshold Th3 be set between 30% and 100% of the signal 3 pF associated with a contact with a finger tip in the glove.

Figure 36:
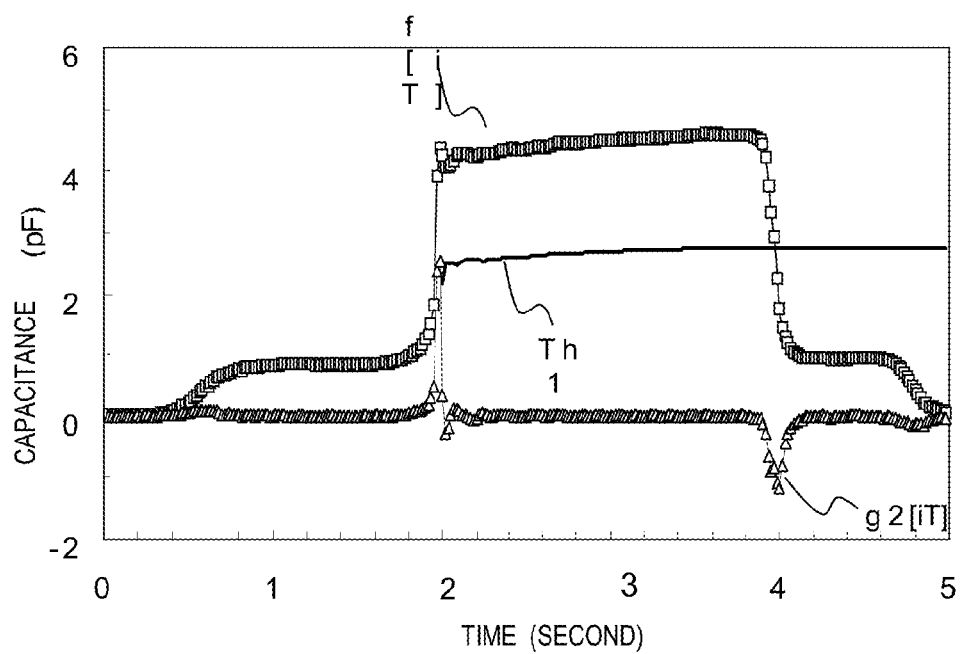
FIG. 36 is a graph illustrating measurement results of transitions of a signal output value, a difference value, and a first threshold in example 6.

FIG. 35 illustrates results of a simulation based on temporal change of f[iT] associated with a touch and with close presence of a palm. Under the same conditions in the above simulation, transitions of the signal output value f[iT], the first threshold Th1, and the difference value g2[iT] were measured. A glove made of synthetic resin material with a thickness of 0.20 mm was used. FIG. 36 illustrates measurement results of the signal output value f[iT], the first threshold Th1, and the difference value g2[iT]. FIG. 36 confirms that an accurate touch determination can be made even if a user wears a glove.

Since use of the difference values as indexes for a touch determination can significantly decrease the influence associated with close presence of a palm, it has become clear that a contact with a finger tip can be distinguished from close presence of a palm. Thus, a thicker cover glass can be used, and a user can input instructions even with a glove.

Example 7

Figure 37:
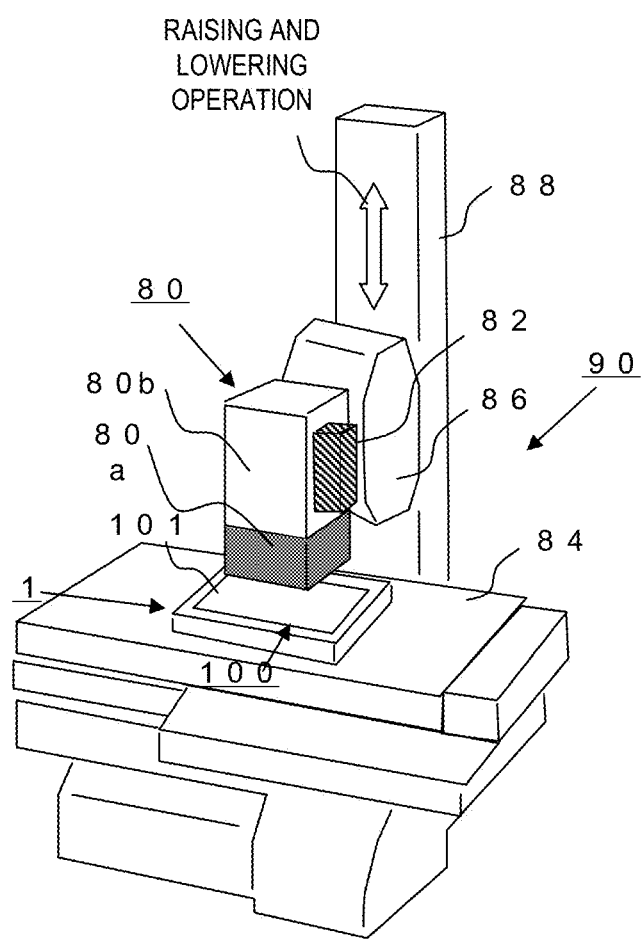
FIG. 37 is a schematic perspective view of a testing machine used for measurement in example 7.

The signal output value was simulated while varying the distance between the touch sensor device and a pointer. FIG. 37 is a schematic perspective view of a testing machine used for the measurement. Configurations substantially the same as those according to the first exemplary embodiment are denoted by the same reference characters according to the first exemplary embodiment. The testing machine 90 is provided with a stage 84, and the electronic apparatus 1 is arranged on the stage 84, with the surface of the touch panel 101 facing upward. A pointer (rigid body) 80 has an end portion 80a, which is a conductor, and the end portion 80a is electrically connected to a circuit ground (reference potential node, not illustrated) of the testing machine 90. The area of the bottom surface of the end portion 80a was set to 35 (cm$^2$), approximately 40 times larger than an area of a contact with a finger tip, so that a capacitance equivalent to a capacitance associated with a touch with a finger tip could be formed between the pointer 80 and the transparent conductive layer 39, even when the distance L between the pointer 80 and the surface of the touch panel 101 was several mm. The pointer 80 includes a main body portion 80b having insulating surfaces, and a distance sensor device 82 is attached to one of the insulating surfaces. A display (not illustrated) for displaying measurement results at the distance L is attached to the distance sensor device 82. The main body portion 80b is connected to a unit 86 including a motor controlling the height of the pointer 80. In addition, the unit 86 is connected to a stand 88. The testing machine includes a microcontroller (not illustrated), and a program incorporated in the microcontroller automatically controls the distance L between the surface of the touch panel 101 included in the electronic apparatus 1 and the pointer 80. Thus, the automatically-controlled distance L between the touch panel 101 and the pointer 80 can be monitored. By raising and lowering the pointer 80, it is possible to give signals equivalent to an increase/decrease of the capacitance detected by the touch sensor device 100 when a drag operation is executed on the surface of the touch panel 101 or signals equivalent to a flat decrease of the capacitance when a finger tip is separated from the surface of the touch panel 101. Namely, this testing machine 90 can give the same capacitance variations caused when a user operates the touch sensor device 100 to the touch sensor device 100. In addition, by causing the touch sensor device 100 to receive such capacitance variations and by causing the touch sensor device 100 to transmit information such as a mouse event to the outside, inventive functions of the touch sensor device 100 can be examined objectively.

Figure 38:
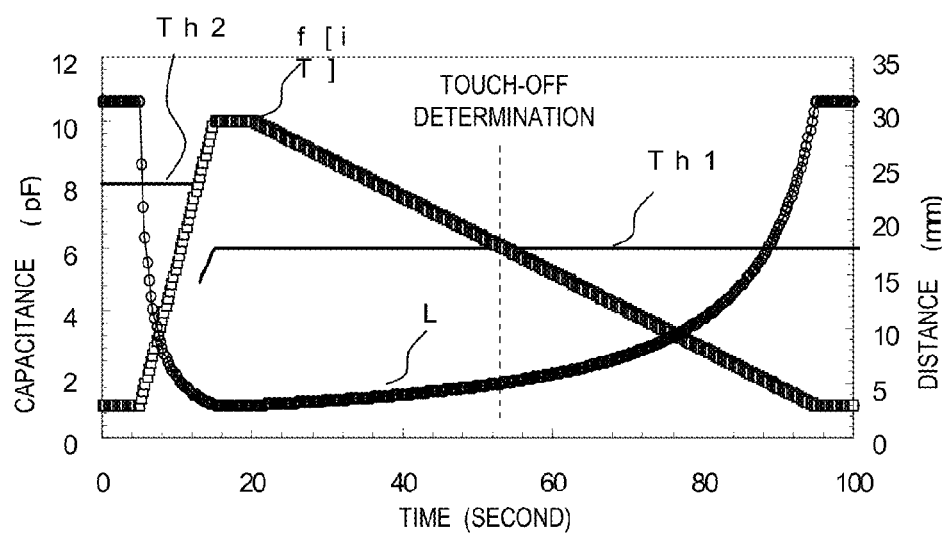
FIG. 38 is a graph illustrating transitions of a signal output value, a first threshold, and a distance when a user monotonously raises a pointer in example 7.
Figure 39:
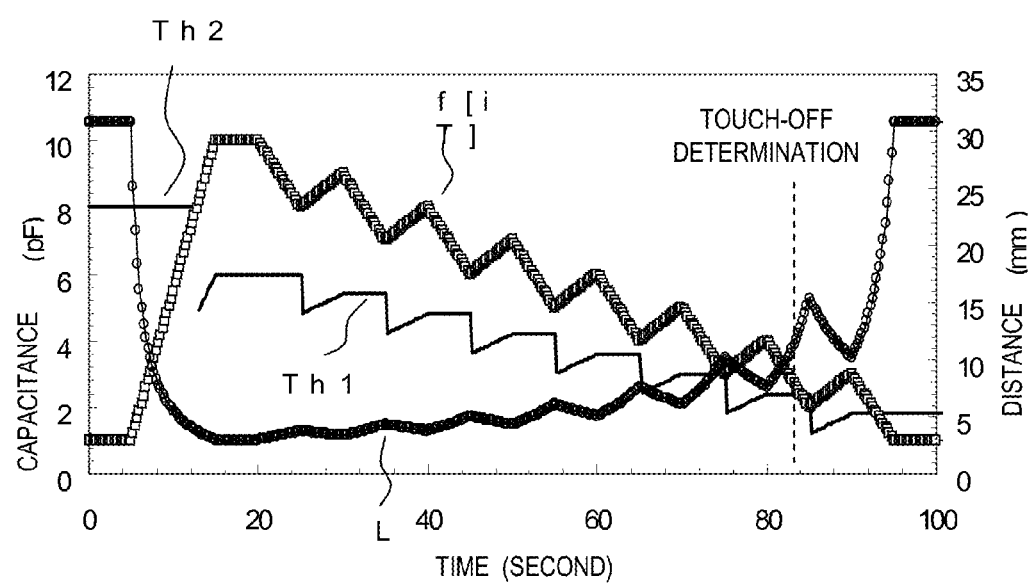
FIG. 39 is a graph illustrating transitions of a signal output value, a first threshold, and a distance when a user separates a pointer from a surface of a touch panel while raising and lowering a pointer repeatedly in example 7.

FIG. 38 illustrates transitions of the signal output value, the first threshold, and the distance when the pointer 80 was increased monotonously. The distance L measured by the distance sensor device 82 is also illustrated. The vertical scale on the left of the graph represents capacitance values for the signal output value f[iT], the first threshold Th1, and the second threshold Th2. The vertical scale on the right represents distance values for the distance L. The vertical scales of the graph in FIG. 39 are the same as those in FIG. 38. The flow in FIG. 8 according to the second exemplary embodiment was used as a touch determination program of the touch sensor device 100.

First, the distance L between the surface of the touch panel 101 and the pointer 80 was maintained at 30 mm (time t=0 to 5 seconds). Next, the pointer 80 was brought closer to the surface of the touch panel 101. When the signal output value f[iT] exceeded the second threshold Th2 (8 pF), a touch-on determination was made. At this timing, a pointer displayed on a display included in the electronic apparatus 1 was selected. Next, when the distance L between the surface of the touch panel 101 and the pointer 80 was decreased to 3 mm, the signal output value was maintained at a constant level of 10 pF (t=15 to 20 seconds). In this period, the first threshold Th1 for a touch-off determination was 6 pF.

Next, when the distance L between the surface of the touch panel 101 and the pointer 80 was increased, the capacitance was decreased monotonously (t=20 to 95 seconds). Since the first threshold Th1 was not updated from 6 pF, when the signal output value f[iT] fell below the first threshold Th1, a touch-off determination was made. When the touch-off determination was made, the signal output value was 6 pF, and the distance L was 5.1 mm (t=53.5 seconds).

FIG. 39 illustrates transitions of the signal output value, the first threshold, and the distance when the pointer 80 was separated from the surface of the touch panel 101 while the pointer 80 was raised and lowered repeatedly. Since the touch-on determination and the like are the same as those in FIG. 38, the description thereof will be omitted.

The pointer 80 was separated from the surface of the touch panel 101 while the pointer 80 was raised and lowered repeatedly (t=20 to 95 seconds). As the pointer 80 was separated from the surface of the touch panel 101 farther, the signal output value f[iT] was decreased generally. More specifically, every time the pointer 80 was lowered, since the pointer 80 was temporarily brought closer to the surface of the touch panel 101, the signal output value f[iT] was increased, and the first threshold Th1 was updated. However, the first threshold Th1 was also decreased generally with time. When the signal output value f[iT] fell below the first threshold Th1, a touch-off determination was made. When the touch-off determination was made, the signal output value was 2.4 pF, and the distance L was 12.8 mm (t=84 seconds).

When the examination results in FIG. 38 are compared with the examination results in FIG. 39, the touch-off determination distance L is different. Namely, the touch-off determination distance L was greater in the case where the pointer 80 was separated from the surface of the touch panel 101 while the pointer 80 was raised and lowered repeatedly. This is because, if the pointer 80 is raised and lowered repeatedly, the first threshold Th1 for a touch-off determination is updated and the capacitance at a time a touch-off determination is made is lowered, compared with the case where the pointer 80 is increased monotonously.

Next, setting of a frequency of a signal increase and decrease will be described with reference to FIG. 39. In a period from t=20 to 25 seconds, the signal output value f[iT] was decreased, and in a period from t=25 to 30 seconds, the signal output value f[iT] was increased. If the period from t=20 to 30 seconds when the signal was decreased and increased was deemed as 1 cycle (a signal increase and decrease cycle), the signal increase and decrease cycle was 10 seconds. Since the frequency is the reciprocal of the cycle period, the frequency of a signal increase and decrease was 0.1 Hz. Since the signal output value is generally inversely proportional to the distance L and an increase and a decrease of the signal output value are controlled by raising and lowering of the pointer 80, the frequency of signal increase and decrease results in the same value as the frequency of raising and lowering of the pointer 80.

Next, in the operation where the pointer 80 was raised while the pointer 80 was raised and lowered repeatedly, a rise distance of the pointer 80 in a signal increase and decrease cycle will be described with reference to FIG. 39. In the period from t=20 to 25 seconds, the signal output value f[iT] was decreased from 10 pF to 8 pF, and in the period from t=25 to 30 seconds, the signal output value f[iT] was increased from 8 pF to 9 pF. Thus, decreased by 2 pF and increased by 1 pF in a signal increase and decrease cycle, the signal output value was decreased by 1 pF in total. The signal decrease amount and the signal increase amount in each of the signal increase and decrease cycles were set to 2 pF and 1 pF, respectively.

Assuming that the first signal increase and decrease (t=20 to 30 seconds) is the first cycle and the q-th increase and decrease is the q-th cycle, when the signal decreased from 4 pF to 2 pF from t=80 to 85 sec. in the seventh cycle, the signal output value fell below the first threshold Th1, and a touch-off determination was made. This is because, if the q-th cycle is later, the signal output value is generally decreased further and a signal decrease per signal increase and decrease cycle is increased further with respect to the signal output value. More specifically, since the first threshold Th1 is calculated by signal during contact c×sensitivity (α=0.6), if the signal output value decreases by 40% or more in a signal increase and decrease cycle, the signal output value falls below the first threshold Th1, and as a result, a touch-off determination is made.

Example 8

Based on the touch sensor device according to the sixth exemplary embodiment, transition of the channel signal output value was measured. Setting conditions are the same as those in the above sixth exemplary embodiment. FIG. 40 is a graph illustrating transition of the channel signal output value. FIG. 41 is a graph illustrating transition of the sum of four channel signal output values. In example 8, if the difference value of the signal per second unit time (n−m)T exceeds the third threshold Th3=1.5 pF, a touch-on determination is made. In this example, the second unit time (n−m)T was set to 2*16 msec=32 msec. In the second unit time in FIG. 40, a gradual signal change prior to the second unit time is not included, and a sharply increased signal change is extracted without loss. By using the algorithm according to the sixth exemplary embodiment, the signal associated with close presence of a palm and the signal associated with a touch can be distinguished.

Since the upper limit of the second unit time (n−m)T was initially set to max{(n−m)T}=80 msec, the second unit time (n−m)T was automatically adjusted between 16 msec and 80 msec based on states per touch. In this example, a test was carried out, in which a palm was quickly brought close toward the panel surface and was stopped immediately before the palm was brought into contact with the panel surface. In this test, when max{(n−m)T} was set to 160 msec, a touch-on determination was made. This was an erroneous determination, since the pointer was not brought into contact with the panel surface. On the other hand, when the upper limit max{(n−m)T} was set to 80 msec, a touch-on determination was not made. Thus, it has become clear that an erroneous touch-on determination associated with close presence of a palm can be prevented by automatically adjusting the second unit time (n−m)T and by setting max{(n−m)T} to 80 msec.

Figure 42:
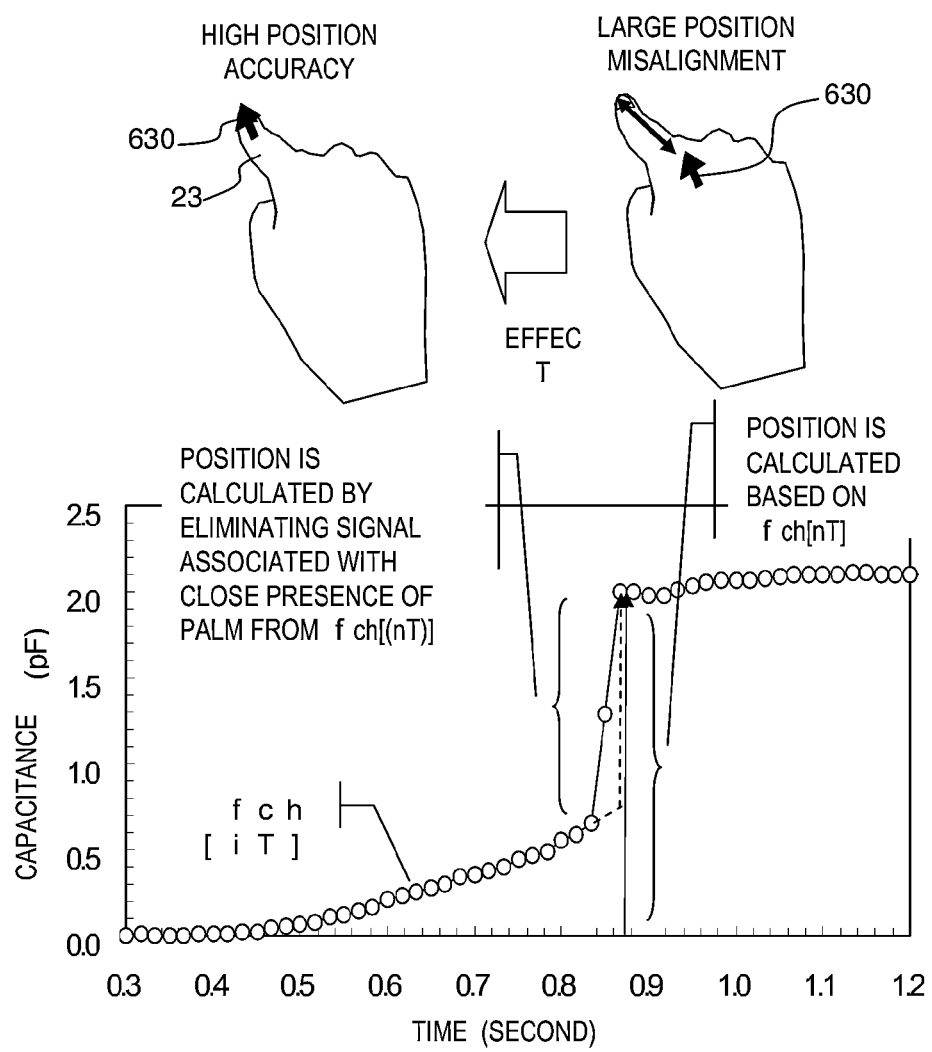
FIG. 42 illustrates explanations in addition to FIG. 40.

Next, to examine meritorious effects of the sixth exemplary embodiment, a user touched the panel surface with the right-hand index finger and measured a pointer position calculated by the touch sensor device. FIG. 42 illustrates FIG. 40 and explanations of FIG. 40. First, influence associated with close presence of a palm will be described. First, immediately after the touch-on, the position of the pointer 23 was simply calculated based on fch[nT]. It was found that the position of a cursor 630 was misaligned from a reference position where the panel surface and the finger were in contact with each other by +8 mm in the x direction (in the right direction) and −20 mm in the Y direction (toward the user). The right-hand palm was positioned approximately on the right near side of the right-hand index finger that touched the panel surface, and this position matches the position misalignment direction of the cursor 630. Thus, it has become clear that the position misalignment of the cursor 630 is attributable to the influence associated with close presence of a palm. Next, immediately after the touch-on, the signal associated with close presence of a palm was eliminated from fch[(nT)], and the position was calculated. In this case, the position misalignment of the cursor 630 was 1 mm or less in the X and Y directions from the finger contact position. Namely, the position misalignment was improved (reduced) significantly.

Example 9

Figure 43:
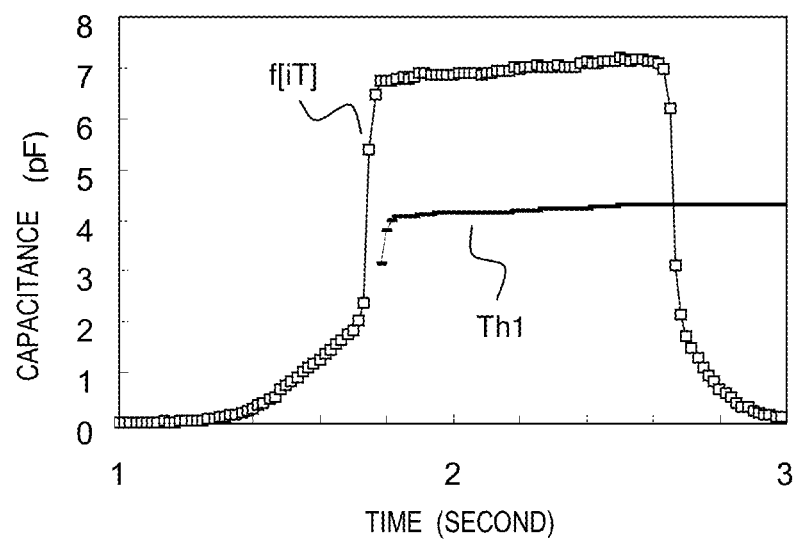
FIG. 43 illustrates measurement results of a signal output value f(iT) and a first threshold Th1.

By using the touch sensor device according to the seventh exemplary embodiment, transitions of the signal output value f[iT] and the first threshold Th1 were measured. Setting conditions, such as for updating the threshold, are the same as those according to the third exemplary embodiment. FIG. 43 illustrates measurement results of the signal output value f[iT] and the first threshold Th1. The sum of the capacitances detected by all the X and Y transparent electrodes 704 and 702 was set as the capacitance f[iT] associated with a touch, and T was set to 16 msec. After gradually increased from approximately 0, the output value f[iT] was sharply increased first and was saturated next. As in the first exemplary embodiment, a touch-on determination was made during the sharp increase of the output value f[iT], and the first threshold Th1 for a touch-off determination was calculated based on the output value f[iT].

In this example, the signal output value f[iT] was the sum of the capacitances detected by all the X and Y transparent electrodes 704 and 702. However, the sum of maximum values of the capacitances in the X and Y directions may be used.

The touch sensor device, the control method thereof, the electronic apparatus, and the program according to the present disclosure have thus been described based on the above exemplary embodiments. However, the present disclosure is not limited thereto. Namely, various variations, changes, and modifications can of course be made to the above exemplary embodiments without departing from the scope of the present disclosure, based on the basic technical concept of the present disclosure. Various combinations, substitutions, and selections of various disclosed elements (including each of elements in the claims, modes, embodiments, examples and drawings) are possible within the scope of the claims of the present disclosure.

Other problems, objects and extended modes of the present disclosure will be apparent from the entire disclosure of the present disclosure including the claims.

The present disclosure can be used for a surface display device detecting coordinates of a position pointed by a pointer on a display surface or for a surface display device detecting presence or absence of a pointing operation. In addition, for example, the present disclosure is applicable to a touch sensor function used in a game machine, a mobile information terminal, a PDA, a car navigation system, a notebook computer, a mobile DVD player, a video game machine attached to passenger seats on airplanes or buses, and factory automation (FA) equipment.

The entire disclosures of the above patent applications, based on which the present application claims the priority, shall not be influenced by any description added or modified in the present application. The above application shall be effective as of the basic application date without any change and shall be interpreted as originally disclosed. In addition, any description added or changed in the present application shall be effective as of the filing date of the present application.

In the present disclosure, the following modes are possible.
(Mode 1)
An electronic apparatus, comprising the touch sensor device according to any one of the aspects, exemplary embodiments or examples disclosed herein.
(Mode 2)
The electronic apparatus according to mode 1,
further comprising:
a counter electrode also serving as a conductive layer forming a capacitance with a pointer;
a wiring;
liquid crystal arranged between the counter electrode and the wiring; and
a switch unit floating at least part of the wiring.
(Mode 3)
The electronic apparatus according to mode 1,
further comprising:
a counter electrode;
a wiring;
liquid crystal arranged between the counter electrode and the wiring;
a conductive layer forming a capacitance with a pointer;
an insulating substrate arranged between the counter electrode and the conductive layer; and
a switch unit simultaneously applying an AC voltage applied to the conductive layer to the counter electrode.

What is claimed is:

1. A touch sensor device, comprising:
a touch panel on which a capacitance is formed with a pointer;
a signal calculation unit calculating a signal output value based on a magnitude of the capacitance;
a contact determination unit comparing the signal output value with a threshold and determining whether the pointer has been brought into contact with or separated from the touch panel;
a first threshold used for determining whether the pointer has been brought into contact with and whether the pointer has been separated from the touch panel; and
a threshold calculation unit updating the first threshold if an increase of the signal output value is detected during a first unit time within a time period from a determination that the pointer has been brought into contact with the touch panel until a determination that the pointer has been separated from the touch panel.

2. The touch sensor device according to claim 1,
wherein, if an increase of the signal output value is detected, the threshold calculation unit updates the first threshold to be smaller than the signal output value determined to have been increased.

3. The touch sensor device according to claim 1, further comprising:
a signal comparison unit determining whether the signal output value has been increased during the first unit time being 0.02 to 0.2 seconds.

4. The touch sensor device according to claim 1, further comprising:
a difference calculation unit calculating a first difference value representing a magnitude of change of the signal during a second unit time,
wherein, when determining whether or not the pointer has been separated from the touch panel, if an absolute value of the first difference value exceeds a third threshold, the contact determination unit determines that the pointer has been separated from the touch panel.

5. The touch sensor device according to claim 4, further comprising:
a change determination unit determining a magnitude of change of the signal,
wherein the difference calculation unit calculates a second difference value representing change of the signal during a third unit time, and
wherein the change determination unit compares the second difference value with a fourth threshold to determine whether or not the signal changes in association with close presence of the pointer.

6. The touch sensor device according to claim 5,
wherein the second unit time is from a time the second difference value is equal to or greater than the fourth threshold until a time the second difference value is less than the fourth threshold.

7. The touch sensor device according to claim 5,
wherein the fourth threshold is obtained by dividing the third threshold by the upper limit of the second unit time.

8. The touch sensor device according to claim 5, further comprising:
a position calculation unit calculating position coordinates where the pointer is in contact with the touch panel, wherein the signal calculation unit calculates the signal output value, based on individual channel signals from the touch panel, and wherein the position calculation unit calculates the position coordinates, based on a value obtained by subtracting a signal component associated with close presence of an element other than the pointer from the individual channel signals.

9. The touch sensor device according to claim 8, wherein the position calculation unit calculates a signal component associated with close presence of an element other than the pointer by extrapolation based on the second difference value equal to or less than the fourth threshold and on the second unit time.

10. The touch sensor device according to claim 4, wherein the second unit time has an upper limit that is set between 16 msec and 80 msec.

11. The touch sensor device according to claim 1, further comprising:

a difference calculation unit calculating a first difference value representing a magnitude of change of the signal during a second unit time, wherein, when determining whether or not the pointer has been brought into contact with the touch panel, if an absolute value of the first difference value exceeds a third threshold, the contact determination unit determines that the pointer has been brought into contact with the touch panel.

12. The touch sensor device according to claim 1, further comprising:

a reference calculation unit calculating a baseline based on a magnitude of a capacitance formed on the touch panel when there is no influence of a capacitance by the pointer, wherein the signal calculation unit calculates the signal output value based on a capacitance formed by the pointer and the baseline.

13. An electronic apparatus, comprising the touch sensor device according to claim 1.

14. The electronic apparatus according to claim 13, further comprising:

a counter electrode also serving as a conductive layer forming a capacitance with a pointer;

a wiring;

liquid crystal arranged between the counter electrode and the wiring; and a switch unit floating at least part of the wiring.

15. The electronic apparatus according to claim 13, further comprising:

a counter electrode;

a wiring;

liquid crystal arranged between the counter electrode and the wiring;

a conductive layer forming a capacitance with a pointer;

an insulating substrate arranged between the counter electrode and the conductive layer; and a switch unit simultaneously applying an AC voltage applied to the conductive layer to the counter electrode.

16. A touch sensor device comprising:

a touch panel on which a capacitance is formed with a pointer;

a signal calculation unit calculating a signal output value based on a magnitude of the capacitance;

a contact determination unit comparing the signal output value with a threshold and determining whether the pointer has been brought into contact with or separated from the touch panel;

a first threshold used for determining whether the pointer has been separated from the touch panel;

a second threshold as a constant used for determining whether the pointer has been brought into contact with the touch panel; and a threshold calculation unit updating the first threshold, if an increase of the signal output value is detected during a first unit time within a time period from a determination that the pointer has been brought into contact with the touch panel until a determination that the pointer has been separated from the touch panel.

17. The touch sensor device according to claim 16, further comprising:

a difference calculation unit calculating a first difference value representing a magnitude of change of the signal during a second unit time, wherein, when determining whether or not the pointer has been separated from the touch panel, if an absolute value of the first difference value exceeds a third threshold, the contact determination unit determines that the pointer has been separated from the touch panel.

18. The touch sensor device according to claim 16, further comprising:

a difference calculation unit calculating a first difference value representing a magnitude of change of the signal during a second unit time, wherein, when determining whether or not the pointer has been brought into contact with the touch panel, if an absolute value of the first difference value exceeds a third threshold, the contact determination unit determines that the pointer has been brought into contact with the touch panel.

19. The touch sensor device according to claim 16, further comprising:

a reference calculation unit calculating a baseline based on a magnitude of a capacitance formed on the touch panel when there is no influence of a capacitance by the pointer, wherein the signal calculation unit calculates the signal output value based on a capacitance formed by the pointer and the baseline.

20. A touch sensor device, wherein a first distance is shorter than a second distance, wherein the first distance is a distance between a pointer and a touch panel at a time of a determination that the pointer has been separated from the touch panel, after the pointer is brought to proximity of the touch panel, the pointer is determined to have been brought into contact with the touch panel, and the distance between the pointer and the touch panel is increased monotonously, and wherein the second distance is a distance between the pointer and the touch panel at a time of a determination that the pointer has been separated from the touch panel, after the pointer is brought to proximity of the touch panel, the pointer is determined to have been brought into contact with the touch panel, and the distance between the pointer and the touch panel is gradually increased while the distance is increased and decreased repeatedly.

* * * * *